US012593221B2

(12) United States Patent
Masuda et al.

(10) Patent No.: US 12,593,221 B2
(45) Date of Patent: Mar. 31, 2026

(54) WIRELESS COMMUNICATION DEVICE FOR HUMAN-POWERED VEHICLE

(71) Applicant: SHIMANO INC., Sakai City (JP)

(72) Inventors: Takaya Masuda, Sakai City (JP); Ryo Isobe, Sakai City (JP)

(73) Assignee: SHIMANO INC., Sakai (JP)

( * ) Notice: Subject to any disclaimer, the term of this patent is extended or adjusted under 35 U.S.C. 154(b) by 699 days.

(21) Appl. No.: 17/679,089

(22) Filed: Feb. 24, 2022

(65) Prior Publication Data

US 2023/0269605 A1 Aug. 24, 2023

(51) Int. Cl.
*H04W 24/02* (2009.01)
*H04B 17/345* (2015.01)
*H04W 64/00* (2009.01)

(52) U.S. Cl.
CPC ........... *H04W 24/02* (2013.01); *H04B 17/345* (2015.01); *H04W 64/00* (2013.01)

(58) Field of Classification Search
CPC ....... H04W 24/02; H04W 64/00; H04W 4/40; H04W 12/03; H04W 4/80; H04W 76/10; H04W 52/0209; H04W 76/20; H04W 76/34; H04B 17/345; H04B 1/3822; H04B 7/06; H04B 7/08; B62J 45/00; B62J 99/00; B62J 45/20; B62J 2099/004; B62J 2099/0013; B62J 2099/002; H04L 1/16; B60R 2325/101
See application file for complete search history.

(56) References Cited

U.S. PATENT DOCUMENTS

| | | | |
|---|---|---|---|
| 5,701,127 | A | 12/1997 | Sharpe |
| 10,571,558 | B2 | 2/2020 | Tuttle |
| 10,960,955 | B2 | 3/2021 | Howell-McLean et al. |
| 2004/0203767 | A1* | 10/2004 | Fraser ................... H04W 76/20 |
| 2010/0285788 | A1* | 11/2010 | Epifani ................. H04W 24/02 |
| | | | 455/418 |
| 2016/0257370 | A1 | 9/2016 | Hashimoto et al. |
| 2017/0048077 | A1* | 2/2017 | Hou ........................ H04W 4/80 |
| 2018/0257736 | A1* | 9/2018 | Komatsu .................. B62J 99/00 |
| 2019/0248438 | A1* | 8/2019 | Masuda ................... B62J 45/20 |
| 2020/0169842 | A1* | 5/2020 | Yamaguchi ............. H04W 4/40 |
| 2020/0252987 | A1* | 8/2020 | Inoue .................... H04W 76/10 |
| 2021/0070397 | A1* | 3/2021 | Komada ................. B62J 45/00 |

(Continued)

FOREIGN PATENT DOCUMENTS

CN 114079479 2/2022

OTHER PUBLICATIONS

Hashemi et al., "Intra-car Wireless Sensors Data Collection: A Multi-hop Approach", 2013, IEEE 77th Vehicular Technology Conference (VTC Spring), Dresden.

*Primary Examiner* — Lana N Le
(74) *Attorney, Agent, or Firm* — MORI & WARD, LLP

(57) ABSTRACT
A wireless communication device for a human-powered vehicle comprises a wireless communicator unit and a controller. The wireless communicator unit is configured to wirelessly communicate with at least one electric component. The controller is configured to control the wireless communicator unit to wirelessly communicate with the at least one electric component. The controller is configured to modify, in accordance with a predetermined condition, a signal transmitting manner of a signal transmitted in a predetermined period from the wireless communicator unit.

11 Claims, 30 Drawing Sheets

(56)     References Cited

U.S. PATENT DOCUMENTS

| | | | |
|---|---|---|---|
| 2022/0052724 A1 | 2/2022 | Kim et al. | |
| 2022/0240104 A1* | 7/2022 | Balboul | ......... H04W 4/40 |
| 2023/0090571 A1* | 3/2023 | Wada | ......... H04W 24/02 |
| 2025/0030765 A1* | 1/2025 | Matsuda | ......... B62J 45/00 |
| 2025/0267613 A1* | 8/2025 | Yoshioka | ......... H04W 64/00 |

* cited by examiner

WIRELESS COMMUNICATION DEVICE FOR HUMAN-POWERED VEHICLE

BACKGROUND

Technical Field

The present invention relates to a wireless communication device for a human-powered vehicle.

Background Information

A human-powered vehicle includes an electric device configured to control another electric device. The electric device wirelessly communicates with the other electric device using wireless communication. However, a suitable signal transmitting manner of the wireless communication between the electric device and the other electric device depends on circumstances under which the electric device is located.

SUMMARY

In accordance with a first aspect of the present invention, a wireless communication device for a human-powered vehicle comprises a wireless communicator unit and a controller. The wireless communicator unit is configured to wirelessly communicate with at least one electric component. The controller is configured to control the wireless communicator unit to wirelessly communicate with the at least one electric component. The controller is configured to modify, in accordance with a predetermined condition, a signal transmitting manner of a signal transmitted in a predetermined period from the wireless communicator unit.

With the wireless communication device according to the first aspect, it is possible to use the signal transmitting manner which is suitable for the circumstance under which the wireless communication device is located by setting the predetermined condition. Thus, it is possible to reduce deterioration of wireless communication performance of the wireless communicator unit.

In accordance with a second aspect of the present invention, the wireless communication device according to the first aspect is configured so that the predetermined condition includes a total number of retransmission of a signal. The controller is configured to modify the signal transmitting manner in accordance with the total number of retransmission.

With the wireless communication device according to the second aspect, it is possible to reduce, by setting the geographical information, deterioration of the wireless communication performance of the wireless communicator unit under the circumstance where the wireless communicator needs to retransmit the signal.

In accordance with a third aspect of the present invention, the wireless communication device according to the first or second aspect is configured so that the predetermined condition includes geographical information. The controller is configured to modify the signal transmitting manner in accordance with the geographical information.

With the wireless communication device according to the third aspect, it is possible to reduce, by setting the geographical information, deterioration of the wireless communication performance of the wireless communicator unit under the circumstance where the wireless communication performance can be worse.

In accordance with a fourth aspect of the present invention, the wireless communication device according to the third aspect is configured so that the geographical information includes a geographical condition. The controller is configured to modify the signal transmitting manner in accordance with the geographical condition.

With the wireless communication device according to the fourth aspect, it is possible to reduce, by setting the geographical condition, deterioration of the wireless communication performance of the wireless communicator unit under the circumstance where the wireless communication performance can be worse.

In accordance with a fifth aspect of the present invention, the wireless communication device according to the third or fourth aspect is configured so that the geographical information includes a relationship between a geographical location of the wireless communicator unit and a communication state of the wireless communicator unit. The controller is configured to modify the signal transmitting manner in accordance with the relationship.

With the wireless communication device according to the fifth aspect, it is possible to reduce, by setting the relationship of the geographical information, deterioration of the wireless communication performance of the wireless communicator unit under the circumstance where the wireless communication performance can be worse.

In accordance with a sixth aspect of the present invention, the wireless communication device according to any one of the first to fifth aspects is configured so that the predetermined condition includes information indicating that ongoing transmission is being carried by another wireless communicator unit. The controller is configured to modify the signal transmitting manner in accordance with the information.

With the wireless communication device according to the sixth aspect, it is possible to reduce, using the information of the predetermined condition, deterioration of the wireless communication performance of the wireless communicator unit under the circumstance where the wireless communication performance can be worse.

In accordance with a seventh aspect of the present invention, the wireless communication device according to any one of the first to sixth aspects is configured so that the wireless communicator unit includes a first wireless communicator and a second wireless communicator. The first wireless communicator is configured to wirelessly communicate with the at least one electric component. The second wireless communicator is configured to wirelessly communicate with the at least one electric component. The signal transmitting manner includes a first signal transmitting manner and a second signal transmitting manner The controller is configured to change the signal transmitting manner, in accordance with the predetermined condition, to the first signal transmitting manner of a first signal transmitted from the first wireless communicator. The controller is configured to change the signal transmitting manner, in accordance with the predetermined condition, to the second signal transmitting manner of a second signal transmitted from the second wireless communicator.

With the wireless communication device according to the seventh aspect, it is possible to reduce, using the first signal transmitting manner and the second signal transmitting manner, deterioration of the wireless communication performance of the wireless communicator unit under the circumstance where the wireless communication performance can be worse.

In accordance with an eighth aspect of the present invention, the wireless communication device according to the seventh aspect further comprises a first antenna and a second antenna separate from the first antenna. The first wireless communicator is electrically connected to the first antenna. The second wireless communicator is electrically connected to the second antenna.

With the wireless communication device according to the eighth aspect, it is possible to realize the first signal transmitting manner and the second signal transmitting manner using the first antenna and the second antenna.

In accordance with a ninth aspect of the present invention, a wireless communication device for a human-powered vehicle comprises a first wireless communicator, a second wireless communicator, and a controller. The first wireless communicator is configured to wirelessly communicate with at least one electric component. The second wireless communicator is configured to wirelessly communicate with the at least one electric component. The controller is configured to assign, if the first wireless communicator meets a predetermined condition, the second wireless communicator to communicate with the at least one electric component.

With the wireless communication device according to the ninth aspect, it is possible to reduce, using the first wireless communicator and the second wireless communicator, deterioration of the wireless communication performance of the wireless communicator unit under the circumstance where the wireless communication performance can be worse.

In accordance with a tenth aspect of the present invention, the wireless communication device according to the ninth aspect is configured so that the predetermined condition includes a user input. The controller is configured to assign the second wireless communicator in accordance with the user input.

With the wireless communication device according to the tenth aspect, the user can select the second wireless communicator.

In accordance with an eleventh aspect of the present invention, the wireless communication device according to the ninth or tenth aspect is configured so that the predetermined condition includes channel information relating to a communication channel of at least one of the first wireless communicator and the second wireless communicator. The controller is configured to assign the second wireless communicator in accordance with the channel information.

With the wireless communication device according to the eleventh aspect, it is possible to reduce, by setting the channel information, deterioration of the wireless communication performance of the wireless communicator unit under the circumstance where the wireless communication performance can be worse.

In accordance with a twelfth aspect of the present invention, the wireless communication device according to the eleventh aspect is configured so that the channel information includes data traffic of communication of at least one of the first wireless communicator and the second wireless communicator. The controller is configured to assign the second wireless communicator in accordance with the data traffic.

With the wireless communication device according to the twelfth aspect, it is possible to reduce, by assigning the second wireless communicator based on the data traffic, deterioration of the wireless communication performance of the wireless communicator unit under the circumstance where the wireless communication performance can be worse.

In accordance with a thirteenth aspect of the present invention, the wireless communication device according to the eleventh or twelfth aspect is configured so that the channel information includes a noise on the communication channel.

With the wireless communication device according to the thirteenth aspect, it is possible to reduce, based on the noise on the communication channel, deterioration of the wireless communication performance of the wireless communicator unit under the circumstance where the wireless communication performance can be worse.

In accordance with a fourteenth aspect of the present invention, the wireless communication device according to any one of the ninth to thirteenth aspects is configured so that the predetermined condition includes a transmission time for which at least one of the first wireless communicator and the second wireless communicator transmits a signal. The controller is configured to assign the second wireless communicator in accordance with the transmission time.

With the wireless communication device according to the fourteenth aspect, it is possible to reduce, by assigning the second wireless communicator based on the transmission time, deterioration of the wireless communication performance of the wireless communicator unit under the circumstance where the wireless communication performance can be worse.

In accordance with a fifteenth aspect of the present invention, the wireless communication device according to the fourteenth aspect is configured so that the transmission time includes an interval between a plurality of signals transmitted from at least one of the first wireless communicator and the second wireless communicator.

With the wireless communication device according to the fifteenth aspect, it is possible to correctly obtain the transmission time when the at least one of the first wireless communicator and the second wireless communicator retransmits at least one signal.

In accordance with a sixteenth aspect of the present invention, the wireless communication device according to any one of the ninth to fifteenth aspects is configured so that the predetermined condition includes error information relating to one of the first wireless communicator and the second wireless communicator. The controller is configured to assign the second wireless communicator in accordance with the error information.

With the wireless communication device according to the sixteenth aspect, it is possible to reduce, using the error information, deterioration of the wireless communication performance of the wireless communicator unit under the circumstance where the wireless communication performance can be worse.

In accordance with a seventeenth aspect of the present invention, the wireless communication device according to any one of the ninth to sixteenth aspects is configured so that the first wireless communicator has a first communication capacity higher than a second communication capacity of the second wireless communicator.

With the wireless communication device according to the seventeenth aspect, it is possible to use the first communication capacity and the second communication capacity depending on the circumstance under which the wireless communication device is located.

In accordance with an eighteenth aspect of the present invention, the wireless communication device according to any one of the ninth to sixteenth aspects is configured so that the first wireless communicator has a first communication capacity similar to a second communication capacity of the second wireless communicator.

With the wireless communication device according to the eighteenth aspect, it is possible to use the first communication capacity and the second communication capacity depending on the circumstance under which the wireless communication device is located.

In accordance with a nineteenth aspect of the present invention, the wireless communication device according to any one of the ninth to eighteenth aspects further comprises a first antenna and a second antenna separate from the first antenna. The first wireless communicator is electrically connected to the first antenna. The second wireless communicator is electrically connected to the second antenna.

With the wireless communication device according to the nineteenth aspect, it is possible to use a combination of the first wireless communicator and the first antenna and a combination of the second wireless communicator and the second antenna depending on the circumstance under which the wireless communication device is located.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
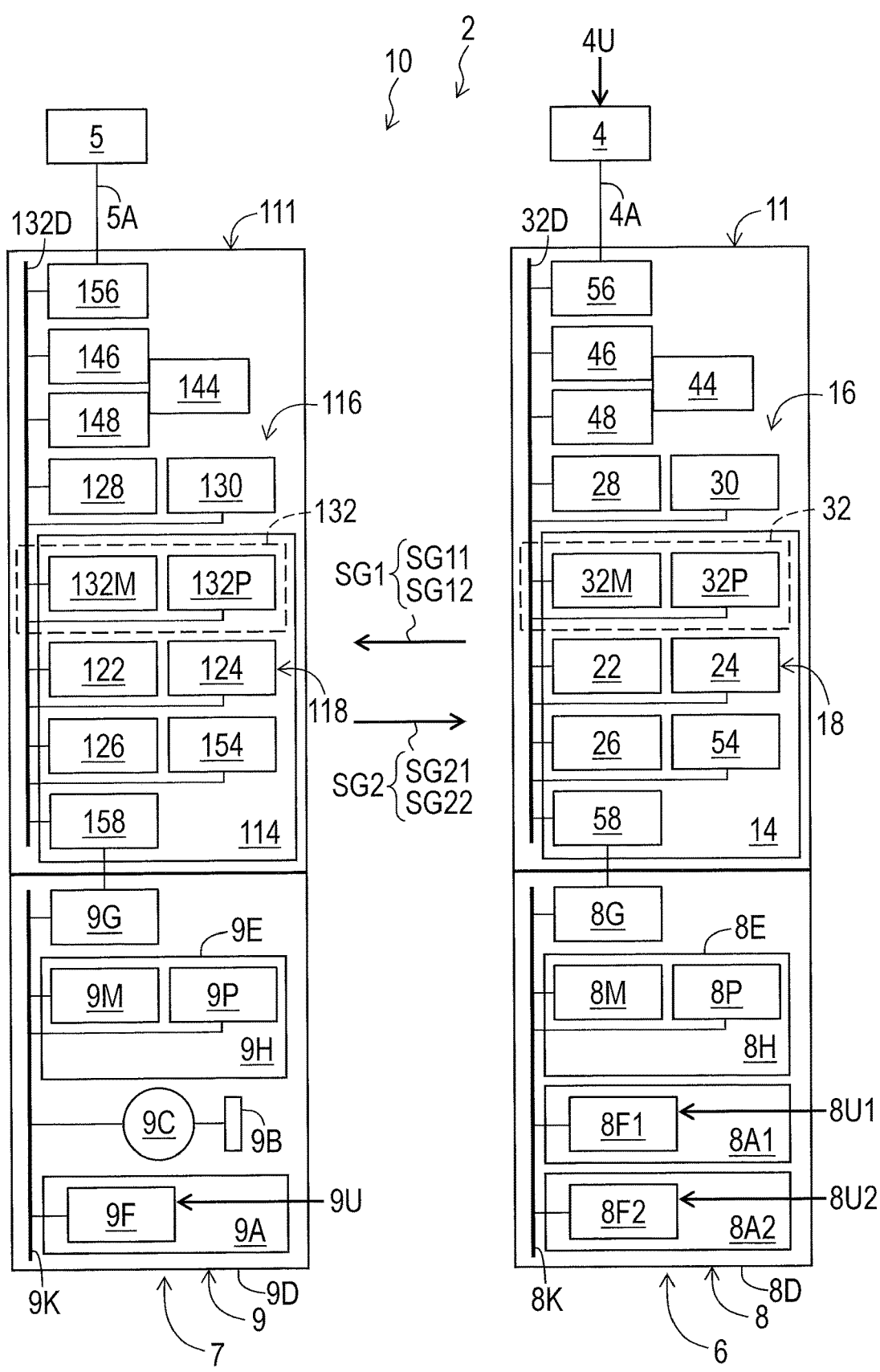
FIG. 1 is a schematic block diagram of a control system including an electrical control device in accordance with a first embodiment.

The embodiment(s) will now be described with reference to the accompanying drawings, wherein like reference numerals designate corresponding or identical elements throughout the various drawings.

First Embodiment

As seen in FIG. 1, a control system 10 for a human-powered vehicle 2 includes the electrical control device 11, the electrical control device 111, an external device 4, an external device 5, at least one electric component 6, and at least one electric component 7. The at least one electric component 6 includes an additional device 8. The at least one electric component 7 includes an additional device 9. The electrical control device 11 is configured to be electrically connected to the external device 4 via an electric cable 4A. electrical control device 11 is configured to wirelessly communicate with the at least one electric component 7. The electrical control device 111 is configured to be electrically connected to the external device 5 via an electric cable 5A. The electrical control device 111 is configured to wirelessly communicate with the at least one electric component 6. The electrical control device 11 is configured to be electrically connected to the external device 4 and the additional device 8. The electrical control device 111 is configured to be electrically connected to the external device 5 and the additional device 9.

Examples of the external device 4 include a satellite switch, a cyclocomputer, an operating device, a gear-changing device (e.g., a front derailleur, a rear derailleur), an adjustable seatpost, a suspension, a battery unit, and a light emitter. Examples of the external device 5 include a satellite switch, a cyclocomputer, an operating device, a gear-changing device (e.g., a front derailleur, a rear derailleur), an adjustable seatpost, a suspension, a battery unit, and a light emitter. In the first embodiment, the external device 4 includes a satellite switch configured to receive a user input 4U. The external device 5 includes a gear-changing device (e.g., a front derailleur). However, the external device 4 can include another device other than the satellite switch if needed and/or desired. The external device 5 can include another device other than the gear-changing device if needed and/or desired.

Examples of the additional device 8 include a satellite switch, a cyclocomputer, an operating device, a gear-changing device (e.g., a front derailleur, a rear derailleur), an adjustable seatpost, a suspension, a battery unit, and a light emitter. Examples of the additional device 9 include a satellite switch, a cyclocomputer, an operating device, a gear-changing device (e.g., a front derailleur, a rear derailleur), an adjustable seatpost, a suspension, a battery unit, and a light emitter. In the first embodiment, the additional device 8 includes an operating device. The additional device 9 includes a gear-changing device (e.g., a rear derailleur) configured to be operated via the operating device of the additional device 8. However, the additional device 8 can include another device other than the operating device if needed and/or desired. The additional device 9 can include another device other than the gear-changing device if needed and/or desired.

In the present application, the following directional terms "front," "rear," "forward," "rearward," "left," "right," "transverse," "upward" and "downward" as well as any other similar directional terms refer to those directions which are determined on the basis of a user (e.g., a rider) who is in the user's standard position (e.g., on a saddle or a seat) in the human-powered vehicle 2 with facing a handlebar or a steering. Accordingly, these terms, as utilized to describe the electrical control device 11, the electrical control device 111, or other components, should be interpreted relative to the human-powered vehicle 2 equipped with the electrical control device 11, the electrical control device 111, or other components as used in an upright riding position on a horizontal surface.

Figure 2:
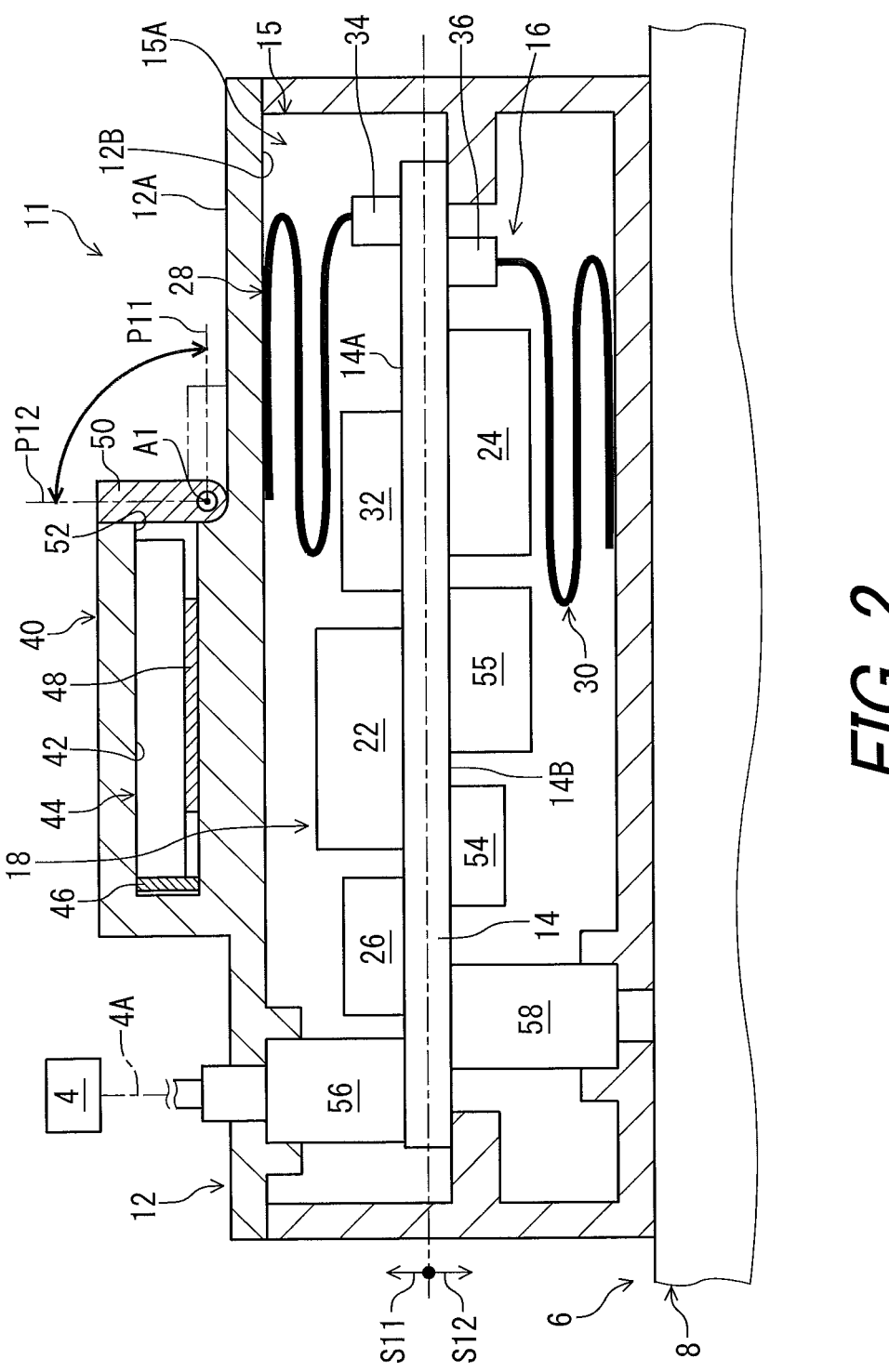
FIG. 2 is a cross-sectional view of the electrical control device illustrated in FIG. 1.

As seen in FIG. 2, the electrical control device 11 for the human-powered vehicle 2 comprises a housing 12 and a circuit board 14. The housing 12 includes an accommodating part 15. The circuit board 14 is provided in the housing 12. The circuit board 14 is provided in the accommodating part 15. The accommodating part 15 includes an accommodating space 15A. The circuit board 14 is provided in the accommodating space 15A. The housing 12 includes an outer surface 12A and an inner surface 12B. The inner surface 12B defines the accommodating space 15A. The outer surface 12A is provided on the reverse side of the inner surface 12B.

In the first embodiment, the accommodating part 15 includes an entirety of an inside of the housing 12. However, the accommodating part 15 can include a part of the inside of the housing 12 if needed and/or desired.

In the present application, a human-powered vehicle is a vehicle to travel with a motive power including at least a human power of a user who rides the human-powered vehicle (i.e., rider). The human-powered vehicle includes a various kind of bicycles such as a mountain bike, a road bike, a city bike, a cargo bike, a hand bike, and a recumbent bike. Furthermore, the human-powered vehicle includes an electric bike (E-bike). The electric bike includes an electrically assisted bicycle configured to assist propulsion of a vehicle with an electric motor. However, a total number of wheels of the human-powered vehicle is not limited to two. For example, the human-powered vehicle includes a vehicle having one wheel or three or more wheels. Especially, the human-powered vehicle does not include a vehicle that uses only an internal-combustion engine as motive power. Generally, a light road vehicle, which includes a vehicle that does not require a driver's license for a public road, is assumed as the human-powered vehicle.

The electrical control device 11 comprises a wireless communication device 16. The wireless communication device 16 for the human-powered vehicle 2 comprises a wireless communicator unit 18. The wireless communicator unit 18 is configured to wirelessly communicate with the at least one electric component 6. The wireless communicator unit 18 includes a first wireless communicator 22 and a second wireless communicator 24. Namely, the wireless communication device 16 for the human-powered vehicle 2 comprises the first wireless communicator 22 and the second wireless communicator 24.

The first wireless communicator 22 is configured to wirelessly communicate with the at least one electric component 6. The first wireless communicator 22 can also be referred to as a wireless communicator 22. Namely, the electrical control device 11 for the human-powered vehicle 2 comprises the wireless communicator 22.

The second wireless communicator 24 is configured to wirelessly communicate with the at least one electric component 6. The second wireless communicator 24 can also be referred to as a wireless communicator 24. Namely, the electrical control device 11 for the human-powered vehicle 2 comprises the wireless communicator 24.

The first wireless communicator 22 has a first communication capacity CC11 (see e.g., FIG. 4) higher than a second communication capacity CC12 (see e.g., FIG. 4) of the second wireless communicator 24. For example, the first communication capacity CC11 includes at least one of a first bit rate and a first receiving sensitivity of the first wireless communicator 22. The second communication capacity CC12 includes at least one of a second bit rate and a second receiving sensitivity of the second wireless communicator 24. The first bit rate is higher than the second bit rate. The first receiving sensitivity is higher than the second receiving sensitivity. However, the first communication capacity CC11 of the first wireless communicator 22 can be equal to or lower than the second communication capacity CC12 of the second wireless communicator 24 if needed and/or desired. The first wireless communicator 22 can have a first communication capacity similar to a second communication capacity of the second wireless communicator 24. The first bit rate can be equal to or lower than the second bit rate if needed and/or desired. The first receiving sensitivity can be equal to or lower than the second receiving sensitivity if needed and/or desired.

As seen in FIG. 1, the wireless communication device 16 further comprises a first antenna 26. Namely, the electrical control device 11 for the human-powered vehicle 2 comprises the first antenna 26.

The first wireless communicator 22 is electrically connected to the first antenna 26. The wireless communicator 22 is electrically connected to the circuit board 14. The first antenna 26 is configured to be electrically connected to the circuit board 14. The wireless communicator 22 is electrically connected to the first antenna 26 via the circuit board 14. The first antenna 26 can also be referred to as an antenna 26. Namely, the electrical control device 11 for the human-powered vehicle 2 comprises the antenna 26. The antenna 26 is configured to be electrically connected to the circuit board 14.

The first antenna 26 is configured to communicate with the at least one electric component 7. The first wireless communicator 22 is configured to wirelessly communicate with the at least one electric component 7 via the first antenna 26.

The wireless communication device 16 further comprises a second antenna 28. Namely, the electrical control device 11 for the human-powered vehicle 2 comprises the second antenna 28.

The second antenna 28 is separate from the first antenna 26. The second wireless communicator 24 is electrically connected to the second antenna 28. The wireless communicator 24 is electrically connected to the circuit board 14. The second antenna 28 is configured to be electrically connected to the circuit board 14. The wireless communicator 24 is electrically connected to the second antenna 28 via the circuit board 14. The second antenna 28 can also be referred to as an antenna 28. Namely, the electrical control device 11 for the human-powered vehicle 2 comprises the antenna 28. The antenna 28 is configured to be electrically connected to the circuit board 14.

The second antenna 28 is configured to communicate with the at least one electric component 7. The second wireless communicator 24 is configured to wirelessly communicate with the at least one electric component 7 via the second antenna 28.

The wireless communication device 16 further comprises a second antenna 30. Namely, the electrical control device 11 for the human-powered vehicle 2 comprises the second antenna 30.

The second antenna 30 is separate from the first antenna 26. The second wireless communicator 24 is electrically connected to the second antenna 30. The wireless communicator 24 is electrically connected to the circuit board 14. The second antenna 30 is configured to be electrically connected to the circuit board 14. The wireless communicator 24 is electrically connected to the second antenna 30 via the circuit board 14. The second antenna 30 can also be referred to as an antenna 30. Namely, the electrical control device 11 for the human-powered vehicle 2 comprises the antenna 30. The antenna 30 is configured to be electrically connected to the circuit board 14.

The second antenna 30 is configured to communicate with the at least one electric component 7. The second wireless communicator 24 is configured to wirelessly communicate with the at least one electric component 7 via the second antenna 30.

As seen in FIG. 2, the first antenna 26 is disposed in a first position defined on the circuit board 14. The second antenna 28 is disposed in a second position different from the first position. The second position of the second antenna 28 is disposed in the accommodating part 15 on a position other than the circuit board 14. The second antenna 30 is disposed in a second position different from the first position. The second position of the second antenna 30 is disposed in the accommodating part 15 on a position other than the circuit board 14.

The second antenna 28 is at least partially provided on at least one of the inner surface 12B and the outer surface 12A of the housing 12. The antenna 28 is at least partially provided on at least one of the inner surface 12B and outer surface 12A of the housing 12. In the first embodiment, the antenna 28 is partially provided on the inner surface 12B of the housing 12. The second antenna 28 is partially provided on the inner surface 12B of the housing 12. However, the antenna 28 can be at least partially provided on only the inner surface 12B of the housing 12, only the outer surface 12A of the housing 12, and both the inner surface 12B and outer surface 12A of the housing 12.

The second antenna 30 is at least partially provided on at least one of the inner surface 12B and the outer surface 12A of the housing 12. The antenna 30 is at least partially provided on at least one of the inner surface 12B and outer surface 12A of the housing 12. In the first embodiment, the antenna 30 is partially provided on the inner surface 12B of the housing 12. The second antenna 30 is partially provided on the inner surface 12B of the housing 12. However, the antenna 30 can be at least partially provided on only the inner surface 12B of the housing 12, only the outer surface 12A of the housing 12, and both the inner surface 12B and outer surface 12A of the housing 12.

The circuit board 14 has a first surface 14A and a second surface 14B provided on a reverse side of the first surface 14A. The first position is defined on the first surface 14A of the circuit board 14. The second position of the second antenna 28 is defined in a position other than the second surface 14B of the circuit board 14. The second position of the second antenna 30 is defined in a position other than the second surface 14B of the circuit board 14. The first antenna 26 is disposed on the first surface 14A of the circuit board 14. However, the first position can be defined in a position other than the first surface 14A if needed and/or desired. The second position can be defined on the first surface 14A or the second surface 14B if needed and/or desired.

The first wireless communicator 22 is disposed on one of the first surface 14A and the second surface 14B of the circuit board 14. The wireless communicator 22 is disposed on one of the first surface 14A and the second surface 14B of the circuit board 14. The wireless communicator 22 is disposed on the first surface 14A. However, the wireless communicator 22 can be disposed on the second surface 14B if needed and/or desired.

The second wireless communicator 24 is disposed on one of the first surface 14A and the second surface 14B of the circuit board 14. The wireless communicator 24 is disposed on one of the first surface 14A and the second surface 14B of the circuit board 14. The wireless communicator 24 is disposed on the second surface 14B of the circuit board 14. However, the wireless communicator 24 can be disposed on the first surface 14A if needed and/or desired.

In the first embodiment, the second antenna 28 is at least partially printed on the inner surface 12B of the housing 12. The second antenna 30 is at least partially printed on the inner surface 12B of the housing 12. The second antenna 28 is partially printed on the inner surface 12B of the housing 12. the second antenna 30 is partially printed on the inner surface 12B of the housing 12. However, the second antenna 28 can be entirely printed on the inner surface 12B of the housing 12 if needed and/or desired. The second antenna 30 can be entirely printed on the inner surface 12B of the housing 12 if needed and/or desired. The structures of the second antennas 28 and 30 are not limited to the printed antenna.

The wireless communication device 16 for the human-powered vehicle 2 comprises a controller 32. Namely, the electrical control device 11 for the human-powered vehicle 2 comprises the controller 32. The controller 32 is configured to control the wireless communicator to wirelessly communicate with the at least one electric component 6. The controller 32 is electrically connected to the circuit board 14. The controller 32 is electrically mounted on the circuit board 14.

The controller 32 is disposed on one of the first surface 14A and the second surface 14B of the circuit board 14. The controller 32 is disposed on the second surface 14B. However, the controller 32 can be disposed on the first surface 14A if needed and/or desired.

As seen in FIG. 1, the controller 32 includes a processor 32P, a memory 32M, and a bus 32D. The processor 32P and the memory 32M are electrically mounted on the circuit board 14. The processor 32P and the memory 32M are electrically connected to the circuit board 14 via the bus 32D. The processor 32P is electrically connected to the memory 32M via the circuit board 14 and the bus 32D.

For example, the processor 32P includes at least one of a central processing unit (CPU), a micro processing unit (MPU), and a memory controller. The memory 32M is electrically connected to the processor 32P. For example, the memory 32M includes at least one of a volatile memory and a non-volatile memory. Examples of the volatile memory include a random-access memory (RAM) and a dynamic random-access memory (DRAM). Examples of the non-volatile memory include a read only memory (ROM) and an electrically erasable programmable ROM. The memory 32M includes storage areas each having an address in the ROM and the RAM. The processor 32P is configured to control the memory 32M to store data in the storage areas of the memory 32M and reads data from the storage areas of the memory 32M. The processor 32P can also be referred to as a hardware processor 32P. The memory 32M can also be referred to as a hardware memory 32M. The memory 32M can also be referred to as a computer-readable storage medium 32M.

The controller 32 is programed to execute at least one control algorithm of the electrical control device 11. The memory 32M (e.g., the ROM) stores at least one program including at least one program instructions. The at least one program is read into the processor 32P, and thereby the at least one control algorithm of the electrical control device 11 is executed based on the at least one program. The controller 32 can also be referred to as a control circuit or circuitry 32. The controller 32 can also be referred to as a hardware controller 32.

The structure of the controller 32 is not limited to the above structure. The structure of the 32 is not limited to the processor 32P, the memory 32M, and the bus 32D. The controller 32 can be realized by hardware alone or a combination of hardware and software. The processor 32P and the memory 32M can be integrated as a one-chip integrated circuit such as an application specific integrated circuit (ASIC) or a field programmable gate array (FPGA).

The wireless communicator 22 is electrically connected to the processor 32P and the memory 32M with the circuit board 14 and the bus 32D. The wireless communicator 22 includes a signal transmitting circuit or circuitry and a signal receiving circuit or circuitry. Thus, the wireless communicator 22 can also be referred to as a wireless communicator circuit or circuitry 22.

The wireless communicator 22 is configured to superimpose digital signals on carrier wave using a predetermined wireless communication protocol to wirelessly transmit signals. In the first embodiment, the wireless communicator 22 is configured to encrypt signals using a cryptographic key to generate encrypted wireless signals. The wireless communicator 22 is configured to transmit wireless signals via the antenna 26.

The wireless communicator 22 is configured to receive wireless signals via the antenna 26. In the first embodiment, the wireless communicator 22 is configured to decode the wireless signals to recognize signals transmitted from other wireless communicators. The wireless communicator 22 is configured to decrypt the wireless signals using the cryptographic key.

The wireless communicator 24 is electrically connected to the processor 32P and the memory 32M with the circuit board 14 and the bus 32D. The wireless communicator 24 includes a signal transmitting circuit or circuitry and a signal receiving circuit or circuitry. Thus, the wireless communicator 24 can also be referred to as a wireless communicator circuit or circuitry 24.

The wireless communicator 24 is configured to superimpose digital signals on carrier wave using a predetermined wireless communication protocol to wirelessly transmit signals. In the first embodiment, the wireless communicator 24 is configured to encrypt signals using a cryptographic key to generate encrypted wireless signals. The wireless communicator 24 is configured to transmit wireless signals via the antenna 28 and/or 30.

The wireless communicator 24 is configured to receive wireless signals via the antenna 28 and/or 30. In the first embodiment, the wireless communicator 24 is configured to decode the wireless signals to recognize signals transmitted from other wireless communicators. The wireless communicator 24 is configured to decrypt the wireless signals using the cryptographic key.

As seen in FIG. 2, the electrical control device 11 further comprises a connecting part 34. The connecting part 34 is configured to electrically connect the circuit board 14 and the second antenna 28. Examples of the connecting part 34 include a solder.

The electrical control device 11 further comprises a connecting part 36. The connecting part 36 is configured to electrically connect the circuit board 14 and the second antenna 30. Examples of the connecting part 36 include a solder.

The housing 12 includes a power-supply accommodating part 40 including a power-supply accommodating space 42 in which a power supply 44 is accommodated. The power-supply accommodating part 40 is electrically connected to the circuit board 14. The power-supply accommodating part 40 is electrically connected to the wireless communicators 22 and 24 via the circuit board 14. The power-supply accommodating part 40 includes a positive terminal 46 and a negative terminal 48 which are made of a metallic material. The positive terminal 46 and the negative terminal 48 are provided in the power-supply accommodating space 42 to be contactable with the power supply 44 in a state where the power supply 44 is accommodated in the power-supply accommodating space 42. Examples of the power supply 44 include a primary battery (e.g., a coin battery, a dry-cell battery), a secondary battery, and a capacitor.

The power-supply accommodating part 40 is not limited to the illustrated embodiment. The power-supply accommodating part 40 can have shapes other than the shape depicted in FIG. 2 if needed and/or desired. The power-supply accommodating part 40 can be provided in the accommodating space 15A of the accommodating part 15 if needed and/or desired.

In the first embodiment, the power-supply accommodating part 40 is provided on the circuit board 14. The power-supply accommodating part 40 is provided in a third position defined on a first side S11 of the circuit board 14. The power-supply accommodating part 40 is provided in the third position other than the circuit board 14. The first surface 14A is provided on the first side S11 of the circuit board 14. The second surface 14B is provided on a second side S12 of the circuit board 14. The second side S12 is disposed on a reverse side of the first side S11 with respect to the circuit board 14.

However, the power-supply accommodating part 40 can be provided at a position other than the third position if needed and/or desired. The power-supply accommodating part 40 can be provided on the circuit board 14 if needed and/or desired. The power-supply accommodating part 40 can be provided on one of the first surface 14A and the second surface 14B if needed and/or desired. The power-supply accommodating part 40 can be provided on the second side S12 with respect to the circuit board 14 if needed and/or desired.

The electrical control device 11 further comprises an attachment member 50. The attachment member 50 is movably coupled to the power-supply accommodating part 40. The attachment member 50 is movable relative to the power-supply accommodating part 40 between an open position P11 and a closed position P12. In the first embodiment, the attachment member 50 is pivotally coupled to the power-supply accommodating part 40 about a pivot axis A1. The attachment member 50 is pivotable relative to the power-supply accommodating part 40 between the open position P11 and the closed position P12.

The power-supply accommodating part 40 includes an insertion opening 52. The insertion opening 52 is in communication with the power-supply accommodating space 42. The attachment member 50 is configured to cover the insertion opening 52 in the open state where the attachment member 50 is in the open position P11. The attachment member 50 is configured not to cover the insertion opening 52 in the closed state where the attachment member 50 is in the closed position P12.

The attachment member 50 is configured to allow the power supply 44 to be removed from the power-supply accommodating part 40 in an open state where the attachment member 50 is in the open position P11. The attachment member 50 is configured to close the insertion opening 52 in a closed state where the attachment member 50 is in the closed position P12. The power supply 44 can also be referred to as a removable power supply 44. The attachment member 50 is configured to allow the removable power supply 44 to be removed from the power-supply accommodating part 40 in the open state where the attachment member 50 is in the open position P11.

The electrical control device 11 further comprises an indicator 54. The indicator 54 is configured to indicate a status of the electrical control device 11. In the first embodiment, the indicator 54 is provided on the second surface 14B of the circuit board 14. However, the indicator 54 can be provided on the first surface 14A or a part other than the circuit board 14. Examples of the indicator 54 include a light emitting diode (LED). Examples of a status of the electrical control device 11 include a pairing state of at least one of the wireless communicators 22 and 24, a communication state (a communication state of a gear-changing signal) of at least one of the wireless communicators 22 and 24, and a remaining level of the power supply 44. For example, the housing 12 includes a light guiding part configured to guide light emitted from the indicator 54 to an outside of the housing 12.

The electrical control device 11 further comprises a position sensor 55. The position sensor 55 is configured to obtain a geographical location of the electrical control device 11. The position sensor 55 is electrically connected to the controller 32 via the circuit board 14. Examples of the position sensor 55 includes a global positioning system (GPS) circuit. In the first embodiment, the position sensor 55 is provided on the second surface 14B of the circuit board 14. However, the position sensor 55 can be provided on the first surface 14A or a part other than the circuit board 14.

As seen in FIG. 2, the electrical control device 11 further comprises a connector 56. The connector 56 is disposed on the circuit board 14. The connector 56 is configured to be electrically connected to the external device 4. The connector 56 is configured to be electrically connected to the electric cable 4A. The connector 56 is configured to be electrically connected to the external device 4 via the electric cable 4A. The connector 56 is electrically connected to the circuit board 14. The connector 56 is electrically connected to the wireless communicator via the circuit board 14. In the first embodiment, the connector 56 is provided on the circuit board 14. The connector 56 is provided on the first surface 14A of the circuit board 14. However, the connector 56 can be provided on a surface other than the first surface 14A if needed and/or desired. The connector 56 can be provided on a part other than the circuit board 14 if needed and/or desired.

The electrical control device 11 further comprises a connector 58. The connector 58 is disposed on the circuit board 14. The connector 58 is configured to be electrically connected to the additional device 8. The connector 58 is electrically connected to the circuit board 14. The connector 58 is electrically connected to the wireless communicator via the circuit board 14. In the first embodiment, the connector 58 is provided on the circuit board 14. The connector 58 is provided on the second surface 14B of the circuit board 14. However, the connector 58 can be provided on a surface other than the second surface 14B if needed and/or desired. The connector 58 can be provided on a part other than the circuit board 14 if needed and/or desired.

As seen in FIG. 2, the housing 12 is configured to be detachably attached to the additional device 8. The housing 12 is configured to be detachably and reattachably coupled to the additional device 8.

The term "detachably" and/or "reattachably," as used herein, encompasses a configuration in which an element is repeatedly detachable from and reattachable to another element without substantial damage. The above concept can be applied to their derivatives such as "detachable" and "reattachable."

As seen in FIG. 1, the additional device 8 includes at least one of an operating member and an operated member. In the first embodiment, the additional device 8 includes an operating member 8A1, an operating member 8A2, a base body 8D, and an additional controller 8E. The base body 8D is configured to be detachably attached to the housing 12 of the electrical control device 11 with a coupling member such as a fastener (e.g., a screw) and a latch structure. The operating member 8A1 is movably coupled to the base body 8D. The operating member 8A1 is configured to receive a user input 8U1. The operating member 8A2 is movably coupled to the base body 8D. The operating member 8A2 is configured to receive a user input 8U2.

The additional controller 8E is configured to generate a signal in response to the user input 8U1 received by the operating member 8A1. The operating member 8A1 includes a switch 8F1. The switch 8F1 is configured to be activated in response to the user input 8U1. The additional controller 8E is configured to generate the signal in response to the activation of the switch 8F1. For example, the user input 8U1 indicates upshifting of the additional device 9 in a case where the additional device 9 includes a gear-changing device.

The additional controller 8E is configured to generate a signal in response to the user input 8U2 received by the operating member 8A2. The operating member 8A2 includes a switch 8F2. The switch 8F2 is configured to be activated in response to the user input 8U2. The additional controller 8E is configured to generate the signal in response to the activation of the switch 8F2. For example, the user input 8U2 indicates downshifting of the additional device 9 in a case where the additional device 9 includes a gear-changing device.

The additional device 8 includes an additional connector 8G. The additional connector 8G is configured to be detachably connected to the connector 58 of the electrical control device 11. The additional connector 8G is electrically connected to the additional controller 8E. The additional controller 8E is configured to be electrically connected to the controller 32 of the electrical control device 11 via the connector 58 and the additional connector 8G. The controller 32 is configured to control the wireless communicator unit 18 to wirelessly transmit the signal to the electrical control device 111.

The additional controller 8E includes a processor 8P, a memory 8M, a circuit board 8H, and a bus 8K. The processor 8P and the memory 8M are electrically mounted on the circuit board 8H. The processor 8P and the memory 8M are electrically connected to the circuit board 8H via the bus 8K. The processor 8P is electrically connected to the memory 8M via the circuit board 8H and the bus 8K.

For example, the processor 8P includes at least one of a CPU, a MPU, and a memory controller. The memory 8M is electrically connected to the processor 8P. For example, the memory 8M includes at least one of a volatile memory and a non-volatile memory. Examples of the volatile memory include a RAM and a DRAM. Examples of the non-volatile memory include a ROM and an electrically erasable programmable ROM. The memory 8M includes storage areas each having an address in the ROM and the RAM. The processor 8P is configured to control the memory 8M to store data in the storage areas of the memory 8M and reads data from the storage areas of the memory 8M. The processor 8P can also be referred to as a hardware processor 8P. The memory 8M can also be referred to as a hardware memory 8M. The memory 8M can also be referred to as a computer-readable storage medium 8M.

The additional controller 8E is programed to execute at least one control algorithm of the electrical control device 11. The memory 8M (e.g., the ROM) stores at least one program including at least one program instructions. The at least one program is read into the processor 8P, and thereby the at least one control algorithm of the electrical control device 11 is executed based on the at least one program. The additional controller 8E can also be referred to as a control circuit or circuitry 8E. The additional controller 8E can also be referred to as a hardware additional controller 8E.

The structure of the additional controller 8E is not limited to the above structure. The structure of the 32 is not limited to the processor 8P, the memory 8M, and the bus 8K. The additional controller 8E can be realized by hardware alone or a combination of hardware and software. The processor 8P and the memory 8M can be integrated as a one-chip integrated circuit such as an ASIC or a FPGA.

Figure 3:
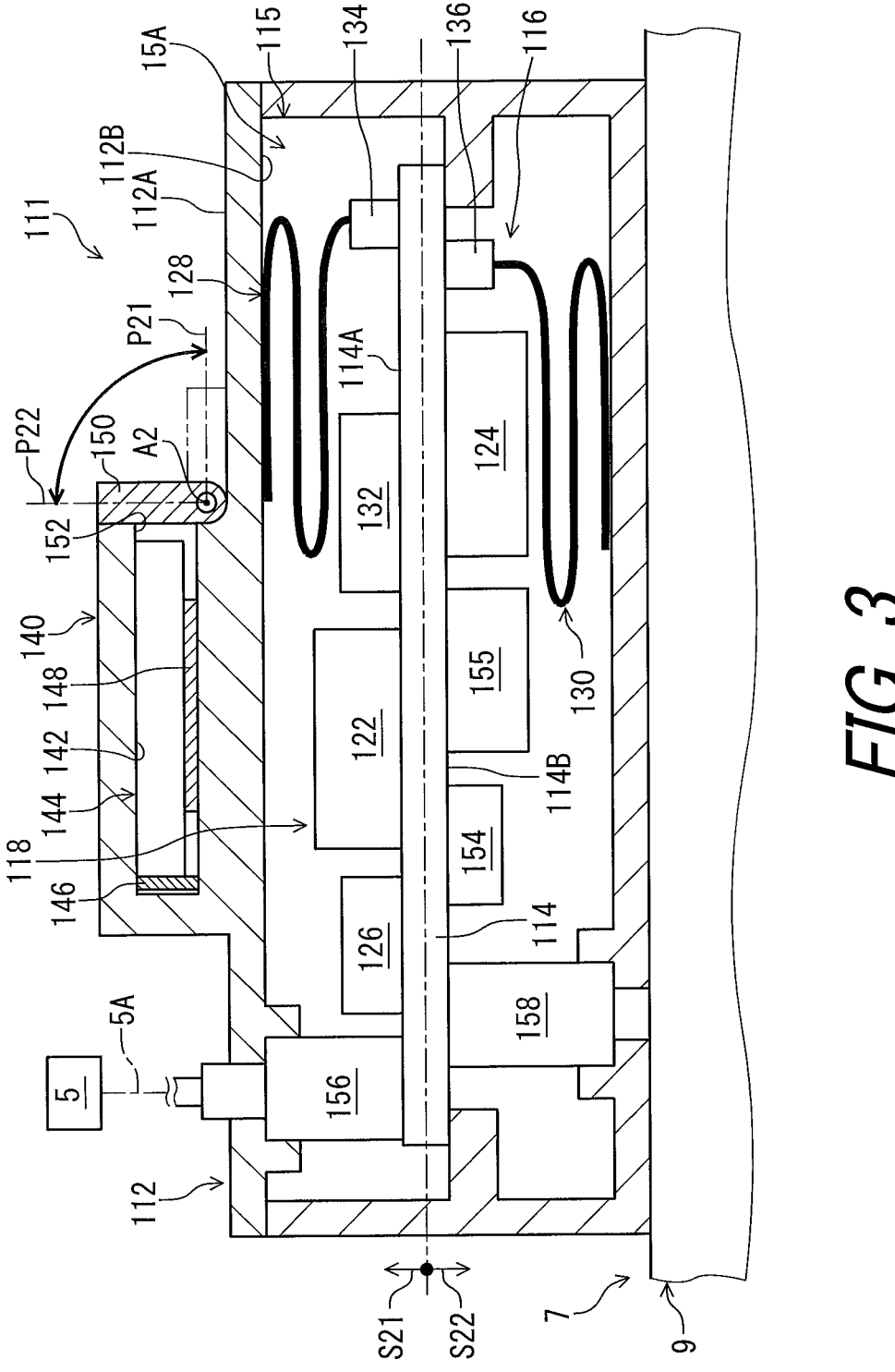
FIG. 3 is a cross-sectional view of an additional electrical control device illustrated in FIG. 1.

As seen in FIGS. 1 and 3, the electrical control device 111 has substantially the same structure as the structure of the electrical control device 11. Thus, the description of the electrical control device 11 can be utilized as the description of the electrical control device 111 by adding "1" to the reference numerals used for the electrical control device 11. The description of the elements of the electrical control device 111 will not be described here for the sake of brevity.

As seen in FIG. 3, the electrical control device 111 for the human-powered vehicle 2 comprises a housing 112 and a circuit board 114. The housing 112 includes an accommodating part 115. The circuit board 114 is provided in the housing 112. The circuit board 114 is provided in the accommodating part 115. The accommodating part 115 includes an accommodating space 115A. The circuit board 114 is provided in the accommodating space 115A. The housing 112 includes an outer surface 112A and an inner surface 112B. The inner surface 112B defines the accommodating space 115A. The outer surface 112A is provided on the reverse side of the inner surface 112B.

In the first embodiment, the accommodating part 115 includes an entirety of an inside of the housing 112. However, the accommodating part 115 can include a part of the inside of the housing 112 if needed and/or desired.

The electrical control device 111 comprises a wireless communication device 116. The wireless communication device 116 for the human-powered vehicle 2 comprises a wireless communicator unit 118. The wireless communicator unit 118 is configured to wirelessly communicate with the at least one electric component 7. The wireless communicator unit 118 includes a first wireless communicator 122 and a second wireless communicator 124. Namely, the wireless communication device 116 for the human-powered vehicle 2 comprises the first wireless communicator 122 and the second wireless communicator 124.

The first wireless communicator 122 is configured to wirelessly communicate with the at least one electric component 7. The first wireless communicator 122 can also be referred to as a wireless communicator 122. Namely, the electrical control device 111 for the human-powered vehicle 2 comprises the wireless communicator 122.

The second wireless communicator 124 is configured to wirelessly communicate with the at least one electric component 7. The second wireless communicator 124 can also be referred to as a wireless communicator 124. Namely, the electrical control device 111 for the human-powered vehicle 2 comprises the wireless communicator 124.

The first wireless communicator 122 has a first communication capacity CC21 (see e.g., FIG. 4) higher than a second communication capacity CC22 (see e.g., FIG. 4) of the second wireless communicator 124. For example, the first communication capacity CC21 includes at least one of a first bit rate and a first receiving sensitivity of the first wireless communicator 122. The second communication capacity CC22 includes at least one of a second bit rate and a second receiving sensitivity of the second wireless communicator 124. The first bit rate is higher than the second bit rate. The first receiving sensitivity is higher than the second receiving sensitivity. However, the first communication capacity CC21 of the first wireless communicator 122 can be equal to or lower than the second communication capacity CC22 of the second wireless communicator 124 if needed and/or desired. The first wireless communicator 122 can have a first communication capacity similar to a second communication capacity of the second wireless communicator 124. The first bit rate can be equal to or lower than the second bit rate if needed and/or desired. The first receiving sensitivity can be equal to or lower than the second receiving sensitivity if needed and/or desired.

As seen in FIG. 1, the wireless communication device 116 further comprises a first antenna 126. Namely, the electrical control device 111 for the human-powered vehicle 2 comprises the first antenna 126.

The first wireless communicator 122 is electrically connected to the first antenna 126. The wireless communicator 122 is electrically connected to the circuit board 114. The first antenna 126 is configured to be electrically connected to the circuit board 114. The wireless communicator 122 is electrically connected to the first antenna 126 via the circuit board 114. The first antenna 126 can also be referred to as an antenna 126. Namely, the electrical control device 111 for the human-powered vehicle 2 comprises the antenna 126. The antenna 126 is configured to be electrically connected to the circuit board 114.

The first antenna 126 is configured to communicate with the at least one electric component 7. The first wireless communicator 122 is configured to wirelessly communicate with the at least one electric component 7 via the first antenna 126.

The wireless communication device 116 further comprises a second antenna 128. Namely, the electrical control device 111 for the human-powered vehicle 2 comprises the second antenna 128.

The second antenna 128 is separate from the first antenna 126. The second wireless communicator 124 is electrically connected to the second antenna 128. The wireless communicator 124 is electrically connected to the circuit board 114. The second antenna 128 is configured to be electrically connected to the circuit board 114. The wireless communicator 124 is electrically connected to the second antenna 128 via the circuit board 114. The second antenna 128 can also be referred to as an antenna 128. Namely, the electrical control device 111 for the human-powered vehicle 2 comprises the antenna 128. The antenna 128 is configured to be electrically connected to the circuit board 114.

The second antenna 128 is configured to communicate with the at least one electric component 7. The second wireless communicator 124 is configured to wirelessly communicate with the at least one electric component 7 via the second antenna 128.

The wireless communication device 116 further comprises a second antenna 130. Namely, the electrical control device 111 for the human-powered vehicle 2 comprises the second antenna 130.

The second antenna 130 is separate from the first antenna 126. The second wireless communicator 124 is electrically connected to the second antenna 130. The wireless communicator 124 is electrically connected to the circuit board 114. The second antenna 130 is configured to be electrically connected to the circuit board 114. The wireless communicator 124 is electrically connected to the second antenna 130 via the circuit board 114. The second antenna 130 can also be referred to as an antenna 130. Namely, the electrical control device 111 for the human-powered vehicle 2 comprises the antenna 130. The antenna 130 is configured to be electrically connected to the circuit board 114.

The second antenna 130 is configured to communicate with the at least one electric component 7. The second wireless communicator 124 is configured to wirelessly communicate with the at least one electric component 7 via the second antenna 130.

As seen in FIG. 3, the first antenna 126 is disposed on a first position on the circuit board 114. The second antenna 128 is disposed in a second position different from the first position. The second position of the second antenna 128 is disposed in the accommodating part 115 on a position other than the circuit board 114. The second antenna 130 is disposed in a second position different from the first position. The second position of the second antenna 130 is disposed in the accommodating part 115 on a position other than the circuit board 114.

The second antenna 128 is at least partially provided on at least one of the inner surface 112B and the outer surface 112A of the housing 112. The antenna 128 is at least partially provided on at least one of the inner surface 112B and outer surface 112A of the housing 112. In the first embodiment, the antenna 128 is partially provided on the inner surface 112B of the housing 112. The second antenna 128 is partially provided on the inner surface 112B of the housing 112. However, the antenna 128 can be at least partially provided on only the inner surface 112B of the housing 112, only the outer surface 112A of the housing 112, and both the inner surface 112B and outer surface 112A of the housing 112.

The second antenna 130 is at least partially provided on at least one of the inner surface 112B and the outer surface 112A of the housing 112. The antenna 130 is at least partially provided on at least one of the inner surface 112B and outer surface 112A of the housing 112. In the first embodiment, the antenna 130 is partially provided on the inner surface 112B of the housing 112. The second antenna 130 is partially provided on the inner surface 112B of the housing 112. However, the antenna 130 can be at least partially provided on only the inner surface 112B of the housing 112, only the outer surface 112A of the housing 112, and both the inner surface 112B and outer surface 112A of the housing 112.

The circuit board 114 has a first surface 114A and a second surface 114B provided on a reverse side of the first surface 114A. The first position is defined on the first surface 114A of the circuit board 114. The second position is defined on a position other than the second surface 114B of the circuit board 114. However, the first position can be defined on a position other than the first surface 114A if needed and/or desired. The second position can be defined on the first surface 114A or the second surface 114B if needed and/or desired.

The first wireless communicator 122 is disposed on one of the first surface 114A and the second surface 114B of the circuit board 114. The wireless communicator 122 is disposed on one of the first surface 114A and the second surface 114B of the circuit board 114. The wireless communicator 122 is disposed on the first surface 114A. However, the wireless communicator 122 can be disposed on the second surface 114B if needed and/or desired.

The second wireless communicator 124 is disposed on one of the first surface 114A and the second surface 114B of the circuit board 114. The wireless communicator 124 is disposed on one of the first surface 114A and the second surface 114B of the circuit board 114. The wireless communicator 124 is disposed on the second surface 114B of the circuit board 114. However, the wireless communicator 124 can be disposed on the first surface 114A if needed and/or desired.

In the first embodiment, the second antenna 128 is at least partially printed on the inner surface 112B of the housing 112. The second antenna 130 is at least partially printed on the inner surface 112B of the housing 112. The second antenna 128 is partially printed on the inner surface 112B of the housing 112. the second antenna 130 is partially printed on the inner surface 112B of the housing 112. However, the second antenna 128 can be entirely printed on the inner surface 112B of the housing 112 if needed and/or desired. The second antenna 130 can be entirely printed on the inner surface 112B of the housing 112 if needed and/or desired. The structures of the second antennas 28 and 30 are not limited to the printed antenna.

The wireless communication device 116 for the human-powered vehicle 2 comprises a controller 132. Namely, the electrical control device 111 for the human-powered vehicle 2 comprises the controller 132. The controller 132 is configured to control the wireless communicator to wirelessly communicate with the at least one electric component 7. The controller 132 is electrically connected to the circuit board 114. The controller 132 is electrically mounted on the circuit board 114.

The controller 132 is disposed on one of the first surface 114A and the second surface 114B of the circuit board 114. The controller 132 is disposed on the second surface 114B. However, the controller 132 can be disposed on the first surface 114A if needed and/or desired.

As seen in FIG. 1, the controller 132 includes a processor 132P, a memory 132M, and a bus 132D. The processor 132P and the memory 132M are electrically mounted on the circuit board 114. The processor 132P and the memory 132M are electrically connected to the circuit board 114 via the bus 132D. The processor 132P is electrically connected to the memory 132M via the circuit board 114 and the bus 132D.

For example, the processor 132P includes at least one of a central processing unit (CPU), a micro processing unit (MPU), and a memory controller. The memory 132M is electrically connected to the processor 132P. For example, the memory 132M includes at least one of a volatile memory and a non-volatile memory. Examples of the volatile memory include a random-access memory (RAM) and a dynamic random-access memory (DRAM). Examples of the non-volatile memory include a read only memory (ROM) and an electrically erasable programmable ROM. The memory 132M includes storage areas each having an address in the ROM and the RAM. The processor 132P is configured to control the memory 132M to store data in the storage areas of the memory 132M and reads data from the storage areas of the memory 132M. The processor 132P can also be referred to as a hardware processor 132P. The memory 132M can also be referred to as a hardware memory 132M. The memory 132M can also be referred to as a computer-readable storage medium 132M.

The controller 132 is programed to execute at least one control algorithm of the electrical control device 111. The memory 132M (e.g., the ROM) stores at least one program including at least one program instructions. The at least one program is read into the processor 132P, and thereby the at least one control algorithm of the electrical control device 111 is executed based on the at least one program. The controller 132 can also be referred to as a control circuit or circuitry 132. The controller 132 can also be referred to as a hardware controller 132.

The structure of the controller 132 is not limited to the above structure. The structure of the 132 is not limited to the processor 132P, the memory 132M, and the bus 132D. The controller 132 can be realized by hardware alone or a combination of hardware and software. The processor 132P and the memory 132M can be integrated as a one-chip integrated circuit such as an application specific integrated circuit (ASIC) or a field programmable gate array (FPGA).

The wireless communicator 122 is electrically connected to the processor 132P and the memory 132M with the circuit board 114 and the bus 132D. The wireless communicator 122 includes a signal transmitting circuit or circuitry and a signal receiving circuit or circuitry. Thus, the wireless communicator 122 can also be referred to as a wireless communicator circuit or circuitry 22.

The wireless communicator 122 is configured to superimpose digital signals on carrier wave using a predetermined wireless communication protocol to wirelessly transmit signals. In the first embodiment, the wireless communicator 122 is configured to encrypt signals using a cryptographic key to generate encrypted wireless signals. The wireless communicator 122 is configured to transmit wireless signals via the antenna 126.

The wireless communicator 122 is configured to receive wireless signals via the antenna 126. In the first embodiment, the wireless communicator 122 is configured to decode the wireless signals to recognize signals transmitted from other wireless communicators. The wireless communicator 122 is configured to decrypt the wireless signals using the cryptographic key.

The wireless communicator 124 is electrically connected to the processor 132P and the memory 132M with the circuit board 114 and the bus 132D. The wireless communicator 124 includes a signal transmitting circuit or circuitry and a signal receiving circuit or circuitry. Thus, the wireless communicator 124 can also be referred to as a wireless communicator circuit or circuitry 24.

The wireless communicator 124 is configured to superimpose digital signals on carrier wave using a predetermined wireless communication protocol to wirelessly transmit signals. In the first embodiment, the wireless communicator 124 is configured to encrypt signals using a cryptographic key to generate encrypted wireless signals. The wireless communicator 124 is configured to transmit wireless signals via the antenna 128 and/or 30.

The wireless communicator 124 is configured to receive wireless signals via the antenna 128 and/or 30. In the first embodiment, the wireless communicator 124 is configured to decode the wireless signals to recognize signals transmitted from other wireless communicators. The wireless communicator 124 is configured to decrypt the wireless signals using the cryptographic key.

As seen in FIG. 3, the electrical control device 111 further comprises a connecting part 134. The connecting part 134 is configured to electrically connect the circuit board 114 and the second antenna 128. Examples of the connecting part 134 include a solder.

The electrical control device 111 further comprises a connecting part 136. The connecting part 136 is configured to electrically connect the circuit board 114 and the second antenna 130. Examples of the connecting part 136 include a solder.

The housing 112 includes a power-supply accommodating part 140 including a power-supply accommodating space 142 in which a power supply 144 is accommodated. The power-supply accommodating part 140 is electrically connected to the circuit board 114. The power-supply accommodating part 140 is electrically connected to the wireless communicators 22 and 24 via the circuit board 114. The power-supply accommodating part 140 includes a positive terminal 46 and a negative terminal 48 which are made of a metallic material. The positive terminal 46 and the negative terminal 48 are provided in the power-supply accommodating space 142 to be contactable with the power supply 144 in a state where the power supply 144 is accommodated in the power-supply accommodating space 142. Examples of the power supply 144 include a primary battery (e.g., a coin battery, a dry-cell battery), a secondary battery, and a capacitor.

The power-supply accommodating part 140 is not limited to the illustrated embodiment. The power-supply accommodating part 140 can have shapes other than the shape depicted in FIG. 3 if needed and/or desired. The power-supply accommodating part 140 can be provided in the accommodating space 115A of the accommodating part 115 if needed and/or desired.

In the first embodiment, the power-supply accommodating part 140 is provided on the circuit board 114. The power-supply accommodating part 140 is provided in a third position defined on a first side S21 of the circuit board 114. The power-supply accommodating part 140 is provided in the third position other than the circuit board 114. The first surface 114A is provided on the first side S21 of the circuit board 114. The second surface 114B is provided on a second side S22 of the circuit board 114. The second side S22 is disposed on a reverse side of the first side S21 with respect to the circuit board 114.

However, the power-supply accommodating part 140 can be provided at a position other than the third position if needed and/or desired. The power-supply accommodating part 140 can be provided on the circuit board 114 if needed and/or desired. The power-supply accommodating part 140 can be provided on one of the first surface 114A and the second surface 114B if needed and/or desired. The power-supply accommodating part 140 can be provided on the second side S22 with respect to the circuit board 114 if needed and/or desired.

The electrical control device 111 further comprises an attachment member 150. The attachment member 150 is movably coupled to the power-supply accommodating part 140. The attachment member 150 is movable relative to the power-supply accommodating part 140 between an open position P21 and a closed position P22. In the first embodiment, the attachment member 150 is pivotally coupled to the power-supply accommodating part 140 about a pivot axis A2. The attachment member 150 is pivotable relative to the power-supply accommodating part 140 between the open position P21 and the closed position P22.

The power-supply accommodating part 140 includes an insertion opening 152. The insertion opening 152 is in communication with the power-supply accommodating space 142. The attachment member 150 is configured to cover the insertion opening 152 in the open state where the attachment member 150 is in the open position P21. The attachment member 150 is configured not to cover the insertion opening 152 in the closed state where the attachment member 150 is in the closed position P22.

The attachment member 150 is configured to allow the power supply 144 to be removed from the power-supply accommodating part 140 in an open state where the attachment member 150 is in the open position P21. The attachment member 150 is configured to close the insertion opening 152 in a closed state where the attachment member 150 is in the closed position P22. The power supply 144 can also be referred to as a removable power supply 144. The attachment member 150 is configured to allow the removable power supply 144 to be removed from the power-supply accommodating part 140 in the open state where the attachment member 150 is in the open position P21.

The electrical control device 111 further comprises an indicator 154. The indicator 154 is configured to indicate a status of the electrical control device 111. In the first embodiment, the indicator 154 is provided on the second surface 114B of the circuit board 114. However, the indicator 154 can be provided on the first surface 114A or a part other than the circuit board 114. Examples of the indicator 154 include a light emitting diode (LED). Examples of a status of the electrical control device 111 include a pairing state of at least one of the wireless communicators 22 and 24, a communication state (a communication state of a gear-changing signal) of at least one of the wireless communicators 22 and 24, and a remaining level of the power supply 144. For example, the housing 112 includes a light guiding part configured to guide light emitted from the indicator 154 to an outside of the housing 112.

The electrical control device 111 further comprises a position sensor 155. The position sensor 155 is configured to obtain a geographical location of the electrical control device 111. The position sensor 155 is electrically connected to the controller 132 via the circuit board 114. Examples of the position sensor 155 includes a global positioning system (GPS) circuit. In the first embodiment, the position sensor 155 is provided on the second surface 114B of the circuit board 114. However, the position sensor 155 can be provided on the first surface 114A or a part other than the circuit board 114.

As seen in FIG. 3, the electrical control device 111 further comprises a connector 156. The connector 156 is disposed on the circuit board 114. The connector 156 is configured to be electrically connected to the external device 5. The connector 156 is configured to be electrically connected to the electric cable 4A. The connector 156 is configured to be electrically connected to the external device 5 via the electric cable 4A. The connector 156 is electrically connected to the circuit board 114. The connector 156 is electrically connected to the wireless communicator via the circuit board 114. In the first embodiment, the connector 156 is provided on the circuit board 114. The connector 156 is provided on the first surface 114A of the circuit board 114. However, the connector 156 can be provided on a surface other than the first surface 114A if needed and/or desired. The connector 156 can be provided on a part other than the circuit board 114 if needed and/or desired.

The electrical control device 111 further comprises a connector 158. The connector 158 is disposed on the circuit board 114. The connector 158 is configured to be electrically connected to the additional device 9. The connector 158 is electrically connected to the circuit board 114. The connector 158 is electrically connected to the wireless communicator via the circuit board 114. In the first embodiment, the connector 158 is provided on the circuit board 114. The connector 158 is provided on the second surface 114B of the circuit board 114. However, the connector 158 can be provided on a surface other than the second surface 114B if needed and/or desired. The connector 158 can be provided on a part other than the circuit board 114 if needed and/or desired.

As seen in FIG. 3, the housing 112 is configured to be detachably attached to the additional device 9. The housing 112 is configured to be detachably and reattachably coupled to the additional device 9.

As seen in FIG. 1, the additional device 9 includes at least one of an operating member and an operated member. In the first embodiment, the additional device 9 includes an operating member 9A, an operated member 9B, an actuator 9C, a base body 9D, and an additional controller 9E. The base body 9D is configured to be detachably attached to the housing 112 of the electrical control device 111 with a coupling member such as a fastener (e.g., a screw) and a latch structure. The operating member 9A is movably coupled to the base body 9D. The operating member 9A is configured to receive a user input 9U. The operated member 9B is movably coupled to the base body 9D. The actuator 9C is configured to move the operated member 9B relative to the base body 9D. For example, the user input 9U indicates at least one of a start of pairing and a gear change of the additional device 9 in a case where the additional device 9 includes a gear-changing device. The gear change caused by the user input 9U is used for a gear-changing test of the additional device 9 during maintenance of the additional device 9.

The additional controller 9E is configured to control the actuator 9C to move the operated member 9B in response to the user input 9U received by the operating member 9A. The operating member 9A includes a switch 9F. The switch 9F is configured to be activated in response to the user input 9U. The additional controller 9E is configured to control the actuator 9C to move the operated member 9B in response to the activation of the switch 9F. Examples of the actuator 9C include a motor and a piezoelectric actuator.

The additional device 9 includes an additional connector 9G. The additional connector 9G is configured to be detachably connected to the connector 58 of the electrical control device 111. The additional connector 9G is electrically connected to the additional controller 9F. The additional controller 9E is configured to be electrically connected to the controller 132 of the electrical control device 111 via the connector 58 and the additional connector 9G. The controller 132 is configured to transmit, to the additional controller 9E, the information wirelessly transmitted from the at least one electric component 6. The additional controller 9E is configured to control the actuator 9C based on the information transmitted from the controller 132 of the electrical control device 111.

The additional controller 9E includes a processor 9P, a memory 9M, a circuit board 9H, and a bus 9K. The processor 9P and the memory 9M are electrically mounted on the circuit board 9H. The processor 9P and the memory 9M are electrically connected to the circuit board 9H via the bus 9K. The processor 9P is electrically connected to the memory 9M via the circuit board 9H and the bus 9K.

For example, the processor 9P includes at least one of a CPU, a MPU, and a memory controller. The memory 9M is electrically connected to the processor 9P. For example, the memory 9M includes at least one of a volatile memory and a non-volatile memory. Examples of the volatile memory include a RAM and a DRAM. Examples of the non-volatile memory include a ROM and an electrically erasable programmable ROM. The memory 9M includes storage areas each having an address in the ROM and the RAM. The processor 9P is configured to control the memory 9M to store data in the storage areas of the memory 9M and reads data from the storage areas of the memory 9M. The processor 9P can also be referred to as a hardware processor 9P. The memory 9M can also be referred to as a hardware memory 9M. The memory 9M can also be referred to as a computer-readable storage medium 9M.

The additional controller 9E is programed to execute at least one control algorithm of the electrical control device 111. The memory 9M (e.g., the ROM) stores at least one program including at least one program instructions. The at least one program is read into the processor 9P, and thereby the at least one control algorithm of the electrical control device 111 is executed based on the at least one program. The additional controller 9E can also be referred to as a control circuit or circuitry 9E. The additional controller 9E can also be referred to as a hardware additional controller 9E.

The structure of the additional controller 9E is not limited to the above structure. The structure of the 132 is not limited to the processor 9P, the memory 9M, and the bus 9K. The additional controller 9E can be realized by hardware alone or a combination of hardware and software. The processor 9P and the memory 9M can be integrated as a one-chip integrated circuit such as an ASIC or a FPGA.

Figure 4:
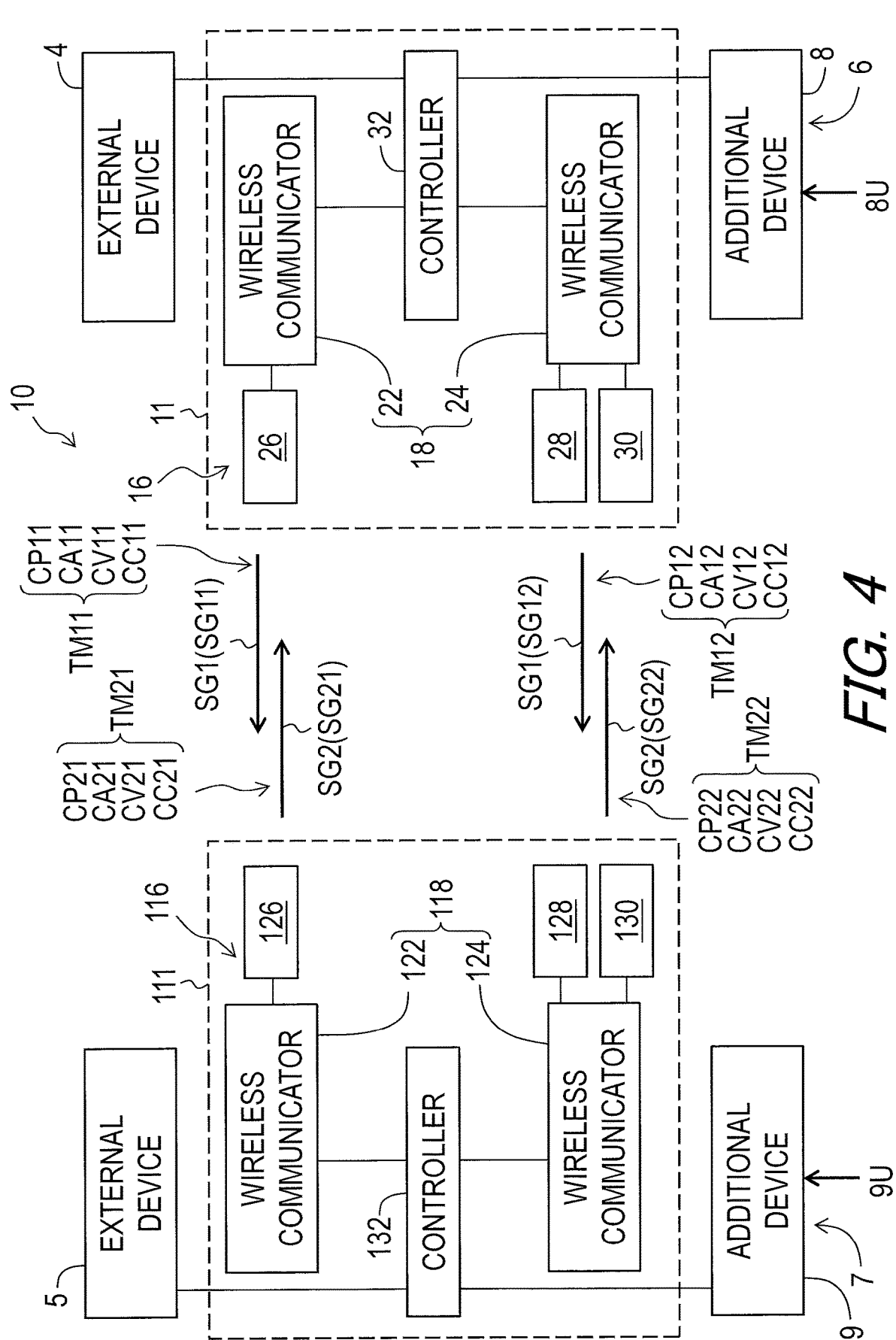
FIG. 4 is a schematic block diagram of the control system for showing communication between the electrical control device and the additional electrical control device.

As seen in FIG. 4, the first antenna 26 is configured to communicate using a first communication protocol CP11. The first wireless communicator 22 is configured to wirelessly communicate via the first antenna 26 using the first communication protocol CP11. The second antenna 28 is configured to communicate using a second communication protocol CP12. The second wireless communicator 24 is configured to wirelessly communicate via the second antenna 28 using the second communication protocol CP12. The second antenna 30 is configured to communicate using the second communication protocol CP12. The second wireless communicator 24 is configured to wirelessly communicate via the second antenna 30 using the second communication protocol CP12. The first communication protocol CP11 is different from the second communication protocol CP12. However, the first communication protocol CP11 can be the same as the second communication protocol CP12 if needed and/or desired.

Examples of the first communication protocol CP11 and the second communication protocol CP12 include Wi-Fi (registered trademark), Zigbee (registered trademark), Bluetooth (registered trademark), ANT (registered trademark), and other wireless communication protocols.

The first antenna 26 has a first communicating area CA11. The second antenna 28 has a second communicating area CA12. The second antenna 30 has a second communicating area CA13. The first communication area of the first antenna 26 has a first communication distance. The second communication area of the second antenna 28 has a second communication distance. The second communication area of the second antenna 30 has a second communication distance. The first communicating area CA11 is a surface area of the first antenna 26 affecting the wireless communication executed via the first antenna 26. The second communicating area CA12 is a surface area of the second antenna 28 affecting the wireless communication executed via the second antenna 28. The second communicating area CA13 is a surface area of the second antenna 30 affecting the wireless communication executed via the second antenna 30.

In the first embodiment, the first communicating area CA11 is different from the second communicating area CA12. The first communicating area CA11 is different from the second communicating area CA13. The second communicating area CA12 of the second antenna 28 is equal to the second communicating area CA13 of the second antenna 30. The second communicating area CA12 is wider than the first communicating area CA11. The second communicating area CA13 is wider than the first communicating area CA11. However, the second communicating area CA12 can be equal to or narrower than the first communicating area CA11 if needed and/or desired. The second communicating area CA13 can be equal to or narrower than the first communicating area CA11 if needed and/or desired.

The first antenna 26 has a first communicating volume CV11. The second antenna 28 has a second communicating volume CV12. The second antenna 30 has a second communicating volume CV13. The first communicating volume CV11 is a volume of a physical part of the first antenna 26 affecting the information processing executed via the first antenna 26 (e.g., a maximum information processing rate, a segment size). The second communicating volume CV12 is a volume of a physical part of the second antenna 28 affecting the information processing executed via the second antenna 28 (e.g., a maximum information processing rate, a segment size). The second communicating volume CV12 is a volume of a physical part of the second antenna 30 affecting the information processing executed via the second antenna 30 (e.g., a maximum information processing rate, a segment size).

In the first embodiment, the first communicating volume CV11 is different from the second communicating volume CV12. The first communicating volume CV11 is different from the second communicating volume CV13. The second communicating volume CV12 is larger than the first communicating volume CV11. The second communicating volume CV13 is larger than the first communicating volume CV11. However, the second communicating volume CV12 can be equal to or smaller than the first communicating volume CV11 if needed and/or desired. The second communicating volume CV13 can be equal to or smaller than the first communicating volume CV11 if needed and/or desired.

As seen in FIG. 4, the first antenna 126 is configured to communicate using a first communication protocol CP21. The first wireless communicator 122 is configured to wirelessly communicate via the first antenna 126 using the first communication protocol CP21. The second antenna 128 is configured to communicate using a second communication protocol CP22. The second wireless communicator 124 is configured to wirelessly communicate via the second antenna 128 using the second communication protocol CP22. The second antenna 130 is configured to communicate using the second communication protocol CP22. The second wireless communicator 124 is configured to wirelessly communicate via the second antenna 130 using the second communication protocol CP22. The first communication protocol CP21 is different from the second communication protocol CP22. However, the first communication protocol CP21 can be the same as the second communication protocol CP22 if needed and/or desired.

Examples of the first communication protocol CP21 and the second communication protocol CP22 include Wi-Fi (registered trademark), Zigbee (registered trademark), Bluetooth (registered trademark), ANT (registered trademark), and other wireless communication protocols.

The first antenna 126 has a first communicating area CA21. The second antenna 128 has a second communicating area CA22. The second antenna 130 has a second communicating area CA23. The first communication area of the first antenna 126 has a first communication distance. The second communication area of the second antenna 128 has a second communication distance. The second communication area of the second antenna 130 has a second communication distance. The first communicating area CA21 is a surface area of the first antenna 126 affecting the wireless communication executed via the first antenna 126. The second communicating area CA22 is a surface area of the second antenna 128 affecting the wireless communication executed via the second antenna 128. The second communicating area CA23 is a surface area of the second antenna 130 affecting the wireless communication executed via the second antenna 130.

In the first embodiment, the first communicating area CA21 is different from the second communicating area CA22. The first communicating area CA21 is different from the second communicating area CA23. The second communicating area CA22 of the second antenna 128 is equal to the second communicating area CA23 of the second antenna 130. The second communicating area CA22 is wider than the first communicating area CA21. The second communicating area CA23 is wider than the first communicating area CA21. However, the second communicating area CA22 can be equal to or narrower than the first communicating area CA21 if needed and/or desired. The second communicating area CA23 can be equal to or narrower than the first communicating area CA21 if needed and/or desired.

The first antenna 126 has a first communicating volume CV21. The second antenna 128 has a second communicating volume CV22. The second antenna 130 has a second communicating volume CV23. The first communicating volume CV21 is a volume of a physical part of the first antenna 126 affecting the information processing executed via the first antenna 126 (e.g., a maximum information processing rate, a segment size). The second communicating volume CV22 is a volume of a physical part of the second antenna 128 affecting the information processing executed via the second antenna 128 (e.g., a maximum information processing rate, a segment size). The second communicating volume CV22 is a volume of a physical part of the second antenna 130 affecting the information processing executed via the second antenna 130 (e.g., a maximum information processing rate, a segment size).

In the first embodiment, the first communicating volume CV21 is different from the second communicating volume CV22. The first communicating volume CV21 is different from the second communicating volume CV23. The second communicating volume CV22 is larger than the first communicating volume CV21. The second communicating volume CV23 is larger than the first communicating volume CV21. However, the second communicating volume CV22 can be equal to or smaller than the first communicating volume CV21 if needed and/or desired. The second communicating volume CV23 can be equal to or smaller than the first communicating volume CV21 if needed and/or desired.

The wireless communicator unit 18 of the electrical control device 11 is configured to establish a wireless communication with the wireless communicator unit 118 of the electrical control device 111 with pairing. The first wireless communicator 22 of the electrical control device 11 is configured to establish a wireless communication with the first wireless communicator 122 of the electrical control device 111 with pairing. The second wireless communicator 24 of the electrical control device 11 is configured to establish a wireless communication with the second wireless communicator 124 of the electrical control device 111 with pairing.

The controller 32 of the electrical control device 11 is configured to execute pairing between the wireless communicator unit 18 and another wireless communicator such as the wireless communicator unit 118. The controller 32 of the electrical control device 11 is configured to execute pairing between the first wireless communicator 22 and another wireless communicator such as the first wireless communicator 122. The controller 32 of the electrical control device 11 is configured to execute pairing between the second wireless communicator 24 and another wireless communicator such as the second wireless communicator 124.

The controller 32 of the electrical control device 11 is configured to start pairing between the wireless communicator unit 18 and another wireless communicator such as the wireless communicator unit 118 in response to a user pairing input. For example, the user input 8U1 includes at least one of a long press of the switch 8F1 of the operating member 8A1 and a long press of the switch 8F2 of the operating member 8A2. The controller 32 of the electrical control device 11 is configured to start pairing between the wireless communicator unit 18 and another wireless communicator such as the wireless communicator unit 118 in response to at least one of the long press of the switch 8F1 of the operating member 8A1 and the long press of the switch 8F2 of the operating member 8A2.

The controller 32 of the electrical control device 11 is configured to start pairing between the first wireless communicator 22 and another wireless communicator such as the first wireless communicator 122 and between the second wireless communicator 24 and another wireless communicator such as the second wireless communicator 124 in response to the user pairing input. The controller 32 of the electrical control device 11 is configured to start pairing between the first wireless communicator 22 and another wireless communicator such as the first wireless communicator 122 and between the second wireless communicator 24 and another wireless communicator such as the second wireless communicator 124 in response to at least one of the long press of the switch 8F1 of the operating member 8A1 and the long press of the switch 8F2 of the operating member 8A2.

The wireless communicator unit 118 of the electrical control device 111 is configured to establish a wireless communication with the wireless communicator unit 18 of the electrical control device 11 with pairing. The first wireless communicator 122 of the electrical control device 111 is configured to establish a wireless communication with the first wireless communicator 22 of the electrical control device 11 with pairing. The second wireless communicator 124 of the electrical control device 111 is configured to establish a wireless communication with the second wireless communicator 24 of the electrical control device 11 with pairing.

The controller 132 of the electrical control device 111 is configured to execute pairing between the wireless communicator unit 118 and another wireless communicator such as the wireless communicator unit 18. The controller 132 of the electrical control device 111 is configured to execute pairing between the first wireless communicator 122 and another wireless communicator such as the first wireless communicator 22. The controller 132 of the electrical control device 111 is configured to execute pairing between the second wireless communicator 124 and another wireless communicator such as the second wireless communicator 24.

The controller 132 of the electrical control device 111 is configured to start pairing between the wireless communicator unit 118 and another wireless communicator such as the wireless communicator unit 18 in response to a user pairing input. For example, the user input 9U includes a long press of the switch 9F of the operating member 9A. The controller 132 of the electrical control device 111 is configured to start pairing between the wireless communicator unit 118 and another wireless communicator such as the wireless communicator unit 18 in response to the long press of the switch 9F of the operating member 9A.

The controller 132 of the electrical control device 111 is configured to start pairing between the first wireless communicator 122 and another wireless communicator such as the first wireless communicator 22 and between the second wireless communicator 124 and another wireless communicator such as the second wireless communicator 24 in response to the user pairing input. The controller 132 of the electrical control device 111 is configured to start pairing between the first wireless communicator 122 and another wireless communicator such as the first wireless communicator 22 and between the second wireless communicator 124 and another wireless communicator such as the second wireless communicator 24 in response to the long press of the switch 9F of the operating member 9A.

As seen in FIG. 1, the controller 32 of the electrical control device 11 is configured to control the wireless communicator unit 18 to wirelessly transmit a signal SG1 in response to at least one of the user input 8U1 received by the operating member 8A1 and the user input 8U2 received by the operating member 8A2. The controller 132 is configured to receive the signal SG1 via the wireless communicator unit 118. The controller 132 is configured to transmit, to the additional controller 9E of the additional device 9, the signal SG1 wirelessly received by the wireless communicator unit 118. The additional controller 9E is configured to control the actuator 9C to move the operated member 9B in response to the signal SG1.

The controller 32 of the electrical control device 11 is configured to control the first wireless communicator 22 to wirelessly transmit a first signal SG11 in response to the user input 8U1 received by the operating member 8A1. The controller 32 is configured to control the first wireless communicator 22 to wirelessly transmit the first signal SG11 in response to the user input 8U2 received by the operating member 8A2. For example, the controller 32 is configured to control the first wireless communicator 22 to wirelessly transmit an upshifting signal in response to the user input 8U1 received by the operating member 8A1. The controller 32 is configured to control the first wireless communicator 22 to wirelessly transmit a downshifting signal in response to the user input 8U2 received by the operating member 8A2. The controller 32 is configured to control the first wireless communicator 22 to wirelessly transmit a pairing signal in response to at least one of the user input 8U1 (e.g., a long press) received by the operating member 8A1 and the user input 8U2 (e.g., a long press) received by the operating member 8A2. Namely, the first signal SG11 includes at least one of the upshifting signal, the downshifting signal, and the pairing signal. The first signal SG11 can also be referred to as a signal SG11.

The controller 32 of the electrical control device 11 is configured to control the second wireless communicator 24 to wirelessly transmit a second signal SG12 in response to the user input 8U1 received by the operating member 8A1. The controller 32 is configured to control the second wireless communicator 24 to wirelessly transmit the second signal SG12 in response to the user input 8U2 received by the operating member 8A2. For example, the controller 32 is configured to control the second wireless communicator 24 to wirelessly transmit an upshifting signal in response to the user input 8U1 received by the operating member 8A1. The controller 32 is configured to control the second wireless communicator 24 to wirelessly transmit a downshifting signal in response to the user input 8U2 received by the operating member 8A2. The controller 32 is configured to control the second wireless communicator 24 to wirelessly transmit a pairing signal in response to at least one of the user input 8U1 (e.g., a long press) received by the operating member 8A1 and the user input 8U2 (e.g., a long press) received by the operating member 8A2. Namely, the second signal SG12 includes at least one of the upshifting signal, the downshifting signal, and the pairing signal. The second signal SG12 can also be referred to as a signal SG12.

As seen in FIG. 1, the controller 132 of the electrical control device 111 is configured to control the wireless communicator unit 118 to wirelessly transmit a signal SG2 in response to at least one of the signal SG1 and the user input 9U received by the operating member 9A. The controller 32 is configured to receive the signal SG2 via the wireless communicator unit 18.

The controller 132 of the electrical control device 111 is configured to control the first wireless communicator 122 to wirelessly transmit a first signal SG21 in response to at least one of the first signal SG11 and the user input 9U received by the operating member 9A. The controller 132 is configured to control the first wireless communicator 122 to wirelessly transmit the first signal SG21 in response to at least one of the first signal SG11 and the user input 9U received by the operating member 9A. For example, the controller 132 is configured to control the first wireless communicator 122 to wirelessly transmit an acknowledge signal in response to the first signal SG11 wirelessly received from the first wireless communicator 22. The controller 132 is configured to control the first wireless communicator 122 to wirelessly transmit a pairing signal in response to the user input 9U (e.g., a long press) received by the operating member 9A. Namely, the first signal SG21 includes at least one of the acknowledge signal and the pairing signal. The first signal SG21 can also be referred to as a signal SG21.

The controller 132 of the electrical control device 111 is configured to control the second wireless communicator 124 to wirelessly transmit a second signal SG22 in response to at least one of the second signal SG12 and the user input 9U received by the operating member 9A. The controller 132 is configured to control the second wireless communicator 124 to wirelessly transmit the second signal SG22 in response to at least one of the second signal SG12 and the user input 9U received by the operating member 9A. For example, the controller 132 is configured to control the second wireless communicator 124 to wirelessly transmit an acknowledge signal in response to the second signal SG12 wirelessly received from the second wireless communicator 24. The controller 132 is configured to control the second wireless communicator 124 to wirelessly transmit a pairing signal in response to the user input 9U (e.g., a long press) received by the operating member 9A. Namely, the second signal SG22 includes at least one of the acknowledge signal and the pairing signal. The second signal SG22 can also be referred to as a signal SG22.

As seen in FIGS. 5 to 16, the controller 32 is configured to modify, in accordance with a predetermined condition, a signal transmitting manner of the signal SG1 transmitted in a predetermined period from the wireless communicator unit 18. In the first embodiment, the controller 32 is configured to modify the signal transmitting manner of the signal SG1 by assigning at least one of the first wireless communicator 22 and the second wireless communicator 24 to wirelessly transmit the signal SG1.

The controller 32 is configured to assign, if the second wireless communicator 24 meets the predetermined condition, the first wireless communicator 22 to communicate with the at least one electric component 7. The controller 32 is configured to assign, if the second wireless communicator 24 meets the predetermined condition, the first wireless communicator 22 to wirelessly transmit the signal SG11 to the at least one electric component 7. The controller 32 is configured to change the wireless communicator unit 18 from the second wireless communicator 24 to the first wireless communicator 22 if the second wireless communicator 24 meets the predetermined condition. The controller 32 is configured to control the first wireless communicator 22 to wirelessly transmit the signal SG1 (e.g., the first signal SG11) if the second wireless communicator 24 meets the predetermined condition while the controller 32 assigns the second wireless communicator 24 to wirelessly transmit the signal SG1 (e.g., the second signal SG12).

The controller 32 is configured to assign, if the first wireless communicator 22 meets the predetermined condition, the second wireless communicator 24 to communicate with the at least one electric component 7. The controller 32 is configured to assign, if the first wireless communicator 22 meets the predetermined condition, the second wireless communicator 24 to wirelessly transmit the signal SG12 to the at least one electric component 7. The controller 32 is configured to change the wireless communicator unit 18 from the first wireless communicator 22 to the second wireless communicator 24 if the first wireless communicator 22 meets the predetermined condition. The controller 32 is configured to control the second wireless communicator 24 to wirelessly transmit the signal SG1 (e.g., the second signal SG12) if the first wireless communicator 22 meets the predetermined condition while the controller 32 assigns the first wireless communicator 22 to wirelessly transmit the signal SG1 (e.g., the first signal SG11).

As seen in FIG. 4, the signal transmitting manner of the wireless communicator unit 18 includes a first signal transmitting manner TM11 and a second signal transmitting manner TM12. The second signal transmitting manner TM12 is different from the first signal transmitting manner TM11. The controller 32 is configured to change the signal transmitting manner, in accordance with the predetermined condition, to the first signal transmitting manner TM11 of the first signal SG11 transmitted from the first wireless communicator 22. The controller 32 is configured to change the signal transmitting manner, in accordance with the predetermined condition, to the second signal transmitting manner TM12 of the second signal SG12 transmitted from the second wireless communicator 24.

The controller 32 is configured to change the signal transmitting manner to the first signal transmitting manner TM11 by controlling the first wireless communicator 22 to wirelessly transmit the signal SG1 (e.g., the first signal SG11) if the second wireless communicator 24 meets the predetermined condition while the controller 32 assigns the second wireless communicator 24 to wirelessly transmit the signal SG1 (e.g., the second signal SG12). The controller 32 is configured to change the signal transmitting manner to the second signal transmitting manner TM12 by controlling the second wireless communicator 24 to wirelessly transmit the signal SG1 (e.g., the second signal SG12) if the first wireless communicator 22 meets the predetermined condition while the controller 32 assigns the first wireless communicator 22 to wirelessly transmit the signal SG1 (e.g., the first signal SG11).

As seen in FIGS. 5 to 16, the controller 132 is configured to modify, in accordance with a predetermined condition, a signal transmitting manner of the signal SG2 transmitted in a predetermined period from the wireless communicator unit 118. In the first embodiment, the controller 132 is configured to modify the signal SG2 transmitting manner of the signal by assigning at least one of the first wireless communicator 122 and the second wireless communicator 124 to wirelessly transmit the signal SG2.

The controller 132 is configured to assign, if the second wireless communicator 124 meets the predetermined condition, the first wireless communicator 122 to communicate with the at least one electric component 6. The controller 132 is configured to assign, if the second wireless communicator 124 meets the predetermined condition, the first wireless communicator 122 to wirelessly transmit the signal SG2 to the at least one electric component 6. The controller 132 is configured to change the wireless communicator unit 118 from the second wireless communicator 124 to the first wireless communicator 122 if the second wireless communicator 124 meets the predetermined condition. The controller 132 is configured to control the first wireless communicator 122 to wirelessly transmit the signal SG2 (e.g., the first signal SG21) if the second wireless communicator 124 meets the predetermined condition while the controller 132 controls the second wireless communicator 124 to wirelessly transmit the signal SG2 (e.g., the second signal SG22).

The controller 132 is configured to assign, if the first wireless communicator 122 meets the predetermined condition, the second wireless communicator 124 to communicate with the at least one electric component 6. The controller 132 is configured to assign, if the first wireless communicator 122 meets the predetermined condition, the second wireless communicator 124 to wirelessly transmit the signal SG2 to the at least one electric component 6. The controller 132 is configured to change the wireless communicator unit 118 from the first wireless communicator 122 to the second wireless communicator 124 if the first wireless communicator 122 meets the predetermined condition. The controller 132 is configured to control the second wireless communicator 124 to wirelessly transmit the signal SG2 (e.g., the second signal SG22) if the first wireless communicator 122 meets the predetermined condition while the controller 132 controls the first wireless communicator 122 to wirelessly transmit the signal SG2 (e.g., the first signal SG21).

As seen in FIG. 4, the signal transmitting manner of the wireless communicator unit 118 includes a first signal transmitting manner TM21 and a second signal transmitting manner TM22. The second signal transmitting manner TM22 is different from the first signal transmitting manner TM21. The controller 132 is configured to change the signal transmitting manner, in accordance with the predetermined condition, to the first signal transmitting manner TM21 of a first signal SG21 transmitted from the first wireless communicator 122. The controller 132 is configured to change the signal transmitting manner, in accordance with the predetermined condition, to the second signal transmitting manner TM22 of a second signal SG22 transmitted from the second wireless communicator 124.

The controller 132 is configured to change the signal transmitting manner to the first signal transmitting manner TM21 by controlling the first wireless communicator 122 to wirelessly transmit the signal SG2 (e.g., the first signal SG21) if the second wireless communicator 124 meets the predetermined condition while the controller 132 controls the second wireless communicator 124 to wirelessly transmit the signal SG2 (e.g., the second signal SG22). The controller 132 is configured to change the signal transmitting manner to the second signal transmitting manner TM22 by controlling the second wireless communicator 124 to wirelessly transmit the signal SG2 (e.g., the second signal SG22) if the first wireless communicator 122 meets the predetermined condition while the controller 132 controls the first wireless communicator 122 to wirelessly transmit the signal SG2 (e.g., the first signal SG21).

As seen in FIGS. 5 to 16, the first wireless communicator 22 of the electrical control device 11 is configured to wirelessly communicate with the first wireless communicator 122 if the controller 32 assigns the first wireless communicator 22 to wirelessly communicate with the wireless communicator unit 118 of the electrical control device 111. The first wireless communicator 22 is configured to wirelessly transmit the signal SG11 to the first wireless communicator 122 if the controller 32 assigns the first wireless communicator 22 to wirelessly communicate with the wireless communicator unit 118 of the electrical control device 111. The first wireless communicator 122 of the electrical control device 111 is configured to wirelessly receive the signal SG11. The controller 132 of the electrical control device 111 is configured to transmit the signal SG11 to the additional controller 9E of the additional device 8. The additional controller 9E is configured to control the actuator 9C to move the operated member 8B based on the signal SG11.

The second wireless communicator 24 of the electrical control device 11 is configured to wirelessly communicate with the second wireless communicator 124 if the controller 32 assigns the second wireless communicator 24 to wirelessly communicate with the wireless communicator unit 118 of the electrical control device 111. The second wireless communicator 24 is configured to wirelessly transmit the signal SG12 to the second wireless communicator 124 if the controller 32 assigns the second wireless communicator 24 to wirelessly communicate with the wireless communicator unit 118 of the electrical control device 111. The second wireless communicator 124 of the electrical control device 111 is configured to wirelessly receive the signal SG12. The controller 132 of the electrical control device 111 is configured to transmit the signal SG12 to the additional controller 9E of the additional device 8. The additional controller 9E is configured to control the actuator 9C to move the operated member 8B based on the signal SG12.

Figure 5:
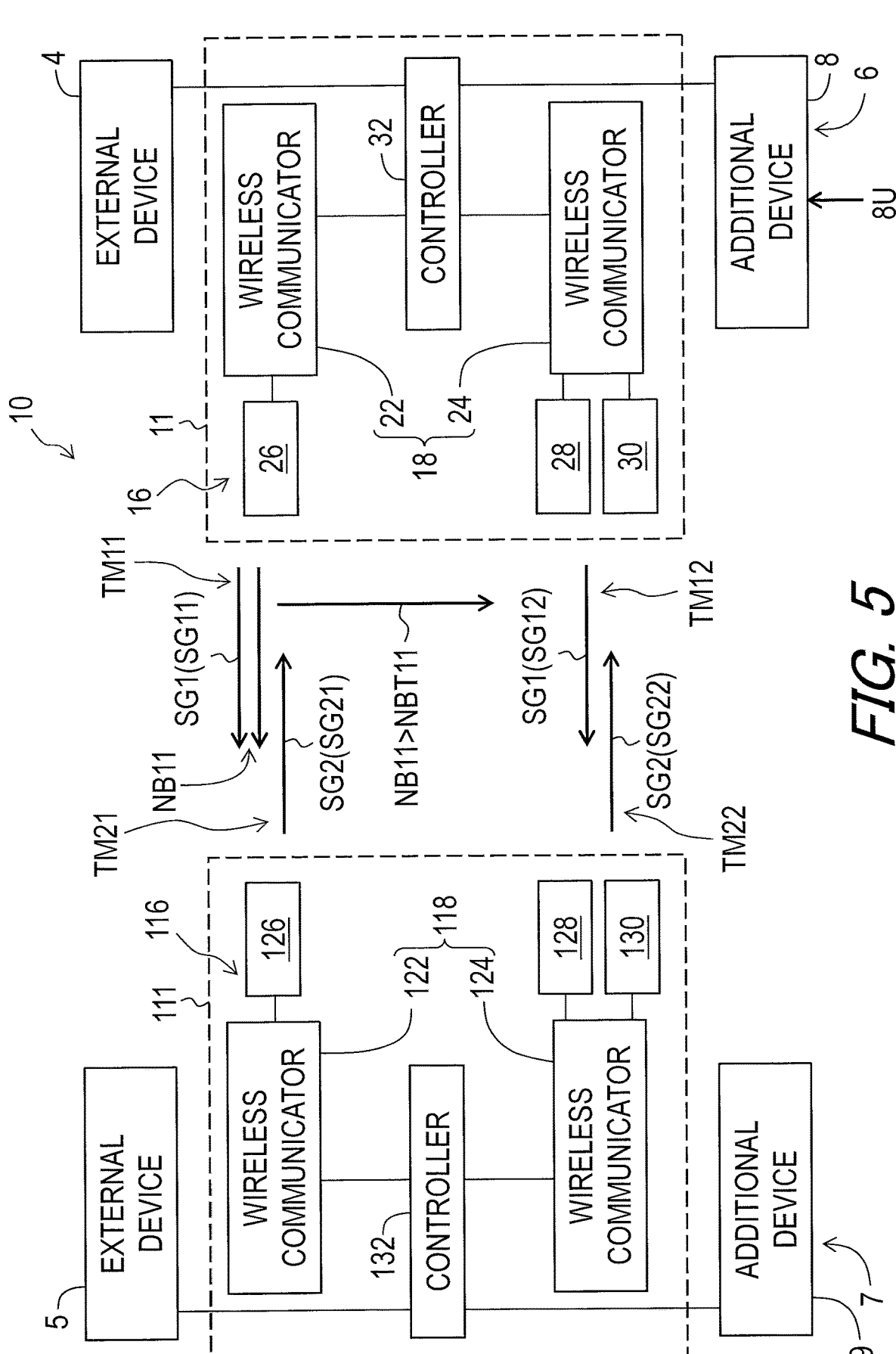
FIGS. 5 to 19 are schematic block diagrams of the control system for showing that the electrical control device modifies a signal transmitting manner.
Figure 6:
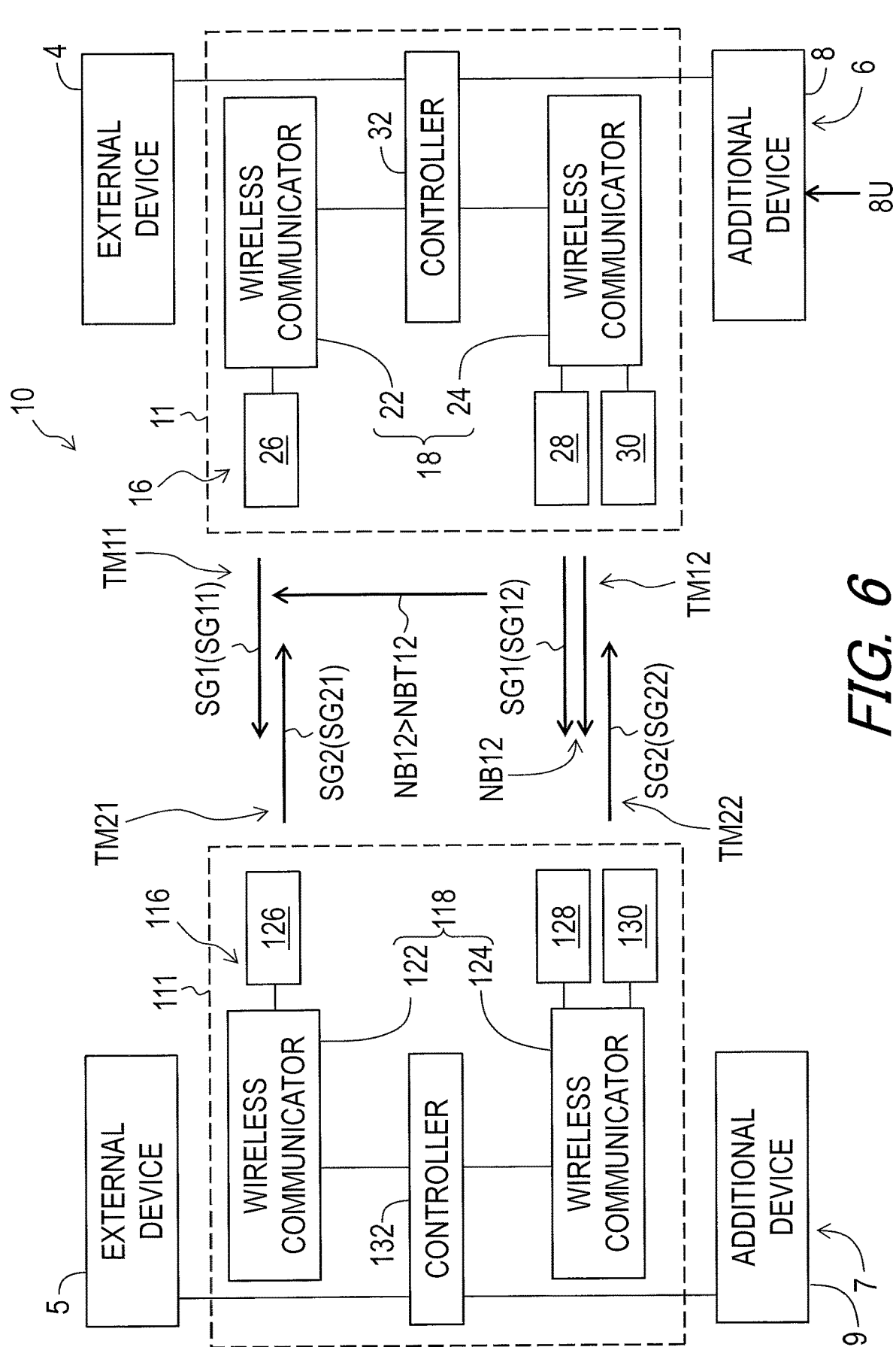

As seen in FIGS. 5 and 6, the predetermined condition used in the controller 32 includes a total number of retransmission of the signal SGL The controller 32 is configured to modify the signal transmitting manner in accordance with the total number of retransmission. However, the predetermined condition used in the controller 32 can include conditions other than the total number of retransmission of a signal if needed and/or desired.

As seen in FIG. 5, the controller 32 of the electrical control device 11 is configured to control the first wireless communicator 22 to wirelessly transmit the signal SG11 in response to the user input 8U1 received by the operating member 8A1. The controller 32 is configured to control the first wireless communicator 22 to wirelessly transmit the signal SG11 in response to the user input 8U2 received by the operating member 8A2. For example, the controller 32 is configured to control the first wireless communicator 22 to wirelessly transmit an upshifting signal in response to the user input 8U1 received by the operating member 8A1. The controller 32 is configured to control the first wireless communicator 22 to wirelessly transmit a downshifting signal in response to the user input 8U2 received by the operating member 8A2. Namely, the signal SG11 includes at least one of the upshifting signal and the downshifting signal.

The controller 32 is configured to control the first wireless communicator 22 to wirelessly retransmit the signal SG11 if the controller 32 does not receive a response (e.g., the acknowledge signal SG21) via the first wireless communicator 22 from another wireless communicator unit such as the first wireless communicator 122 of the electrical control device 111 after the first wireless communicator 22 wirelessly transmits the signal SG11.

The controller 32 is configured to count the total number NB11 of retransmission of the signal SG11 until the controller 32 receives the response (e.g., the acknowledge signal SG21) via the first wireless communicator 22 from another wireless communicator unit such as the first wireless communicator 122. The controller 32 is configured to store the total number NB11 of retransmission of the signal SG11.

The controller 32 is configured to change the signal transmitting manner to the second signal transmitting manner TM12 of the second signal SG12 transmitted from the second wireless communicator 24 if the total number NB11 of retransmission of the first signal SG11 is greater than a determination threshold NBT11. The controller 32 is configured to maintain the second signal transmitting manner TM12 if the total number NB11 of retransmission of the first signal SG11 is equal to or less than the determination threshold NBT11.

As seen in FIG. 6, the controller 32 of the electrical control device 11 is configured to control the second wireless communicator 24 to wirelessly transmit the signal SG12 in response to the user input 8U1 received by the operating member 8A1. The controller 32 is configured to control the second wireless communicator 24 to wirelessly transmit the signal SG11 in response to the user input 8U2 received by the operating member 8A2. For example, the controller 32 is configured to control the second wireless communicator 24 to wirelessly transmit an upshifting signal in response to the user input 8U1 received by the operating member 8A1. The controller 32 is configured to control the second wireless communicator 24 to wirelessly transmit a downshifting signal in response to the user input 8U2 received by the operating member 8A2. Namely, the signal SG12 includes at least one of the upshifting signal and the downshifting signal.

The controller 32 is configured to control the second wireless communicator 24 to wirelessly retransmit the signal SG12 if the controller 32 does not receive a response (e.g., the acknowledge signal SG22) via the second wireless communicator 24 from another wireless communicator unit such as the second wireless communicator 124 of the electrical control device 111 after the second wireless communicator 24 wirelessly transmits the signal SG12.

The controller 32 is configured to count the total number NB12 of retransmission of the signal SG12 until the controller 32 receives the response (e.g., the acknowledge signal SG22) via the second wireless communicator 24 from another wireless communicator unit such as the second wireless communicator 124. The controller 32 is configured to store the total number NB12 of retransmission of the signal SG12.

The controller 32 is configured to change the signal transmitting manner to the first signal transmitting manner TM11 of the first signal SG11 transmitted from the first wireless communicator 22 if the total number NB12 of retransmission of the second signal SG12 is greater than a determination threshold NBT12. The controller 32 is configured to maintain the second signal transmitting manner TM12 if the total number NB12 of retransmission of the second signal SG12 is equal to or less than the determination threshold NBT12.

As with the controller 32, the predetermined condition used in the controller 132 can include a total number of retransmission of the signal SG2. The controller 132 can be configured to modify the signal transmitting manner in accordance with the total number of retransmission.

Figure 7:
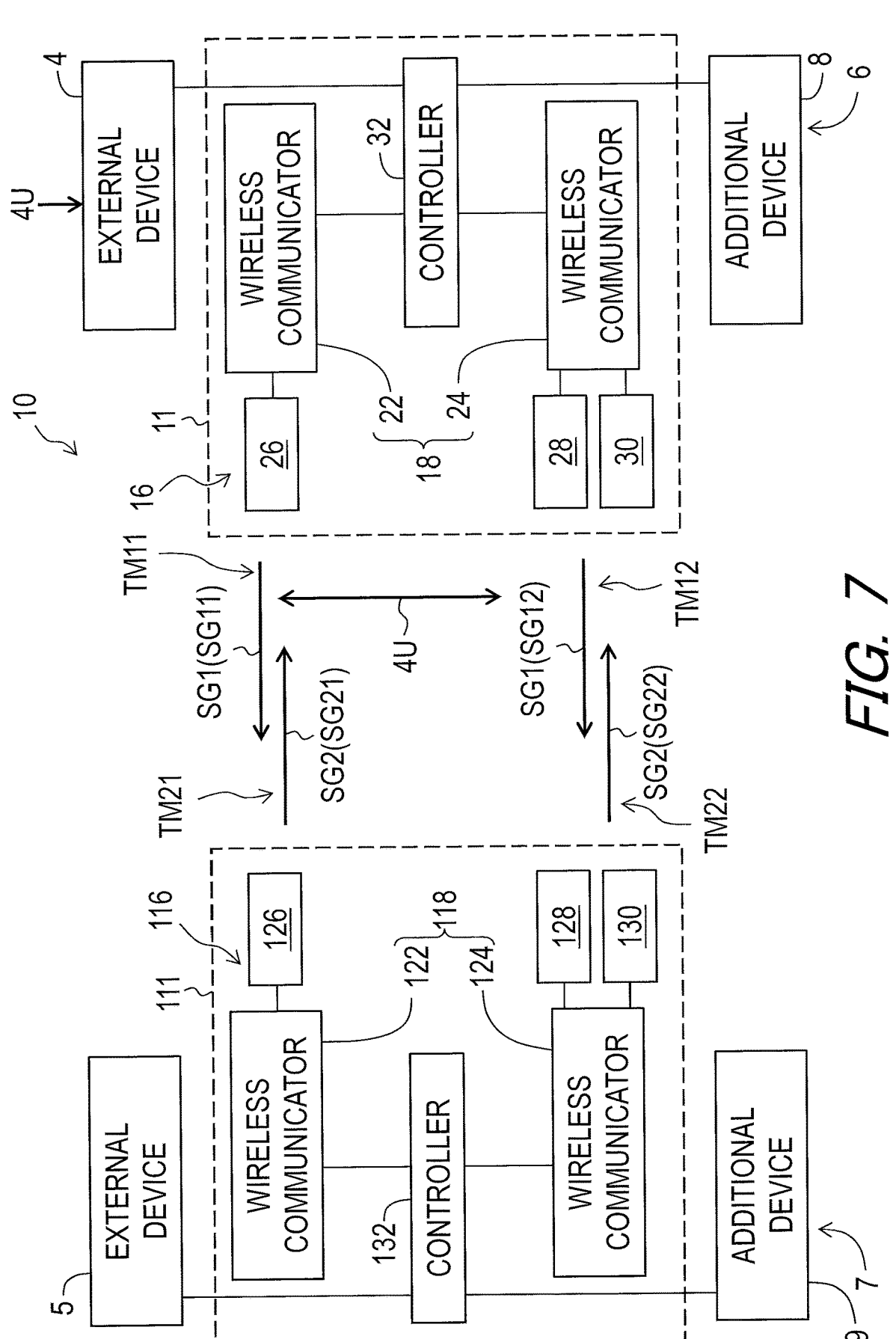

As seen in FIG. 7, the predetermined condition used in the controller 32 includes a user input (e.g., the user input 4U). The controller 32 is configured to assign the first wireless communicator 22 in accordance with the user input (e.g., the user input 4U). The controller 32 is configured to assign the second wireless communicator 24 in accordance with the user input (e.g., the user input 4U). However, the predetermined condition used in the controller 32 can include conditions (e.g., the user input 8U1) other than the user input 4U if needed and/or desired.

The user input 4U includes a selection of the signal transmitting manner. The user input 4U includes a selection of one of the first signal transmitting manner TM11 and the second signal transmitting manner TM12. The user inputs the user input 4U into the electrical control device 11 via the satellite switch of the external device 4.

The controller 32 is configured to assign the second wireless communicator 24 if the controller 32 recognizes the user input 4U received by the external device 4 in a first state where the first wireless communicator 22 is assigned to communicate with another wireless communicator. The controller 32 is configured to assign the first wireless communicator 22 if the controller 32 recognizes the user input 4U received by the external device 4 in a second state where the second wireless communicator 24 is assigned to communicate with another wireless communicator. Thus, the user can select one of the first signal transmitting manner TM11 and the second signal transmitting manner TM12 (e.g., one of the first wireless communicator 22 and the second wireless communicator 24) if necessary or if one of the first signal transmitting manner TM11 and the second signal transmitting manner TM12 (e.g., one of the first wireless communicator 22 and the second wireless communicator 24) is preferable.

Figure 8:
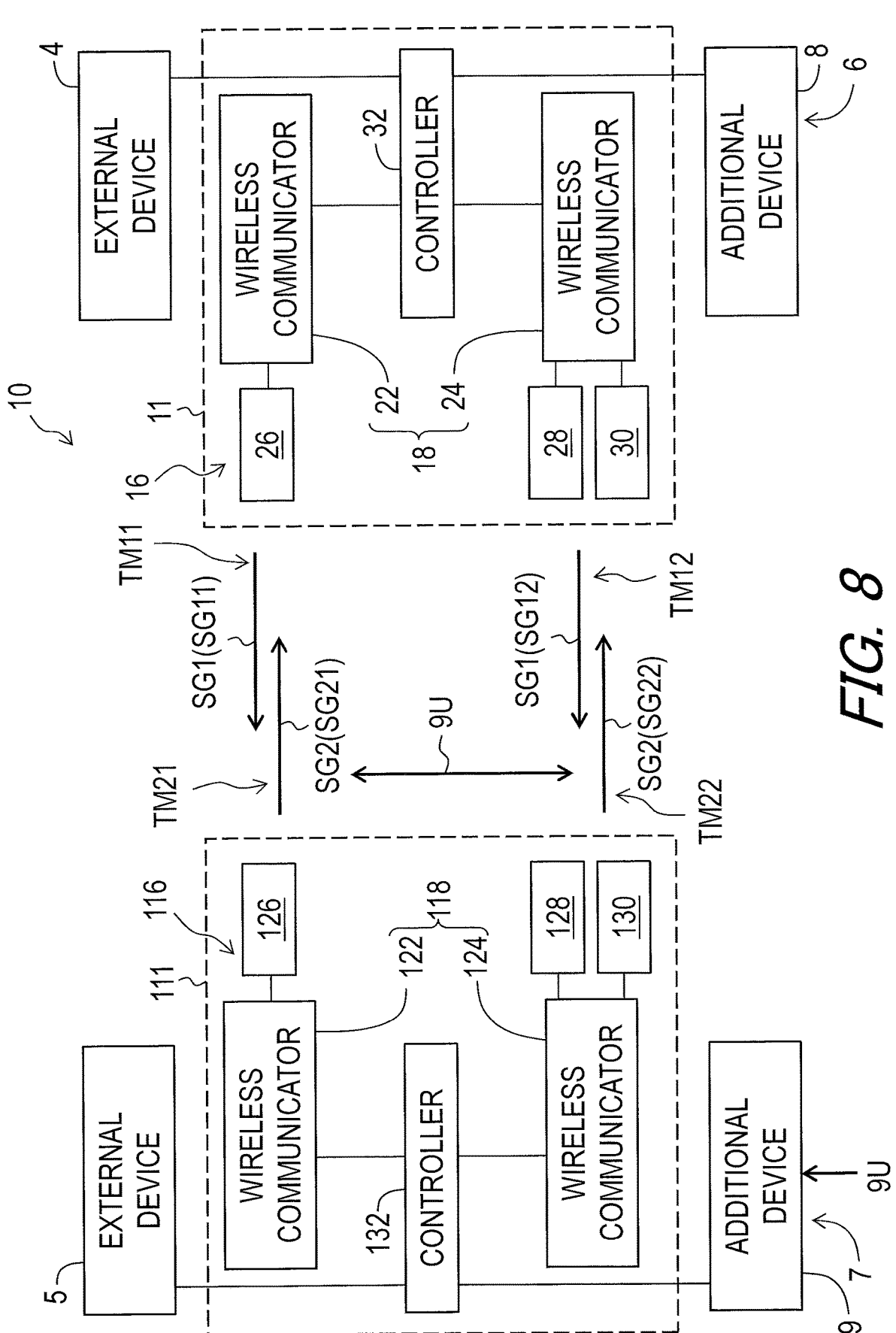

As seen in FIG. 8, the predetermined condition used in the controller 132 includes a user input (e.g., the user input 9U). The controller 132 is configured to assign the first wireless communicator 122 in accordance with the user input (e.g., the user input 9U). The controller 132 is configured to assign the second wireless communicator 124 in accordance with the user input (e.g., the user input 9U). However, the predetermined condition used in the controller 132 can include conditions other than the user input if needed and/or desired.

The user input 9U includes a selection of the signal transmitting manner. The user input 9U includes a selection of one of the first signal transmitting manner TM11 and the second signal transmitting manner TM12. The user inputs the user input 9U into the electrical control device 111 via the satellite switch of the external device 4.

The controller 132 is configured to assign the second wireless communicator 124 if the controller 132 recognizes the user input 9U received by the external device 4 in a first state where the first wireless communicator 122 is assigned to communicate with another wireless communicator. The controller 132 is configured to assign the first wireless communicator 122 if the controller 132 recognizes the user input 9U received by the external device 4 in a second state where the second wireless communicator 124 is assigned to communicate with another wireless communicator. Thus, the user can select one of the first signal transmitting manner TM11 and the second signal transmitting manner TM12

(e.g., one of the first wireless communicator 122 and the second wireless communicator 124) if necessary or if one of the first signal transmitting manner TM11 and the second signal transmitting manner TM12 (e.g., one of the first wireless communicator 122 and the second wireless communicator 124) is preferable.

Figure 9:
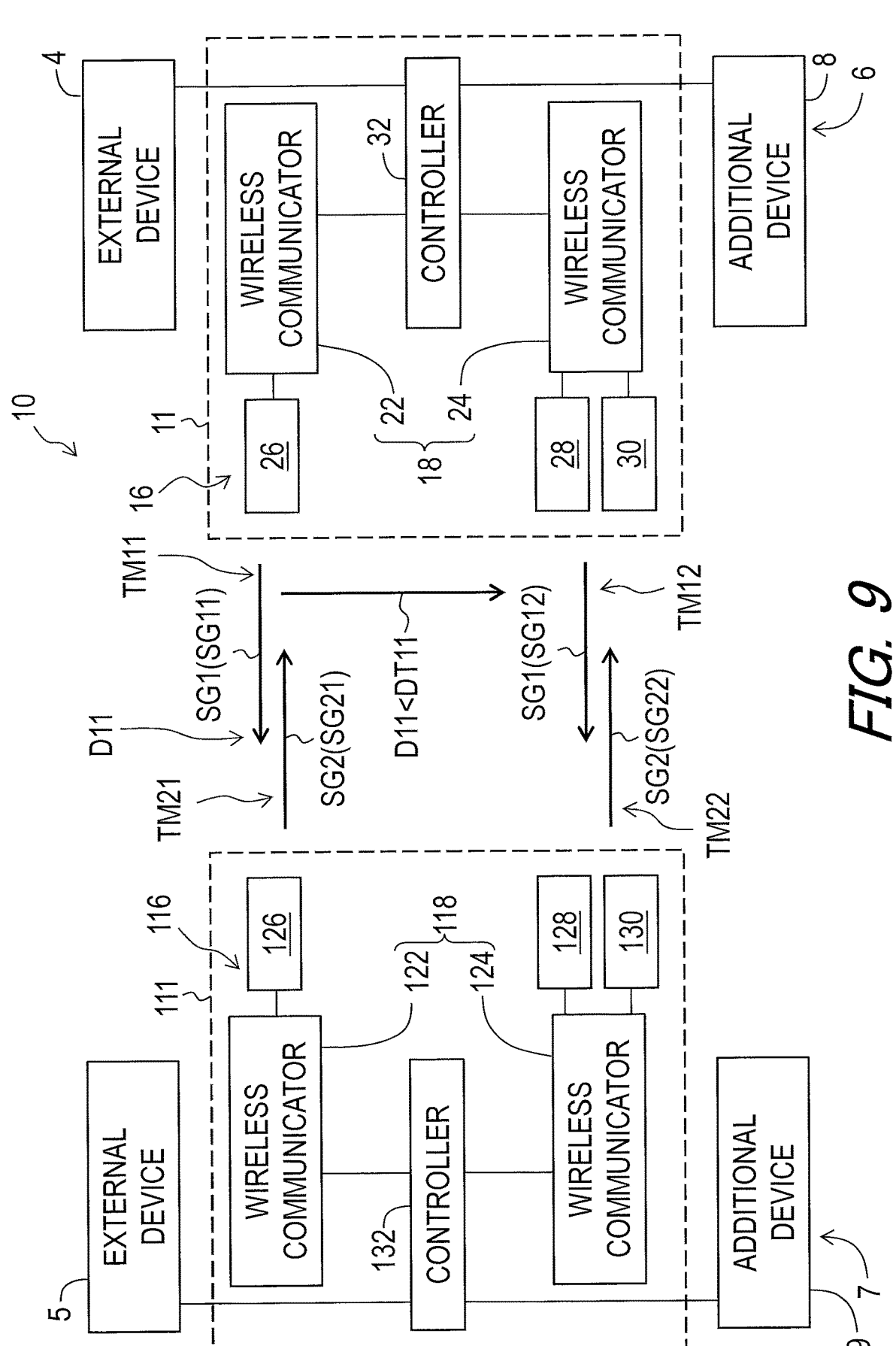
Figure 10:
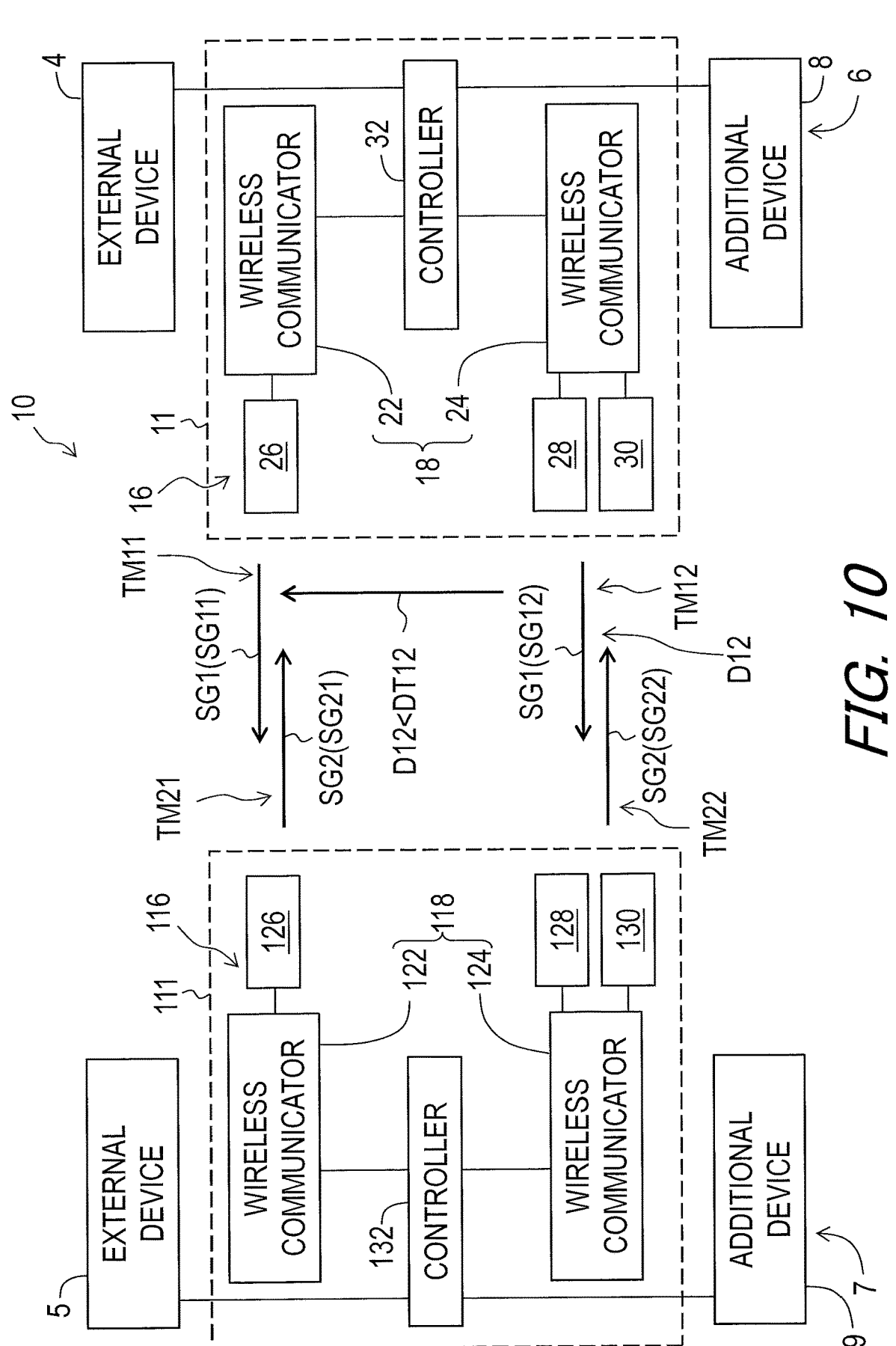

As seen in FIGS. 9 and 10, the predetermined condition used in the controller 32 includes channel information relating to a communication channel of at least one of the first wireless communicator 22 and the second wireless communicator 24. In order to avoid collisions between signals, the controller 32 is configured to assign the second wireless communicator 24 in accordance with the channel information. However, the predetermined condition can include conditions other than the channel information if needed and/or desired.

The channel information used in the controller 32 includes data traffic of communication of at least one of the first wireless communicator 22 and the second wireless communicator 24. The first wireless communicator 22 has first data traffic D11 of actual communication when the first wireless communicator 22 wirelessly communicates with another wireless communicator such as the first wireless communicator 122. The second wireless communicator 24 has second data traffic D12 of actual communication when the second wireless communicator 24 wirelessly communicates with another wireless communicator such as the second wireless communicator 124.

The controller 32 is configured to assign the first wireless communicator 22 in accordance with the data traffic. The controller 32 is configured to assign the second wireless communicator 24 in accordance with the data traffic. The controller 32 is configured to assign the first wireless communicator 22 in accordance with second data traffic D12 of the second wireless communicator 24. The controller 32 is configured to assign the second wireless communicator 24 in accordance with first data traffic D11 of the first wireless communicator 22.

As seen in FIG. 9, the controller 32 is configured to assign the second wireless communicator 24 if the first data traffic D11 of the first wireless communicator 22 is smaller than a data traffic threshold DT11. The controller 32 is configured to maintain the first wireless communicator 22 if the first data traffic D11 of the first wireless communicator 22 is equal to or larger than the data traffic threshold DT11.

As seen in FIG. 10, the controller 32 is configured to assign the first wireless communicator 22 if the second data traffic D12 of the second wireless communicator 24 is lower than a data traffic threshold DT12. The controller 32 is configured to maintain the second wireless communicator 24 if the second data traffic D12 of the second wireless communicator 24 is equal to or larger than the data traffic threshold DT12.

As with the controller 32, the predetermined condition used in the controller 132 can include channel information relating to a communication channel of at least one of the first wireless communicator 122 and the second wireless communicator 124. The controller 132 can be configured to assign the first wireless communicator 122 in accordance with the channel information. The controller 132 can be configured to assign the second wireless communicator 124 in accordance with the channel information. The channel information used in the controller 132 can include data traffic of communication of at least one of the first wireless communicator 122 and the second wireless communicator 124. The controller 132 can be configured to assign the first wireless communicator 122 in accordance with the data traffic. The controller 132 can be configured to assign the second wireless communicator 124 in accordance with the data traffic.

Figure 11:
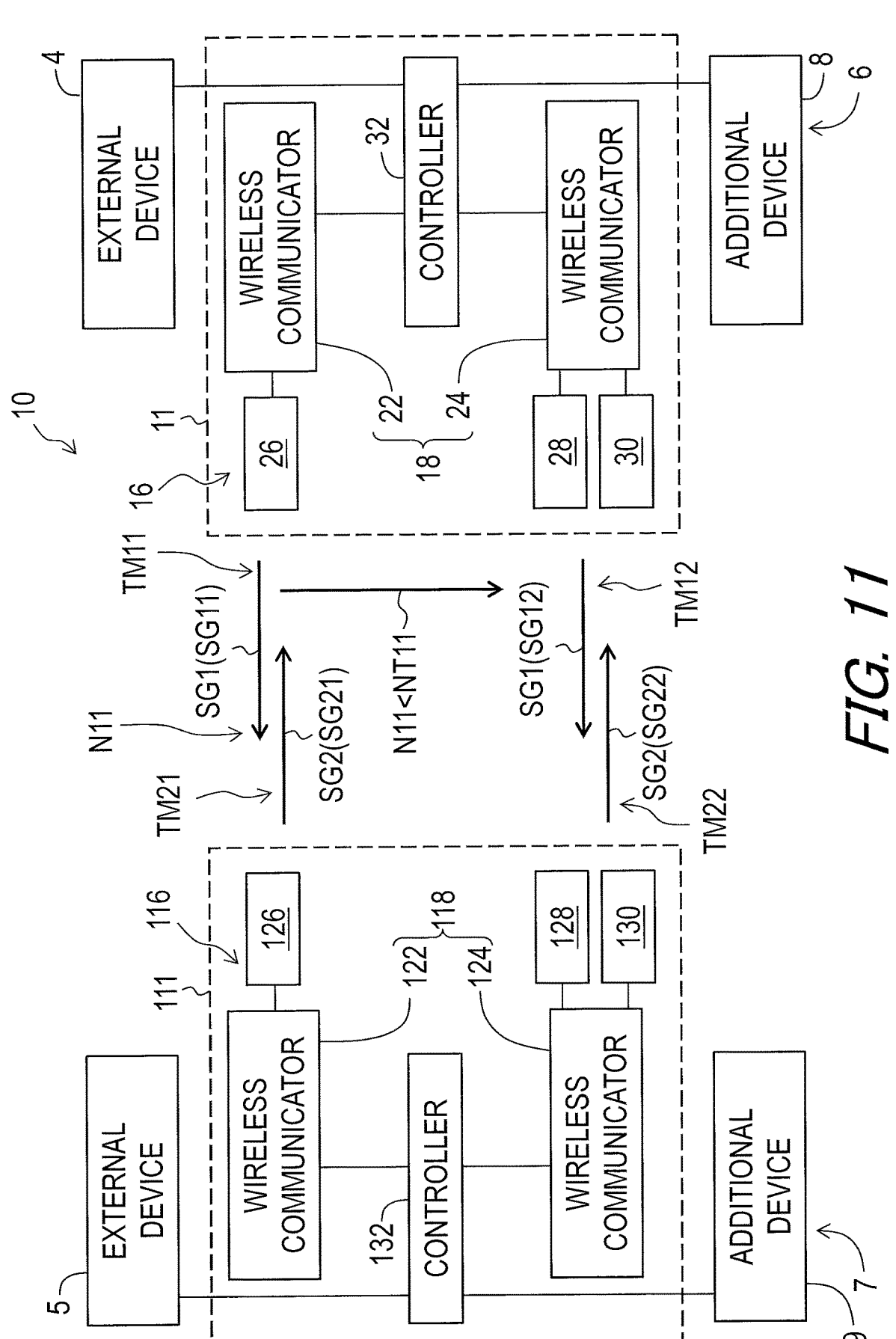
Figure 12:
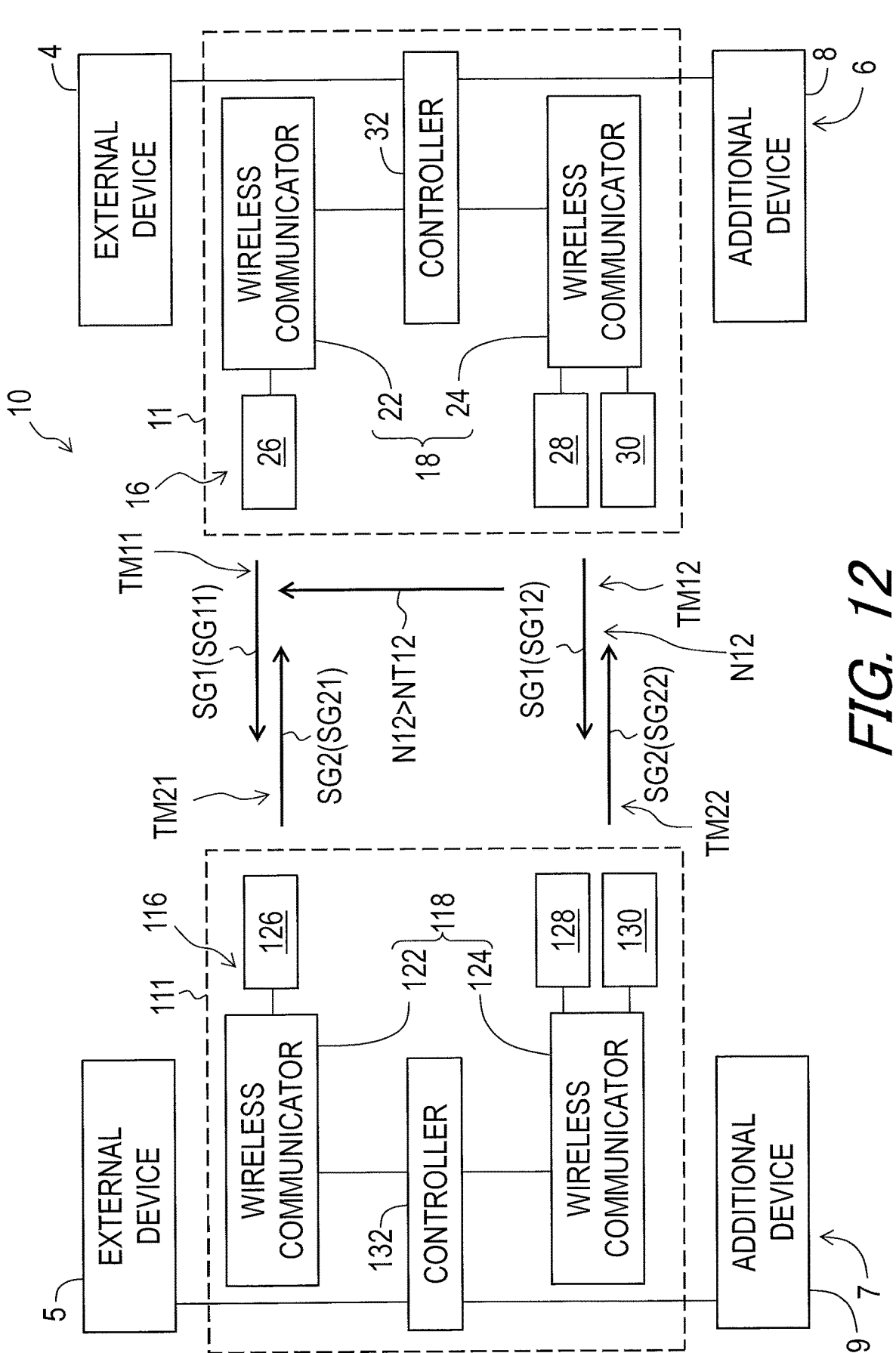

As seen in FIGS. 11 and 12, the channel information used in the controller 32 includes a noise on the communication channel The controller 32 is configured to assign the first wireless communicator 22 in accordance with the noise on the communication cannel. The controller 32 is configured to assign the second wireless communicator 24 in accordance with the noise on the communication cannel.

As seen in FIG. 11, the controller 32 is configured to detect a first noise N11 on the first communication channel of the first wireless communicator 22. The controller 32 is configured to assign the second wireless communicator 24 if the first noise N11 on the first wireless communication channel is greater than a first noise threshold NT11. The controller 32 is configured to maintain the first wireless communicator 22 if the first noise N11 on the first wireless communication channel is equal to or less than the first noise threshold NT11.

As seen in FIG. 12, the controller 32 is configured to detect a second noise N12 on the second communication channel of the second wireless communicator 24. The controller 32 is configured to assign the first wireless communicator 22 if the second noise N12 on the second wireless communication channel is greater than a second noise threshold NT12. The controller 32 is configured to maintain the second wireless communicator 24 if the second noise N12 on the second wireless communication channel is equal to or less than the second noise threshold NT12.

As with the controller 32, the channel information used in the controller 132 can include a noise on the communication channel. The controller 132 can be configured to assign the first wireless communicator 122 in accordance with the noise on the communication cannel. The controller 132 can be configured to assign the second wireless communicator 124 in accordance with the noise on the communication cannel.

Figure 13:
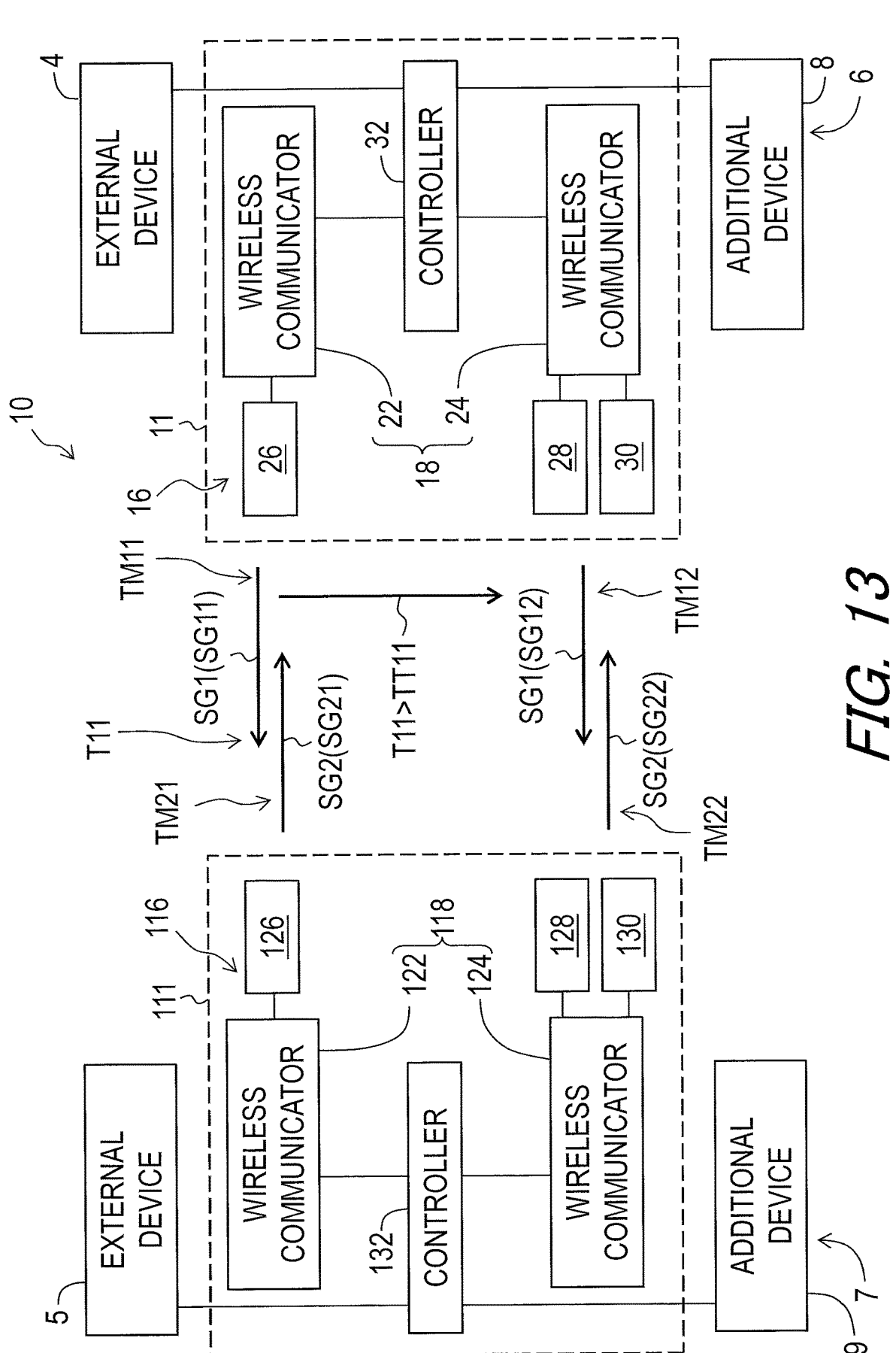
Figure 14:
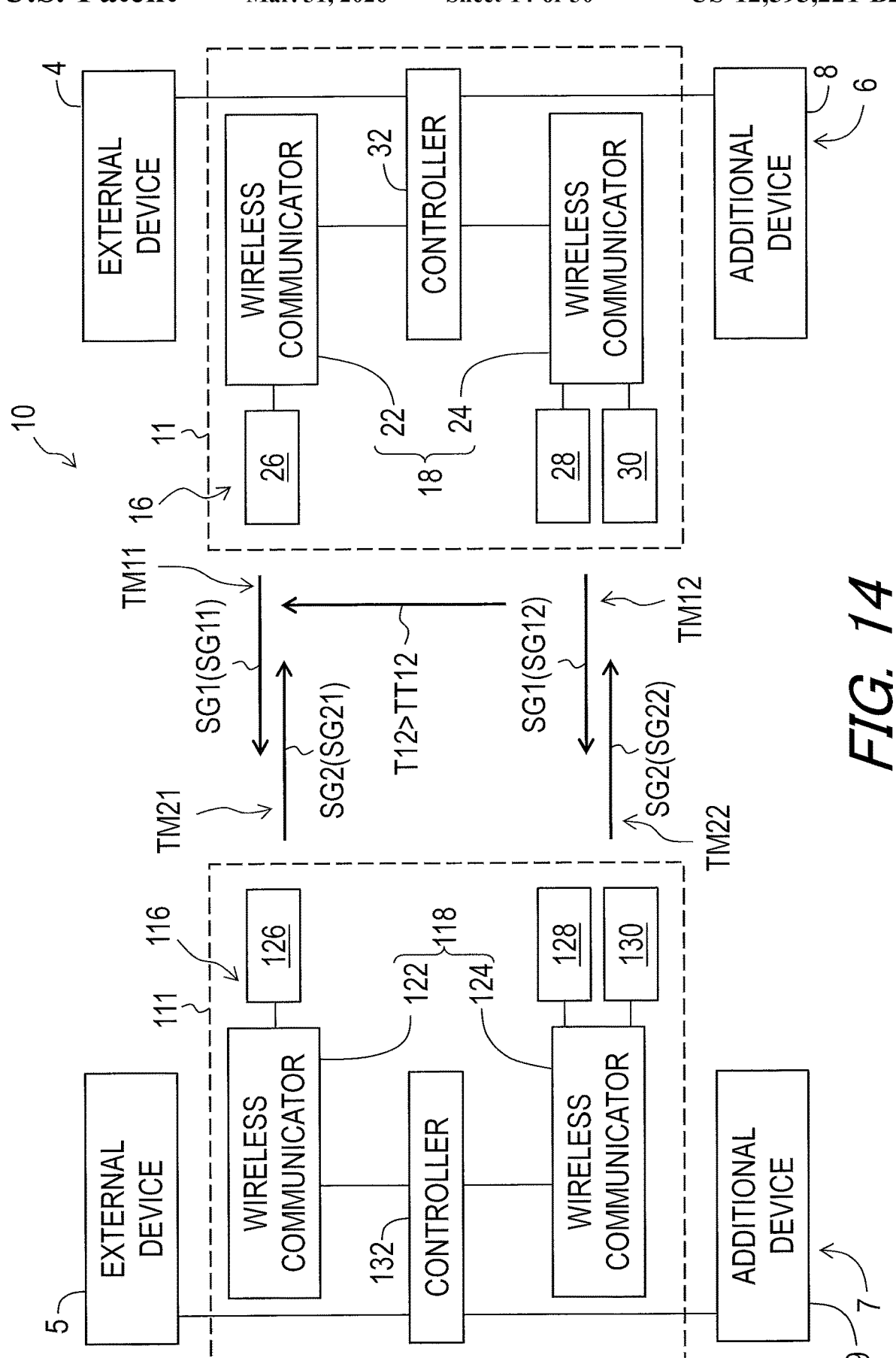

As seen in FIGS. 13 and 14, the predetermined condition used in the controller 32 includes a transmission time for which at least one of the first wireless communicator 22 and the second wireless communicator 24 transmits the signal SG1. The controller 32 is configured to obtain the transmission time for which at least one of the first wireless communicator 22 and the second wireless communicator 24 successfully transmits the signal SG1. The controller 32 is configured to assign the first wireless communicator 22 in accordance with the transmission time. The controller 32 is configured to assign the second wireless communicator 24 in accordance with the transmission time.

The transmission time used in the controller 32 includes an interval between a plurality of signals transmitted from at least one of the first wireless communicator 22 and the second wireless communicator 24. The transmission time used in the controller 32 includes a first interval between a plurality of first signals SG11 transmitted from the first wireless communicator 22. The transmission time used in the controller 32 includes a second interval between a plurality of second signals SG12 transmitted from the second wireless communicator 24.

The predetermined condition used in the controller 32 includes a first transmission time T11 for which the first wireless communicator 22 transmits the first signal SG11. The controller 32 is configured to obtain the first transmission time T11 for which the first wireless communicator 22 successfully transmits the first signal SG11.

The first transmission time T11 is a time from a timing at which the first wireless communicator 22 starts to transmit the first signal SG11 to a timing at which the first wireless communicator 22 receives the acknowledge signal SG21 transmitted from the first wireless communicator 122 of the wireless communicator unit 118. The controller 32 is configured to count the first transmission time T11 from the timing at which the first wireless communicator 22 starts to transmit the first signal SG11 to the timing at which the first wireless communicator 22 receives the acknowledge signal SG21.

The predetermined condition used in the controller 32 includes a second transmission time T12 for which the second wireless communicator 24 transmits the second signal SG22. The controller 32 is configured to obtain the second transmission time T12 for which the second wireless communicator 24 successfully transmits the second signal SG22.

The second transmission time T12 is a time from a timing at which the second wireless communicator 24 starts to transmit the second signal SG12 to a timing at which the second wireless communicator 24 receives the acknowledge signal SG22 transmitted from the second wireless communicator 124 of the wireless communicator unit 118. The controller 32 is configured to count the second transmission time T12 from the timing at which the second wireless communicator 24 starts to transmit the second signal SG12 to the timing at which the second wireless communicator 24 receives the acknowledge signal SG22.

As seen in FIG. 13, the controller 32 is configured to assign the second wireless communicator 24 in accordance with the first transmission time T11. The controller 32 is configured to assign the second wireless communicator 24 if the first transmission time T11 is longer than a first transmission-time threshold TT1. The controller 32 is configured to maintain the first wireless communicator 22 if the first transmission time T11 is equal to or shorter than the first transmission-time threshold TT1.

As seen in FIG. 14, the controller 32 is configured to assign the first wireless communicator 22 in accordance with the second transmission time T12. The controller 32 is configured to assign the first wireless communicator 22 if the second transmission time T12 is longer than a second transmission-time threshold TT12. The controller 32 is configured to maintain the second wireless communicator 24 if the second transmission time T12 is equal to or shorter than the second transmission-time threshold TT12.

As with the controller 32, the predetermined condition used in the controller 132 can include a transmission time for which at least one of the first wireless communicator 122 and the second wireless communicator 124 transmits the signal SG2. The controller 132 can be configured to assign the first wireless communicator 122 in accordance with the transmission time. The controller 132 can be configured to assign the second wireless communicator 124 in accordance with the transmission time.

Figure 15:
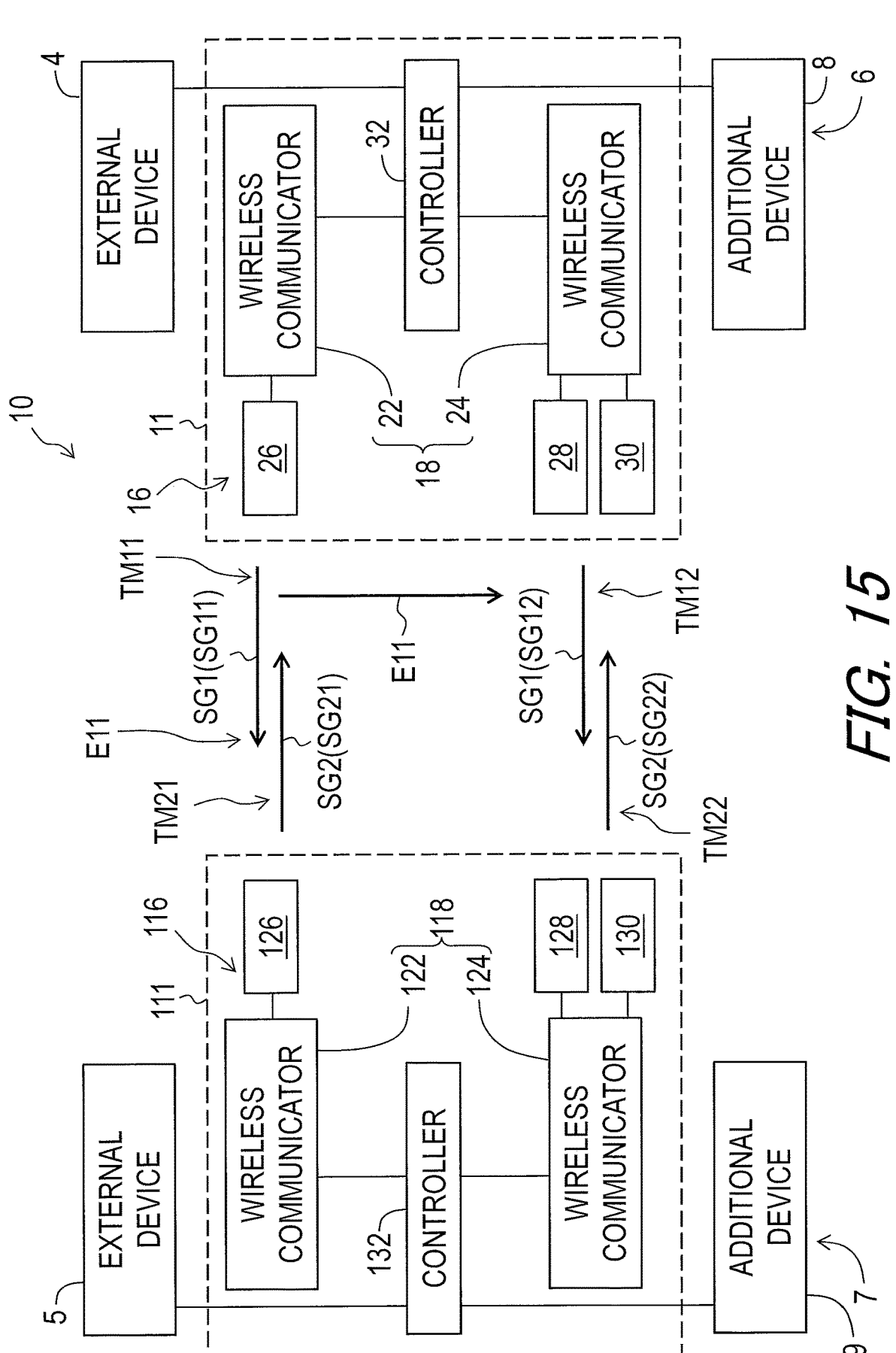
Figure 16:
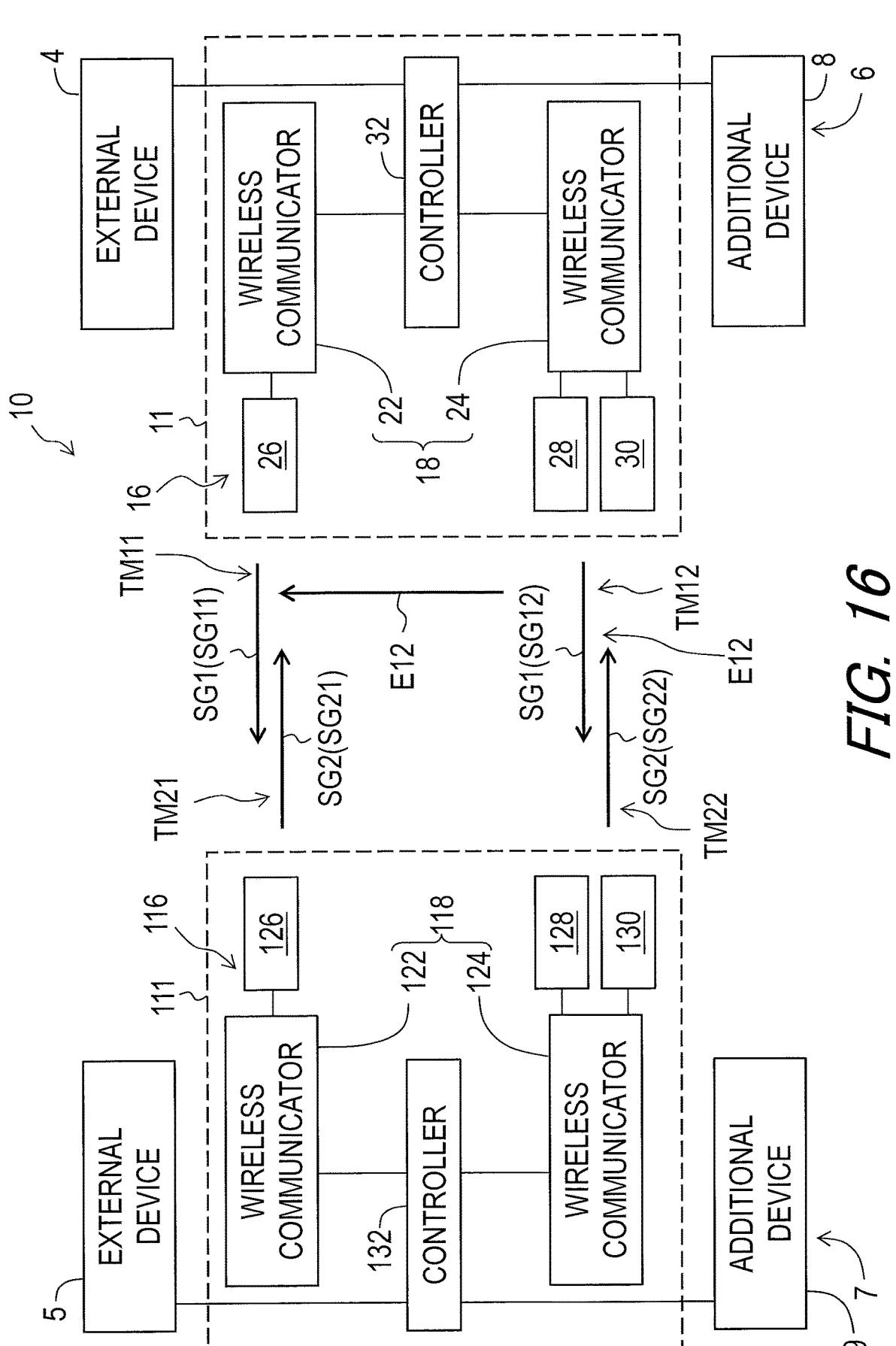

As seen in FIGS. 15 and 16, the predetermined condition used in the controller 32 includes error information relating to one of the first wireless communicator 22 and the second wireless communicator 24. The controller 32 is configured to assign the first wireless communicator 22 in accordance with the error information. The controller 32 is configured to assign the second wireless communicator 24 in accordance with the error information.

For example, the error information indicates that one of the first wireless communicator 22 and the second wireless communicator 24 fails to receive the acknowledge signal SG2 for error determination time after the one of the first wireless communicator 22 and the second wireless communicator 24 starts to transmit the signal SG1. The error information includes first error information E11 indicating that the first wireless communicator 22 fails to receive the acknowledge signal SG21 for a first error determination time after the first wireless communicator 22 starts to transmit the first signal SG11. The error information includes second error information E12 indicating that the second wireless communicator 24 fails to receive the acknowledge signal SG22 for a second error determination time after the second wireless communicator 24 starts to transmit the second signal SG22. The error information can be caused by errors such as a segment error and a hardware error of one of the first wireless communicator 22 and the second wireless communicator 24.

As seen in FIG. 15, the controller 32 is configured to assign the second wireless communicator 24 if the controller 32 detects the first error information E11. The controller 32 is configured to maintain the first wireless communicator 22 if the controller 32 does not detect the first error information E11 while the controller 32 uses the first wireless communicator 22.

As seen in FIG. 16, the controller 32 is configured to assign the first wireless communicator 22 if the controller 32 detects the second error information E12. The controller 32 is configured to maintain the second wireless communicator 24 if the controller 32 does not detect the second error information E12 while the controller 32 uses the second wireless communicator 24.

As with the controller 32, the predetermined condition used in the controller 132 can include error information relating to one of the first wireless communicator 122 and the second wireless communicator 124. The controller 132 can be configured to assign the first wireless communicator 122 in accordance with the error information. The controller 132 can be configured to assign the second wireless communicator 124 in accordance with the error information.

Figure 17:
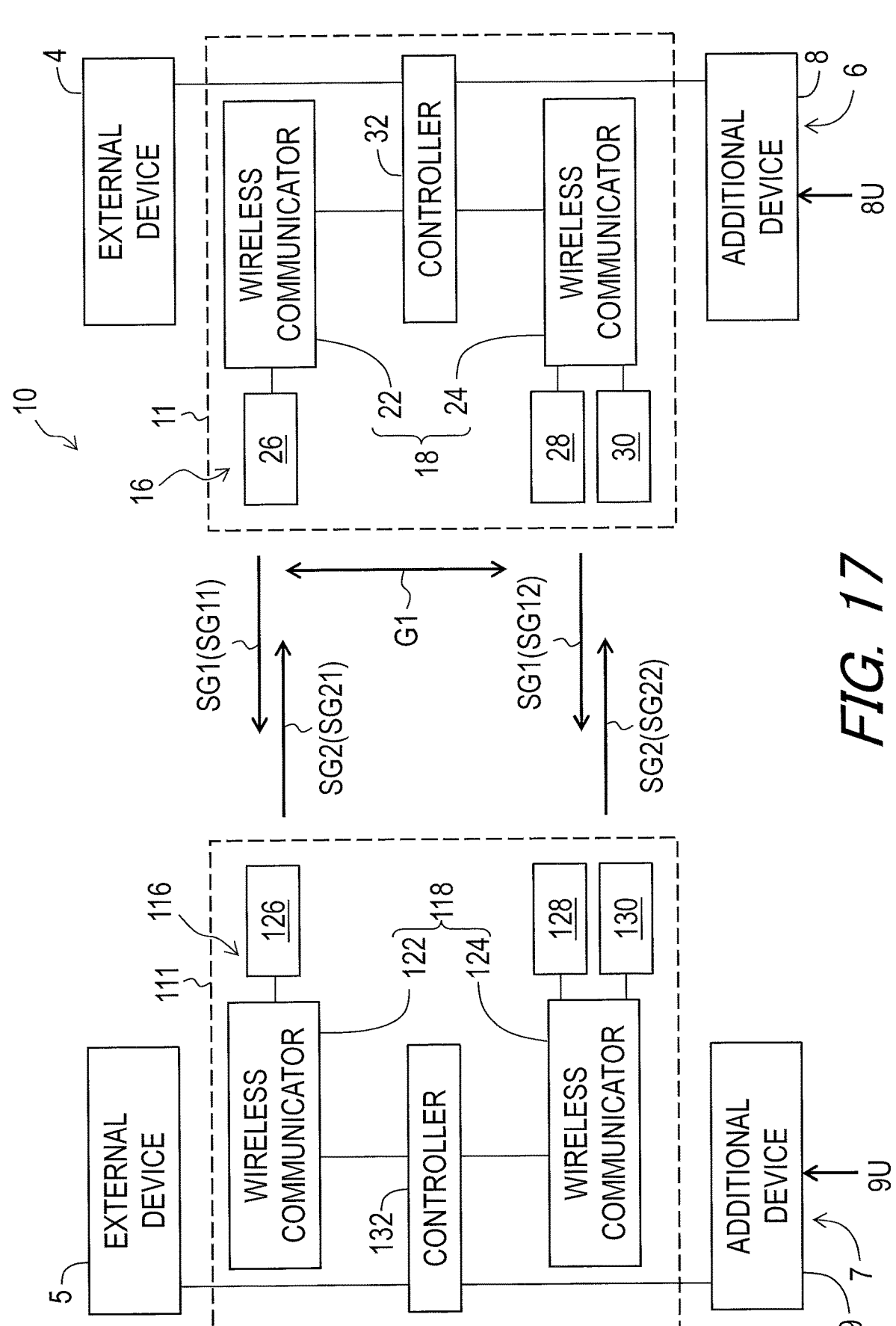
Figure 18:
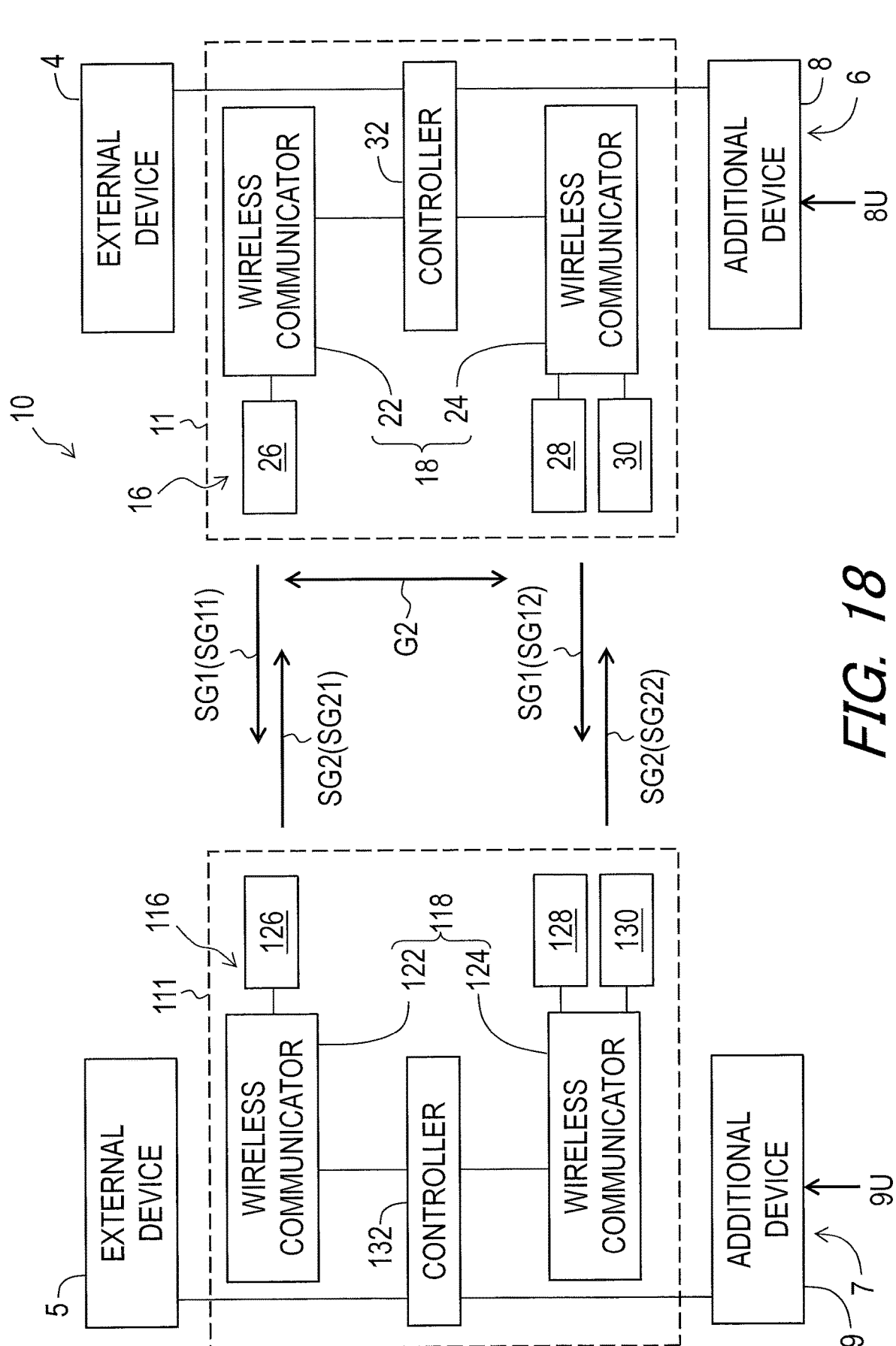

As seen in FIGS. 17 and 18, the predetermined condition used in the controller 32 includes geographical information. The controller 32 is configured to modify the signal transmitting manner in accordance with the geographical information. The controller 32 is configured to change the signal transmitting manner from the first signal transmitting manner TM11 to the second signal transmitting manner TM12 in accordance with the geographical information. The controller 32 is configured to change the signal transmitting manner from the second signal transmitting manner TM12 to the first signal transmitting manner TM11 in accordance with the geographical information.

As seen in FIG. 17, the geographical information used in the controller 32 includes a geographical condition G1. The controller 32 is configured to modify the signal transmitting manner in accordance with the geographical condition G1. The controller 32 is configured to change the signal transmitting manner from the first signal transmitting manner TM11 to the second signal transmitting manner TM12 in accordance with the geographical condition G1. The controller 32 is configured to change the signal transmitting manner from the second signal transmitting manner TM12 to the first signal transmitting manner TM11 in accordance with the geographical condition G1.

The geographical condition G1 includes crowded areas with at least one of development of infrastructure and a high population density. Examples of the crowded areas include urban areas. The crowded areas can be set in advance or can be inputted by uses via an external device such as a server storing data including the crowded areas.

The controller 32 is configured to modify the signal transmitting manner if a current geographical location sensed by the position sensor 55 is coincident with at least one of the crowded areas included in the geographical condition G1.

The controller 32 is configured to change the signal transmitting manner from the first signal transmitting manner TM11 to the second signal transmitting manner TM12 if the current geographical location is coincident with at least one of the crowded areas included in the geographical condition G1 while the controller 32 assigns the first wireless communicator 22 to wirelessly transmit the signal SG11.

The controller 32 is configured to change the signal transmitting manner from the second signal transmitting manner TM12 to the first signal transmitting manner TM11 if the current geographical location is not coincident with at least one of the crowded areas included in the geographical condition G1 while the controller 32 assigns the second wireless communicator 24 to wirelessly transmit the signal SG12.

As seen in FIG. 18, the geographical information used in the controller 32 includes a relationship G2 between a geographical location of the wireless communicator unit 18 and a communication state of the wireless communicator unit 18. The controller 32 is configured to modify the signal transmitting manner in accordance with the relationship G2. The controller 32 is configured to change the signal transmitting manner from the first signal transmitting manner TM11 to the second signal transmitting manner TM12 in accordance with the relationship G2. The controller 32 is configured to change the signal transmitting manner from the second signal transmitting manner TM12 to the first signal transmitting manner TM11 in accordance with the relationship G2.

The relationship G2 includes interference areas where a wireless communication of an external wireless communicator is likely to interfere or has interfered with the wireless communication of the wireless communicator unit 18. The interference areas can be set in advance or can be inputted by uses via an external device such as a server storing data including the interference areas. The relationship G2 includes first interference areas where a wireless communication of an external wireless communicator is likely to interfere or has interfered with the wireless communication of the first wireless communicator 22. The relationship G2 includes second interference areas where a wireless communication of an external wireless communicator is likely to interfere or has interfered with the wireless communication of the second wireless communicator 24. The first interference areas can be set in advance or can be inputted by uses via an external device such as a server storing data including the first interference areas. The second interference areas can be set in advance or can be inputted by uses via an external device such as a server storing data including the second interference areas.

The controller 32 is configured to modify the signal transmitting manner if the current geographical location sensed by the position sensor 55 is coincident with at least one of the interference areas included in the relationship G2.

The controller 32 is configured to change the signal transmitting manner from the first signal transmitting manner TM11 to the second signal transmitting manner TM12 if the current geographical location is coincident with at least one of the second interference areas included in the relationship G2 while the controller 32 assigns the first wireless communicator 22 to wirelessly transmit the signal SG11.

The controller 32 is configured to change the signal transmitting manner from the second signal transmitting manner TM12 to the first signal transmitting manner TM11 if the current geographical location is coincident with at least one of the first interference areas included in the relationship G2 while the controller 32 assigns the second wireless communicator 24 to wirelessly transmit the signal SG-12.

As with the controller 32, the predetermined condition used in the controller 132 can include geographical information. The controller 132 can be configured to modify the signal transmitting manner in accordance with the geographical information. The geographical information used in the controller 132 can include a geographical condition. The controller 132 can be configured to modify the signal transmitting manner in accordance with the geographical condition. The geographical information used in the controller 132 can include a relationship between a geographical location of the wireless communicator unit 118 and a communication state of the wireless communicator unit 118. The controller 132 can be configured to modify the signal transmitting manner in accordance with the relationship.

Figure 19:
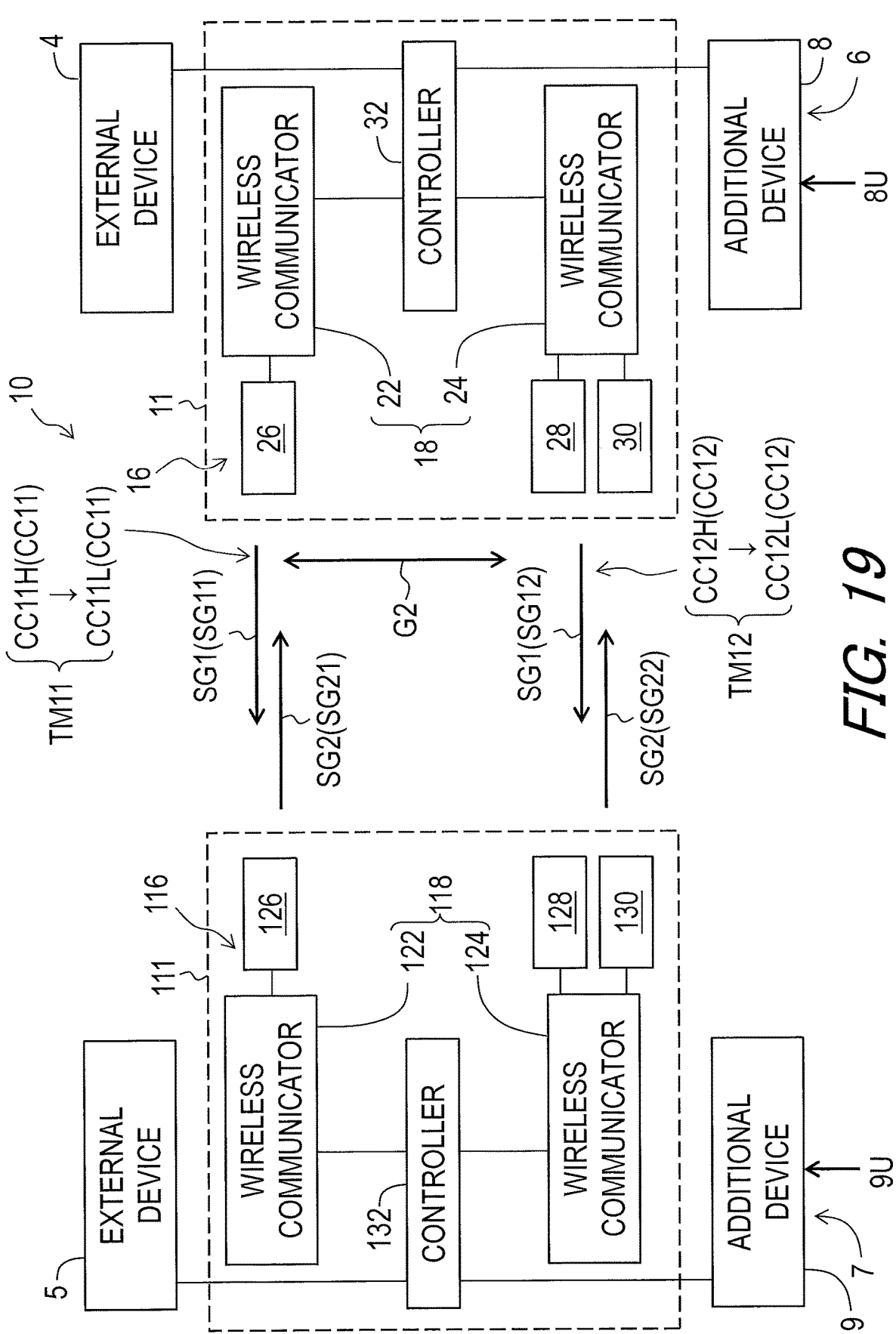

As seen in FIG. 19, the predetermined condition used in the controller 32 includes information indicating that ongoing transmission is being carried by another wireless communicator. The controller 32 is configured to modify the signal transmitting manner in accordance with the information. The controller 32 is configured to change the signal transmitting manner from the first signal transmitting manner TM11 to the second signal transmitting manner TM12 in accordance with the information. The controller 32 is configured to change the signal transmitting manner from the second signal transmitting manner TM12 to the first signal transmitting manner TM11 in accordance with the information.

The controller 32 is configured to control the wireless communicator unit 18 to search ongoing transmission which is being carried by another wireless communicator while the controller 32 assigns the wireless communicator unit 18 to wirelessly transmit the signal SG1. The controller 32 is configured to control the first wireless communicator 22 to search ongoing transmission which is being carried by another wireless communicator while the controller 32 assigns the first wireless communicator 22 to wirelessly transmit the signal SG11. The controller 32 is configured to control the second wireless communicator 24 to search ongoing transmission which is being carried by another wireless communicator while the controller 32 assigns the second wireless communicator 24 to wirelessly transmit the signal SG12.

The controller 32 is configured to change the signal transmitting manner from the first signal transmitting manner TM11 to the second signal transmitting manner TM12 if the first wireless communicator 22 finds ongoing transmission which is being carried by another wireless communicator and which can be detected by the first wireless communicator 22. The controller 32 can be configured to change the first communication capacity CC11 of the first wireless communicator 22 if the first wireless communicator 22 finds ongoing transmission which is being carried by another wireless communicator and which can be detected by the first wireless communicator 22. The first communication capacity CC11 includes a first higher communication capacity CC11H and a first lower communication capacity CC11L lower than the first higher communication capacity CC11H.

For example, the first higher communication capacity CC11H includes a receiving sensitivity higher than a receiving sensitivity of the first lower communication capacity CC11L.

For example, the controller 32 is configured to change the first communication capacity CC11 of the first wireless communicator 22 from the first higher communication capacity CC11H to the first lower communication capacity CC11L if the first wireless communicator 22 finds ongoing transmission which is being carried by another wireless communicator and which can be detected by the first wireless communicator 22. The controller 32 is configured to maintain the first lower communication capacity CC11L if the first wireless communicator 22 does not find ongoing transmission which is being carried by another wireless communicator and which can be detected by the first wireless communicator 22.

The controller 32 is configured to change the signal transmitting manner from the second signal transmitting manner TM12 to the first signal transmitting manner TM11 if the second wireless communicator 24 finds ongoing transmission which is being carried by another wireless communicator and which can be detected by the second wireless communicator 24. The controller 32 can be configured to change the second communication capacity CC12 of the second wireless communicator 24 if the second wireless communicator 24 finds ongoing transmission which is being carried by another wireless communicator and which can be detected by the second wireless communicator 24. The second communication capacity CC12 includes a second higher communication capacity CC12H and a second lower communication capacity CC12L lower than the second higher communication capacity CC12H. For example, the second higher communication capacity CC12H includes a receiving sensitivity higher than a receiving sensitivity of the second lower communication capacity CC12L.

For example, the controller 32 is configured to change the second communication capacity CC12 of the second wireless communicator 24 from the second higher communication capacity CC12H to the second lower communication capacity CC12L if the second wireless communicator 24 finds ongoing transmission which is being carried by another wireless communicator and which can be detected by the second wireless communicator 24. The controller 32 is configured to maintain the second lower communication capacity CC12L if the second wireless communicator 24 does not find ongoing transmission which is being carried by another wireless communicator and which can be detected by the second wireless communicator 24.

As with the controller 32, the predetermined condition used in the controller 132 can include information indicating that ongoing transmission is being carried by another wireless communicator. The controller 132 can be configured to modify the signal transmitting manner in accordance with the information.

Second Embodiment

A control system 210 including an electrical control device 211 in accordance with a second embodiment will be described below referring to FIGS. 20 and 21. The control system 210 has the same structure and/or configuration as those of the control system 10 except for the electrical control device 11. Thus, elements having substantially the same function as those in the first embodiment will be numbered the same here and will not be described and/or illustrated again in detail here for the sake of brevity.

Figure 20:
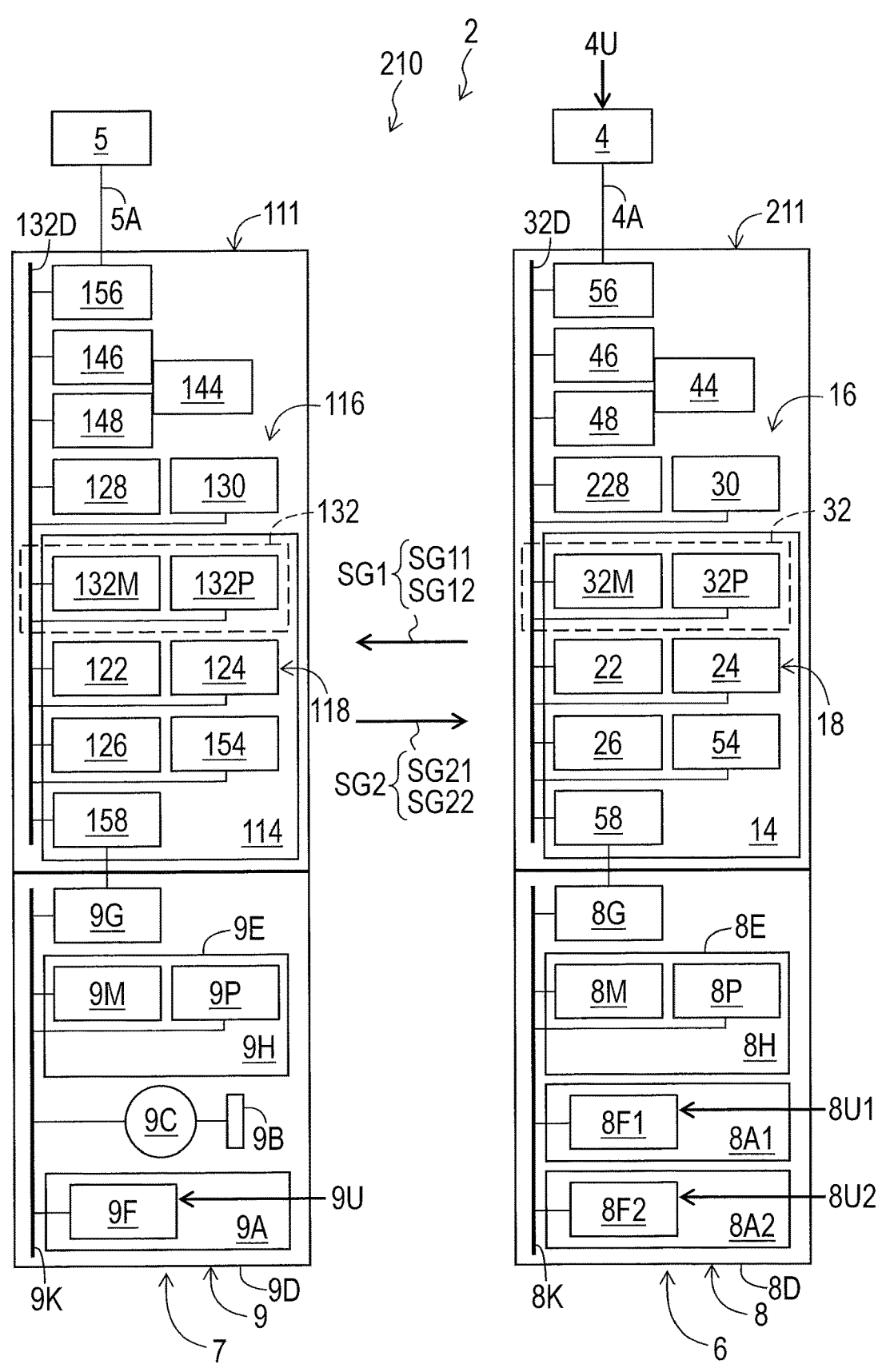
FIG. 20 is a schematic block diagram of a control system including an electrical control device in accordance with a second embodiment.

As seen in FIG. 20, the electrical control device 211 has substantially the same structure as the structure of the electrical control device 11. The electrical control device 211 comprises a wireless communication device 216. The wireless communication device 216 has substantially the same structure as the structure of the wireless communication device 16.

The wireless communication device 16 further comprises a second antenna 228. Namely, the electrical control device 211 for the human-powered vehicle 2 comprises the second antenna 228. The second antenna 228 is electrically mounted on the circuit board 14 as a one-chip integrated circuit as with the first antenna 26.

The second antenna 228 is separate from the first antenna 26. The second wireless communicator 24 is electrically connected to the second antenna 228. The wireless communicator 24 is electrically connected to the circuit board 14. The second antenna 228 is configured to be electrically connected to the circuit board 14. The wireless communicator 24 is electrically connected to the second antenna 228 via the circuit board 14. The second antenna 228 can also be referred to as an antenna 228. Namely, the electrical control device 211 for the human-powered vehicle 2 comprises the antenna 228. The antenna 228 is configured to be electrically connected to the circuit board 14.

The second antenna 228 is configured to communicate with the at least one electric component 7. The second wireless communicator 24 is configured to wirelessly communicate with the at least one electric component 7 via the second antenna 228.

The first antenna 26 is disposed on the first position on the circuit board 14. The second antenna 228 is disposed in a second position different from the first position. The first position is defined on the first surface 14A of the circuit board 14. The second position of the second antenna 228 is defined on the second surface 14B of the circuit board 14. The second antenna 228 is disposed on the second surface 14B of the circuit board 14. However, the second position of the second antenna 228 can be defined on the first surface 14A or in a position other than the second surface 14B if needed and/or desired.

Figure 21:
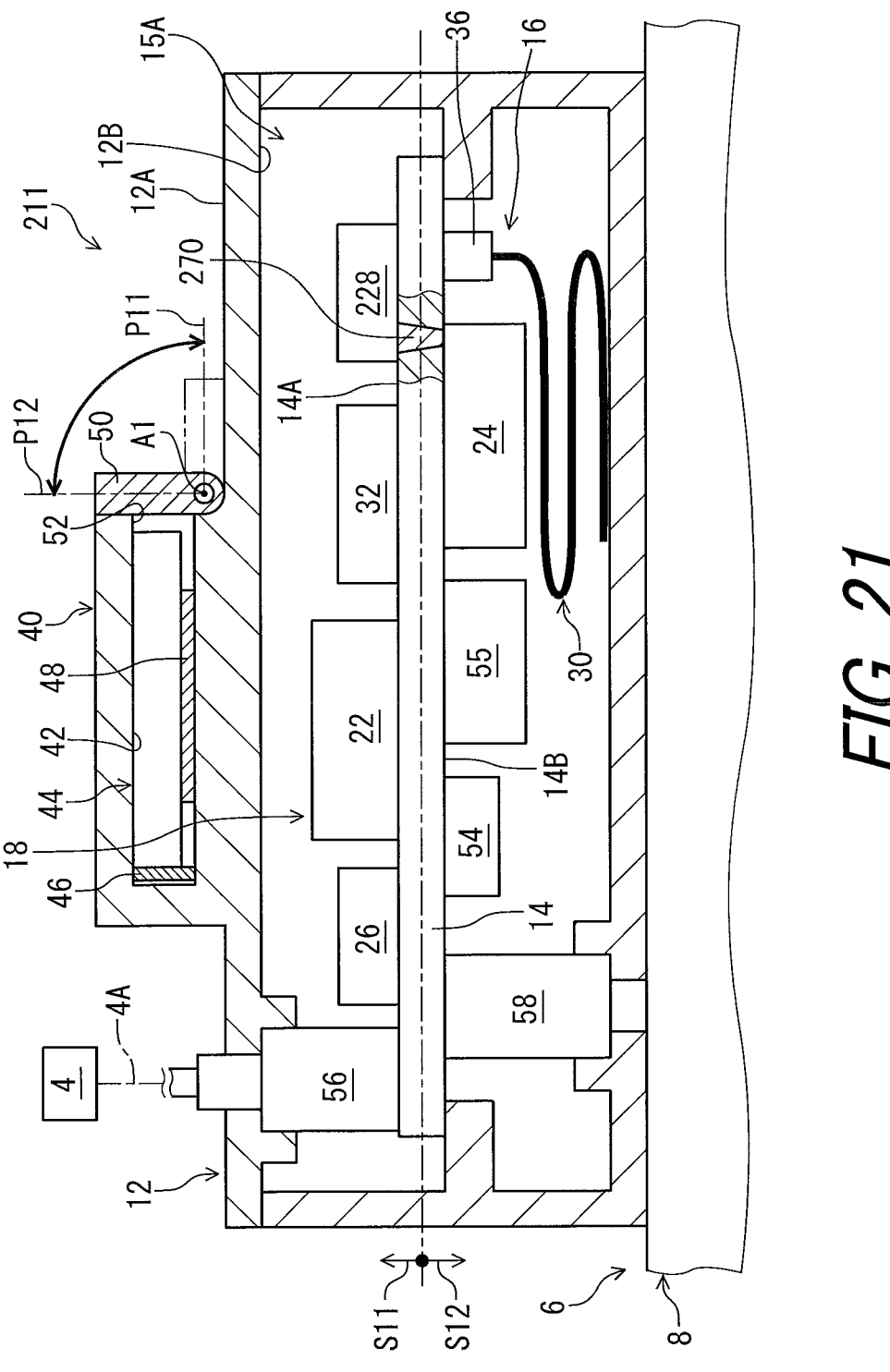
FIG. 21 is a cross-sectional view of the electrical control device illustrated in FIG. 20.

As seen in FIG. 21, the circuit board 14 further includes a conductor 270 extending from the first surface 14A to the second surface 14B through an inside of the circuit board 14. For example, the conductor 270 incudes at least one of a via (e.g., a buried via) and a through-hole.

The wireless communicator 22 or 24 and at least one of the first antenna 26 and the second antenna 228 are electrically connected to the conductor 270 to be electrically connected to each other through the conductor 270. In the second embodiment, the wireless communicator 24 and the second antenna 228 are electrically connected to the conductor 270 to be electrically connected to each other through the conductor 270. However, the wireless communicator 22 and the first antenna 26 can be electrically connected to a conductor such as the conductor 270 to be electrically connected to each other through the conductor if the wireless communicator 22 and the first antenna 26 are disposed on the first surface 14A and the second surface 14B of the circuit board 14.

Figure 22:
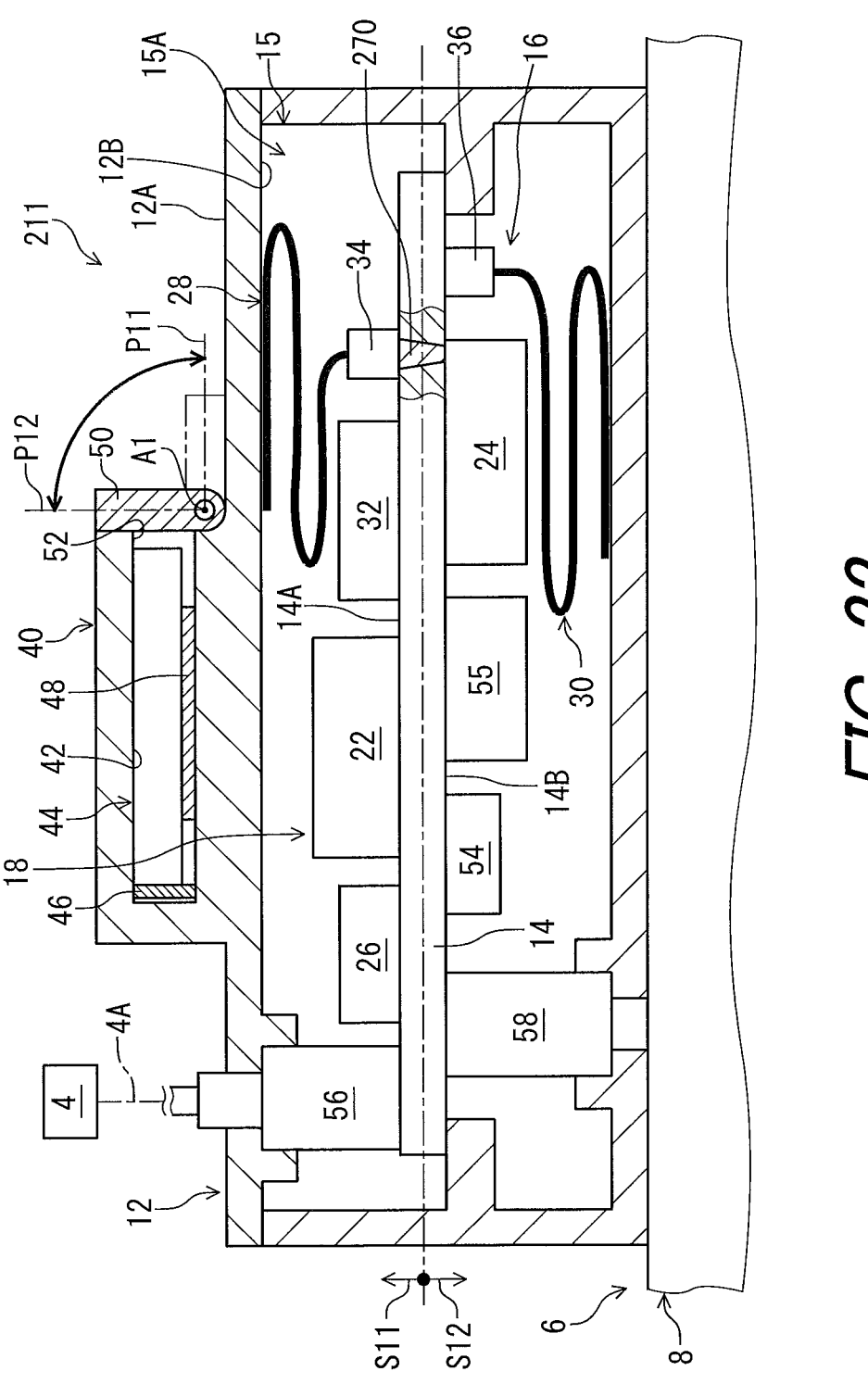
FIGS. 22 to 28 are cross-sectional views of electrical control devices in accordance with modifications.

In the second embodiment, the second antenna 228 is electrically mounted on the circuit board 14 as a one-chip integrated circuit as with the first antenna 26. As seen in FIG. 22, however, the second antenna 228 can be replaced with the second antenna 28 described in the first embodiment if needed and/or desired. In the modification depicted in FIG. 22, the wireless communicator 24 and the second antenna 228 are electrically connected to the conductor 270 to be electrically connected to each other through the conductor 270.

Figure 23:
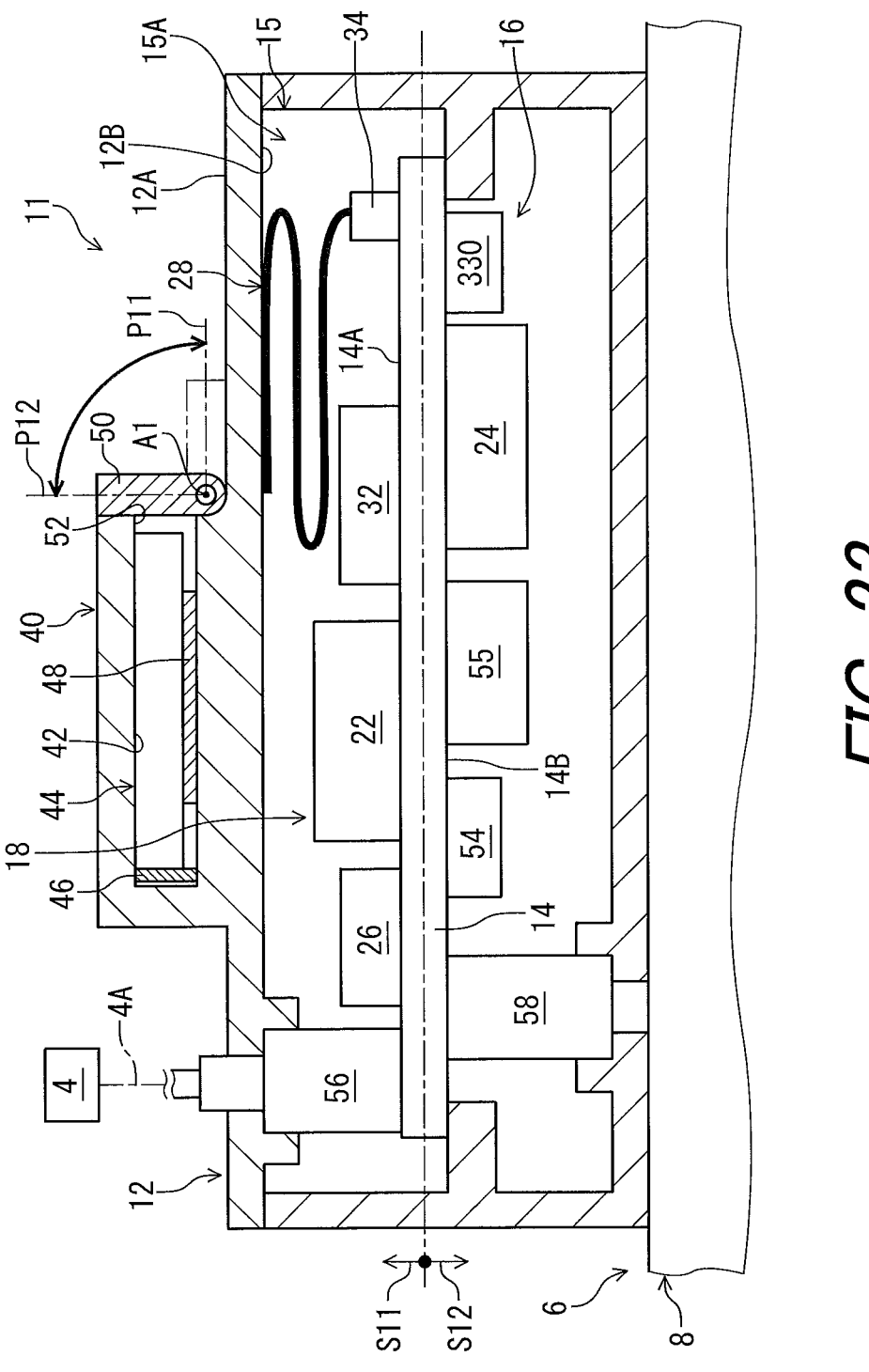
Figure 24:
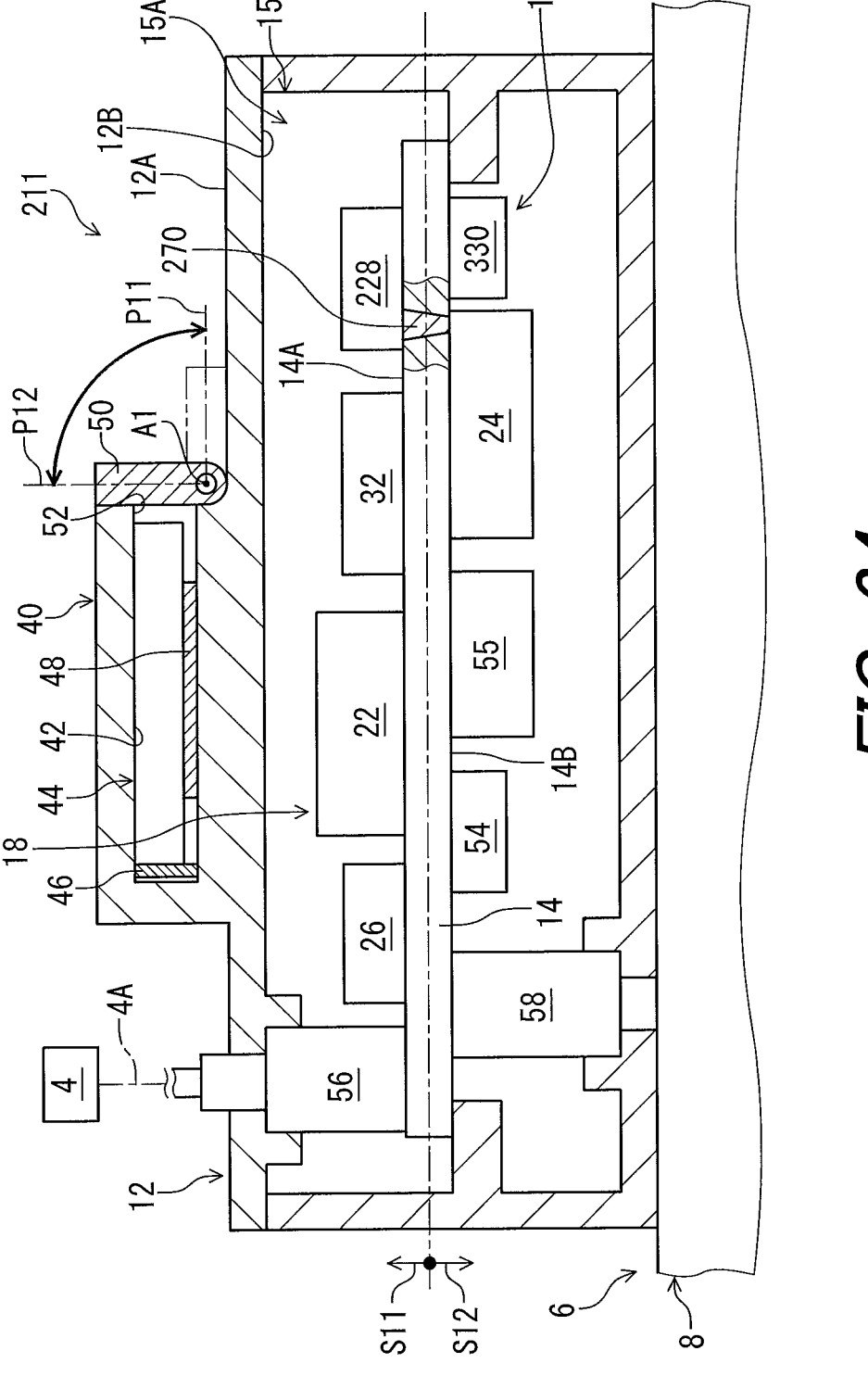

As seen in FIGS. 23 and 24, the second antenna 30 described in the first and second embodiments and the modifications thereof can be electrically mounted on the circuit board 14 as a one-chip integrated circuit as with the first antenna 26 and the second antenna 228. In the modifications depicted in FIGS. 23 and 24, the electrical control device 11 or 211 comprises a second antenna 330 electrically mounted on the circuit board 14 as a one-chip integrated circuit.

Figure 25:
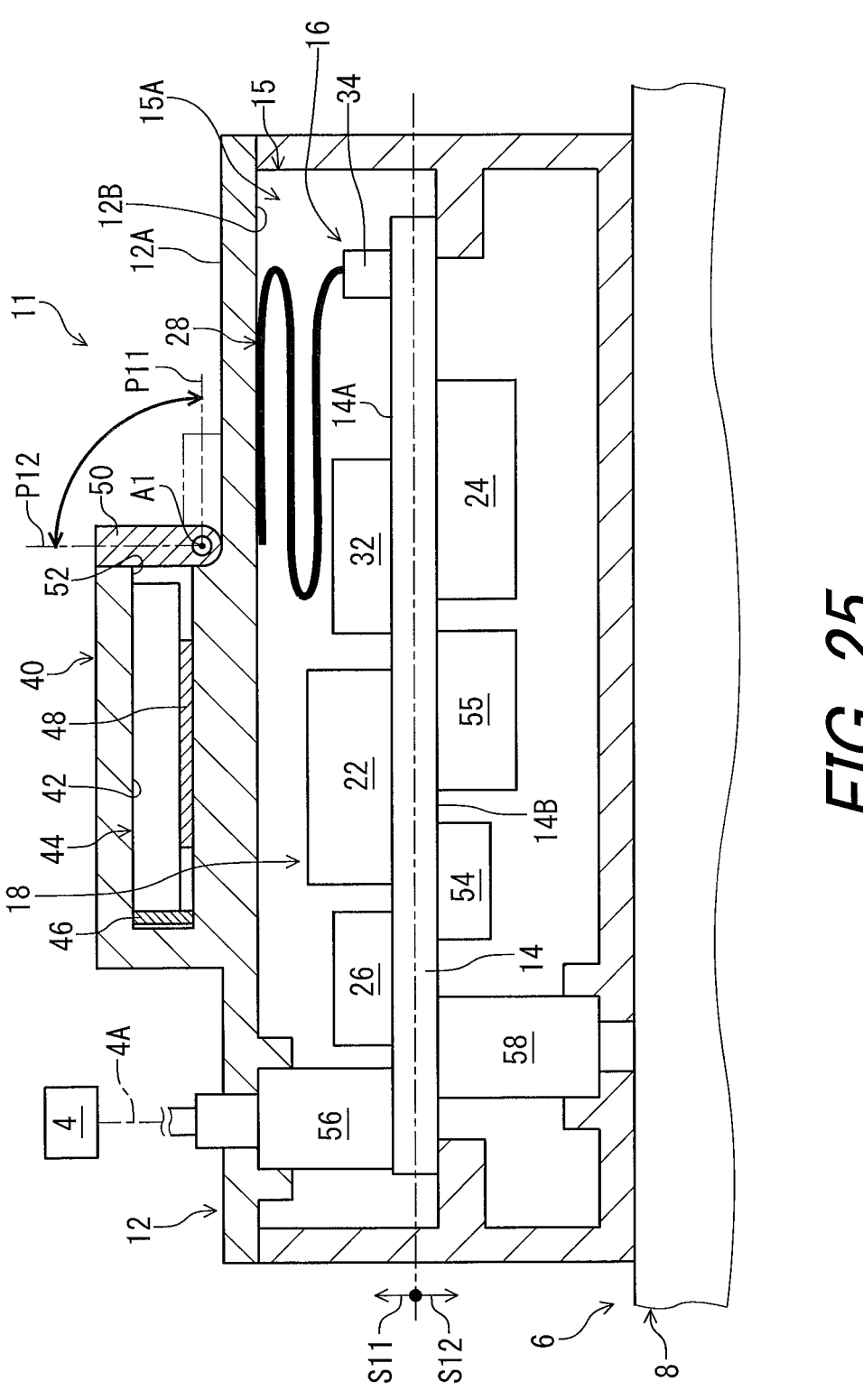
Figure 26:
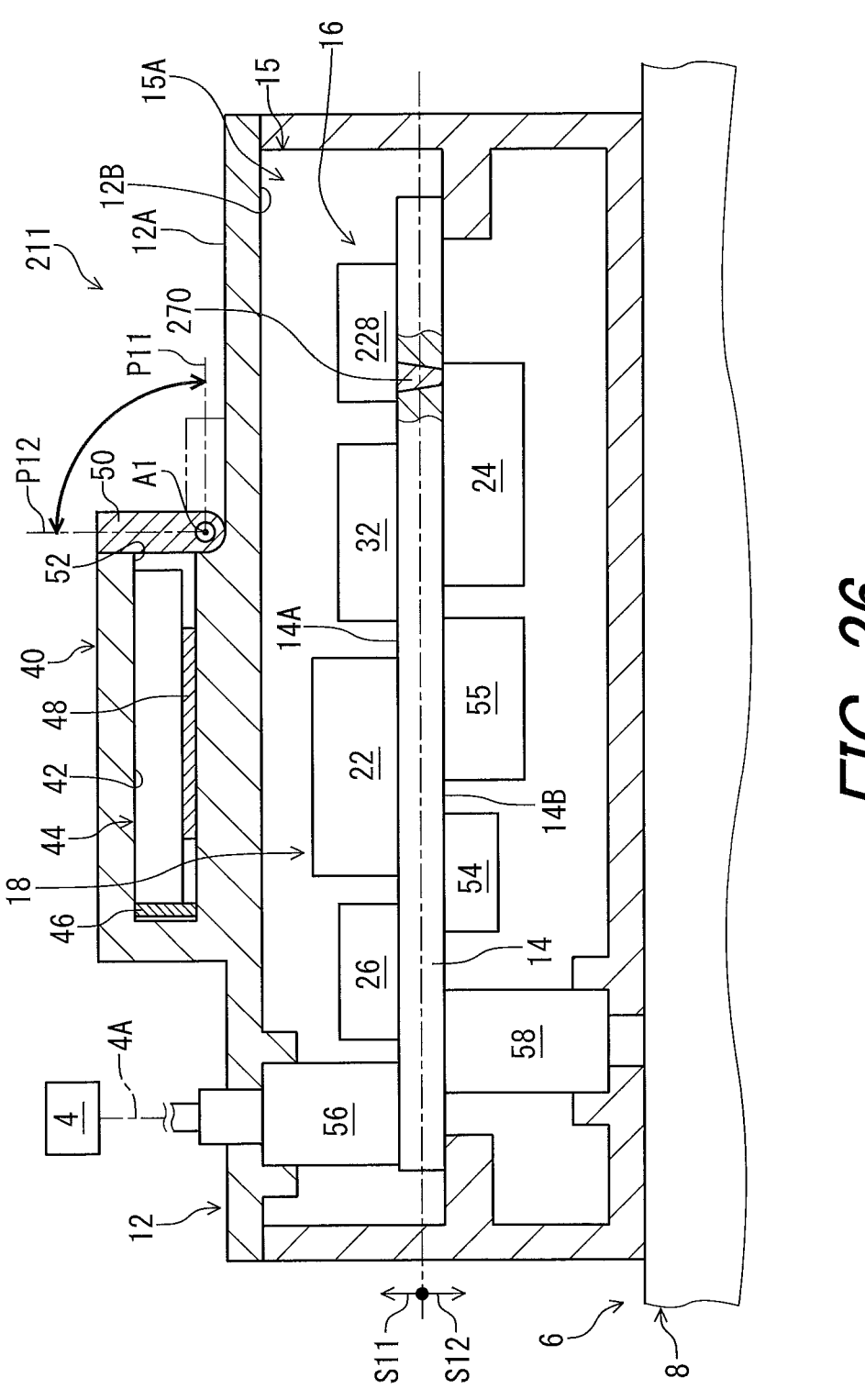

As seen in FIGS. 25 and 26, the second antenna 30 described in the first and second embodiments and the modifications thereof can be omitted from the electrical control device 11 or 211 if needed and/or desired.

Figure 27:
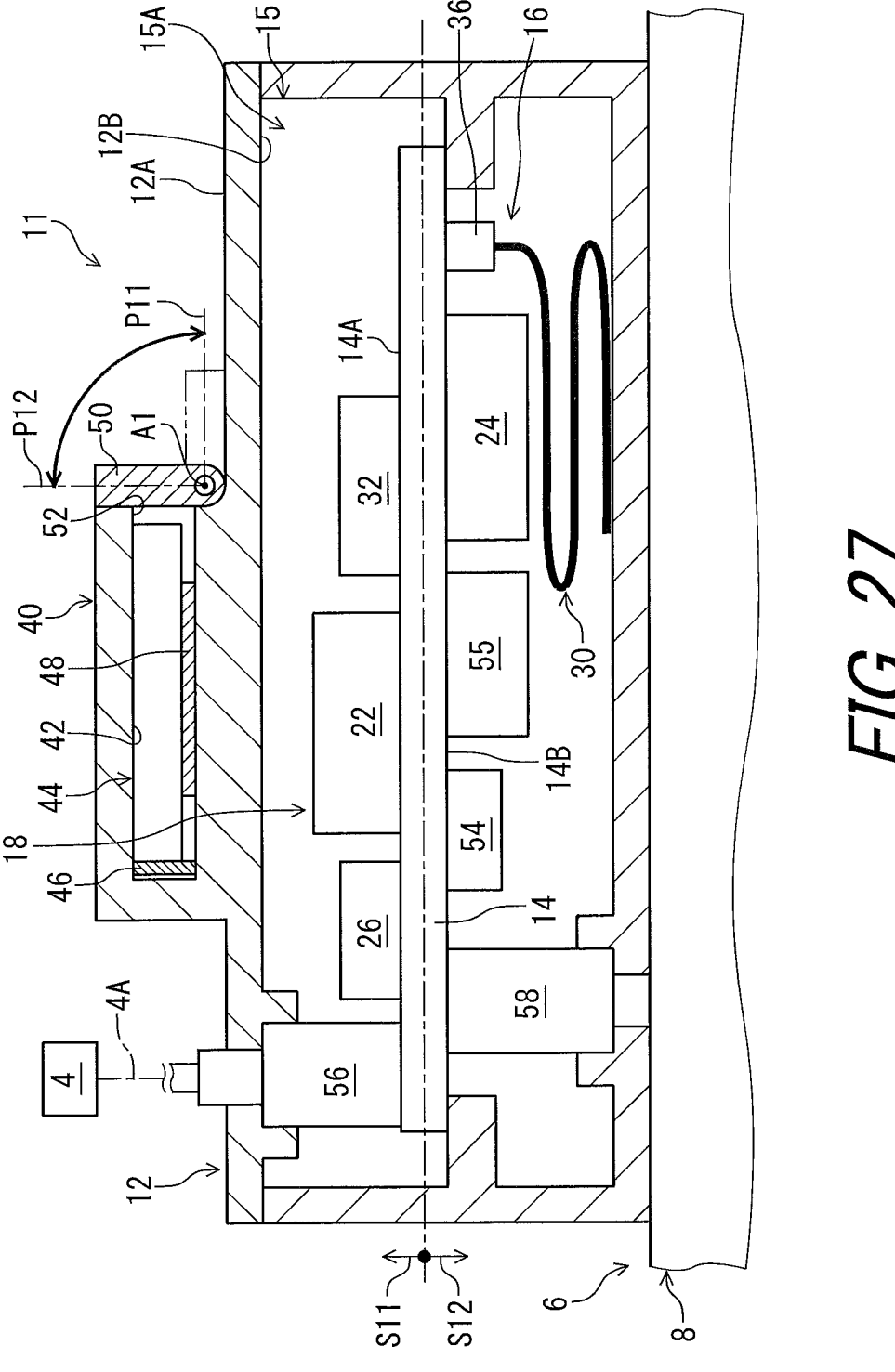
Figure 28:
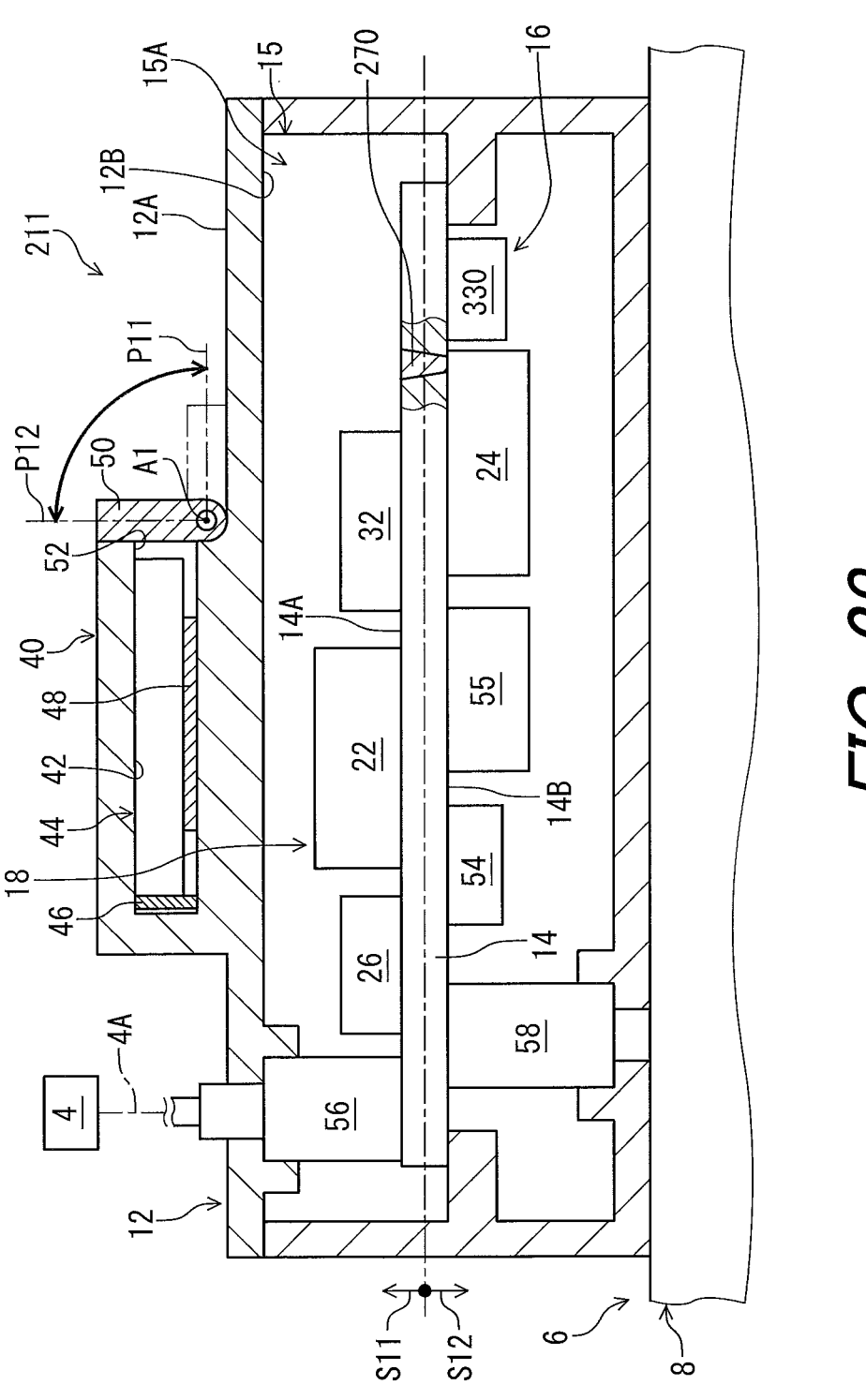

As seen in FIGS. 27 and 28, the second antennas 28 or 228 described in the first and second embodiments and the modifications thereof can be omitted from the electrical control device 11 or 211 if needed and/or desired.

At least one of the conductor 270, the second antenna 228, and the second antenna 330 described in the second embodiment and the modifications depicted in FIGS. 20 to 28 can be at least partially applied to the electrical control device 111 described in the first embodiment if needed and/or desired.

Figure 29:
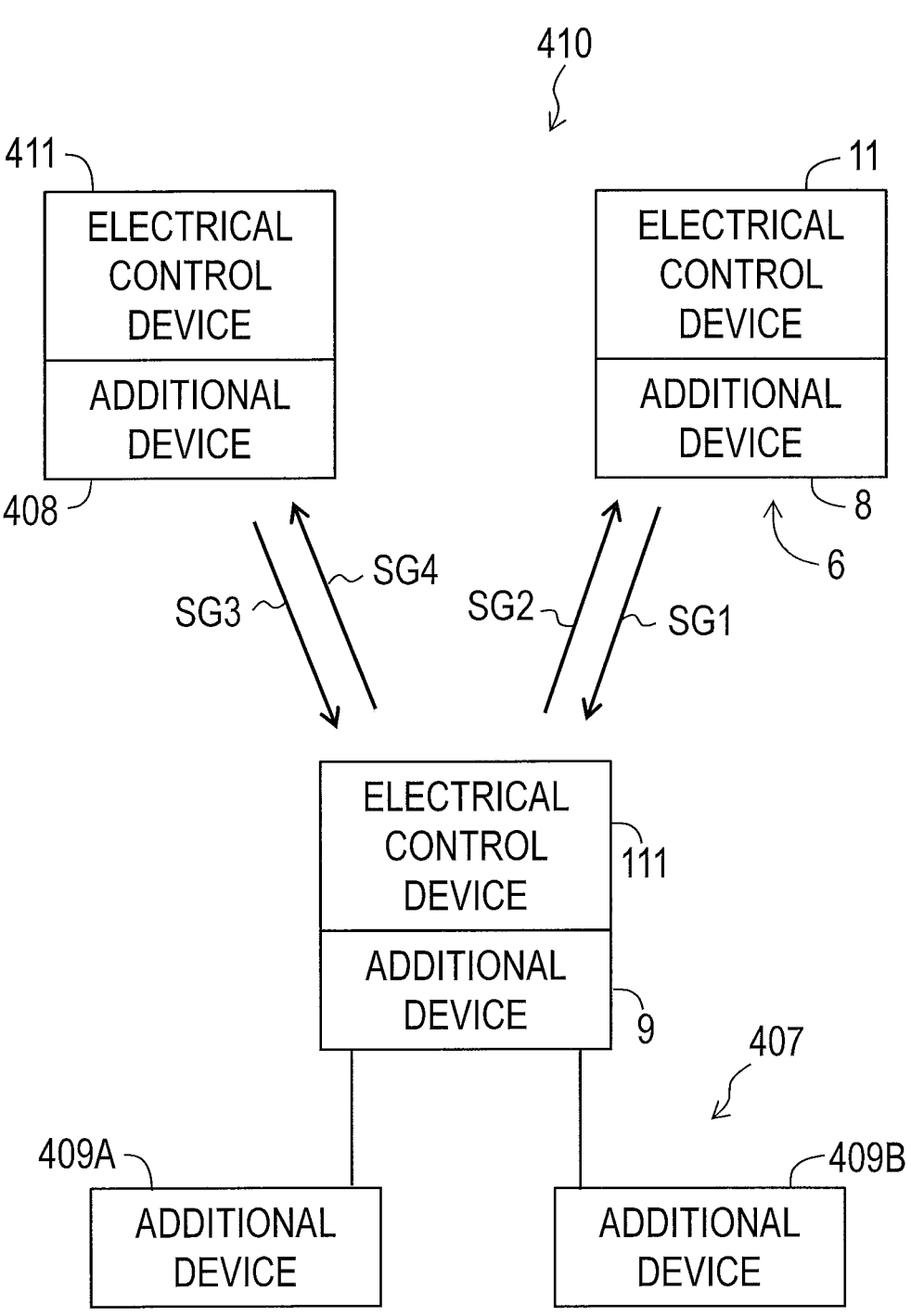
FIGS. 29 and 30 are schematic block diagrams of control systems in accordance with modifications.
Figure 30:
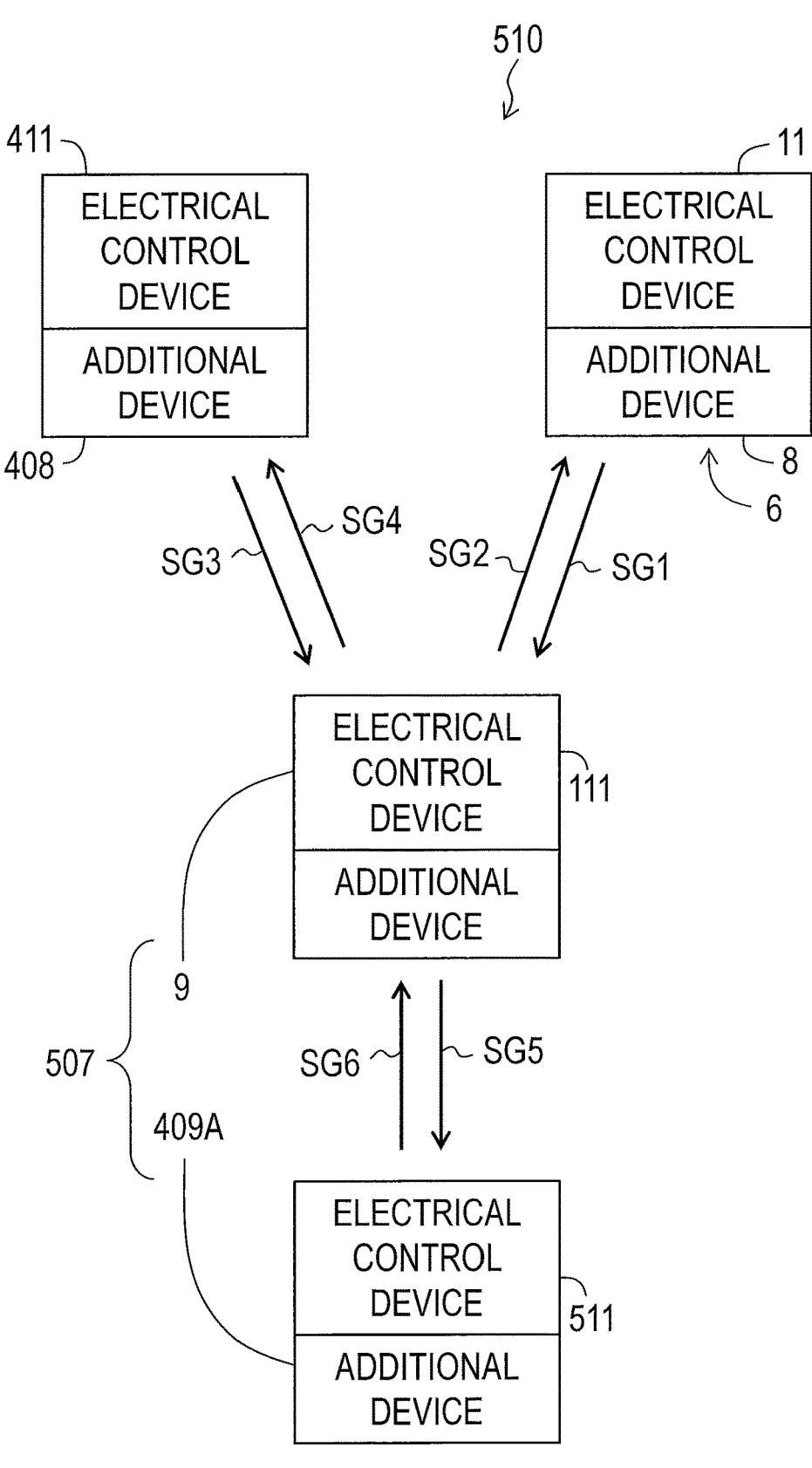

The electrical control devices 11, 111 and 211 and the modifications thereof can be applied to another control system such as control systems 410 and 510 depicted in FIGS. 29 and 30.

As seen in FIG. 29, the control system 410 includes the electrical control device 11, the additional device 8, the electrical control device 111, an electrical control device 411, an additional device 408, and at least one electric component 407. The electrical control device 411 has substantially the same structure as the structure of the electrical control device 11. The additional device 408 has substantially the same structure as the structure of the additional device 8. The electrical control device 411 is electrically connected to the additional device 408. The at least one electric component 407 includes additional devices 9, 409B, and 409C. The additional devices 409A and 409B are electrically connected to the additional device 9 via an electric cable.

For example, the additional device 9 includes a rear derailleur. The additional device 409A includes a front derailleur. The additional device 409B includes a battery unit configured to supply electricity to the additional devices 9 and 409A.

The electrical control device 411 is configured to wirelessly communicate with the electrical control device 111. The wireless communication between the electrical control devices 411 and 111 is substantially the same as the wireless communication between the electrical control devices 11 and 111. A wireless communicator unit of the electrical control device 411 is configured to wirelessly transmit a signal SG3. The wireless communicator unit 118 of the electrical control device 111 is configured to wirelessly transmit a signal SG4.

The additional device 9 is configured to execute upshifting or downshifting based on the signal SG1 wirelessly transmitted from the electrical control device 11 to the electrical control device 111. The additional device 9 is configured to control the additional device 409A to execute upshifting or downshifting based on the signal SG3 wirelessly transmitted from the electrical control device 411 to the electrical control device 111.

As seen in FIG. 30, the control system 510 includes the electrical control device 11, the additional device 8, the electrical control device 111, the electrical control device 411, an electrical control device 511, the additional device 408, and at least one electric component 507. The electrical control device 511 has substantially the same structure as the structure of the electrical control device 11. The at least one electric component 507 includes additional devices 9 and 409B. The electrical control device 511 is electrically connected to the additional device 409B. The additional device 409B is omitted from the at least one electric component 507.

The electrical control device 511 is configured to wirelessly communicate with the electrical control device 111. The wireless communication between the electrical control devices 111 and 511 is substantially the same as the wireless communication between the electrical control devices 11 and 111. The wireless communicator unit 118 of the electrical control device 111 is configured to wirelessly transmit a signal SG5. A wireless communicator unit of the electrical control device 511 is configured to wirelessly transmit a signal SG6.

The additional device 9 is configured to execute upshifting or downshifting based on the signal SG1 wirelessly transmitted from the electrical control device 11 to the electrical control device 111. The wireless communicator unit 118 of the electrical control device 111 is configured to wirelessly transmit the signal SG5 in response to the signal SG3 wirelessly transmitted from the electrical control device 411 to the electrical control device 111. The additional device 409B is configured to execute upshifting or downshifting based on the signal SG5 wirelessly transmitted from the electrical control device 111 to the electrical control device 511.

In the first and second embodiments and the modifications thereof, at least one of the circuit boards 14 and 114 can include a flexible printed circuit.

FIGS. 5 to 19 show examples of the predetermined condition used in the controller 32 of the electrical control device 11. However, at least one of the examples shown in the FIGS. 5 and 19 can be omitted from the electrical control device 11 if needed and/or desired.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A wireless communication device for a human-powered vehicle, comprising:
a wireless communicator unit configured to wirelessly communicate with at least one electric component; and
a controller configured to control the wireless communicator unit to wirelessly communicate with the at least one electric component, the controller being configured to modify, in accordance with a predetermined condition, a signal transmitting manner of a signal transmitted in a predetermined period from the wireless communicator unit, wherein
the wireless communicator unit includes a first wireless communicator and a second wireless communicator,
the signal transmitting manner includes a first signal transmitting manner and a second signal transmitting manner,
the controller is configured to change the signal transmitting manner, in accordance with the predetermined condition, to the first signal transmitting manner of a first signal transmitted from the first wireless communicator, and
the controller is configured to change the signal transmitting manner, in accordance with the predetermined condition, to the second signal transmitting manner of a second signal transmitted from the second wireless communicator.

2. The wireless communication device according to claim 1, wherein
the predetermined condition includes geographical information, and
the controller is configured to modify the signal transmitting manner in accordance with the geographical information.

3. The wireless communication device according to claim 2, wherein
the geographical information includes a geographical condition, and

the controller is configured to modify the signal transmitting manner in accordance with the geographical condition.

4. The wireless communication device according to claim 1, wherein
the predetermined condition includes information indicating that ongoing transmission is being carried by another wireless communicator unit, and
the controller is configured to modify the signal transmitting manner in accordance with the information.

5. The wireless communication device according to claim 1, wherein
the first wireless communicator is configured to wirelessly communicate with the at least one electric component,
the second wireless communicator is configured to wirelessly communicate with the at least one electric component.

6. The wireless communication device according to claim 5, further comprising:
a first antenna; and
a second antenna separate from the first antenna, wherein
the first wireless communicator is electrically connected to the first antenna, and
the second wireless communicator is electrically connected to the second antenna.

7. The wireless communication device according to claim 1, wherein
the controller is configured to control the first wireless communicator to wirelessly communicate with the at least one electric component, and
the controller is configured to control the second wireless communicator to wirelessly communicate with the at least one electric component.

8. The wireless communication device according to claim 1, further comprising:
a first communication capacity includes at least one of a first bit rate and a first receiving sensitivity of the first wireless communicator; and
a second communication capacity includes at least one of a second bit rate and a second receiving sensitivity of the second wireless communicator.

9. The wireless communication device according to claim 8, wherein
the first bit rate is higher than the second bit rate, and the first receiving sensitivity is higher than the second receiving sensitivity.

10. A wireless communication device for a human-powered vehicle, comprising:
a wireless communicator unit configured to wirelessly communicate with at least one electric component; and
a controller configured to control the wireless communicator unit to wirelessly communicate with the at least one electric component, the controller being configured to modify, in accordance with a predetermined condition, a signal transmitting manner of a signal transmitted in a predetermined period from the wireless communicator unit, wherein
the predetermined condition includes a total number of retransmission of a signal, and
the controller is configured to modify the signal transmitting manner in accordance with the total number of retransmission.

11. A wireless communication device for a human-powered vehicle, comprising:
a wireless communicator unit configured to wirelessly communicate with at least one electric component; and
a controller configured to control the wireless communicator unit to wirelessly communicate with the at least one electric component, the controller being configured to modify, in accordance with a predetermined condition, a signal transmitting manner of a signal transmitted in a predetermined period from the wireless communicator unit, wherein
the predetermined condition includes geographical information,
the controller is configured to modify the signal transmitting manner in accordance with the geographical information,
the geographical information includes a geographical condition,
the controller is configured to modify the signal transmitting manner in accordance with the geographical condition,
the geographical information includes a relationship between a geographical location of the wireless communicator unit and a communication state of the wireless communicator unit, and
the controller is configured to modify the signal transmitting manner in accordance with the relationship.

* * * * *